United States Patent
Dao

(10) Patent No.: US 11,929,977 B2
(45) Date of Patent: Mar. 12, 2024

(54) SYSTEM, APPARATUS AND METHOD TO SUPPORT DATA SERVER SELECTION

(71) Applicant: HUAWEI TECHNOLOGIES CO., LTD., Shenzhen (CN)

(72) Inventor: Ngoc Dung Dao, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/566,780

(22) Filed: Dec. 31, 2021

(65) Prior Publication Data

US 2022/0124065 A1 Apr. 21, 2022

Related U.S. Application Data

(63) Continuation of application No. 16/845,019, filed on Apr. 9, 2020, now Pat. No. 11,218,438.

(60) Provisional application No. 62/833,526, filed on Apr. 12, 2019.

(51) Int. Cl.
| | |
|---|---|
| H04W 80/10 | (2009.01) |
| G06F 16/953 | (2019.01) |
| H04L 61/4511 | (2022.01) |
| H04L 61/5007 | (2022.01) |
| H04W 16/04 | (2009.01) |
| H04W 28/02 | (2009.01) |

(52) U.S. Cl.
CPC ........ *H04L 61/4511* (2022.05); *G06F 16/953* (2019.01); *H04L 61/5007* (2022.05)

(58) Field of Classification Search
CPC . H04L 61/4511; H04L 61/5007; G06F 16/953
See application file for complete search history.

(56) References Cited

U.S. PATENT DOCUMENTS

| | | | |
|---|---|---|---|
| 7,177,947 B1 | 2/2007 | Herzog et al. | |
| 10,243,919 B1* | 3/2019 | Suresh | H04L 67/1001 |
| 2012/0278626 A1* | 11/2012 | Smith | H04L 63/123 |
| | | | 713/168 |
| 2018/0219831 A1 | 8/2018 | Naidu et al. | |

(Continued)

FOREIGN PATENT DOCUMENTS

| | | |
|---|---|---|
| CN | 108632953 A | 10/2018 |
| EP | 2810477 B1 | 11/2017 |
| EP | 4024817 A1 | 7/2022 |
| WO | 2018171859 A1 | 9/2018 |
| WO | 2018188082 A1 | 10/2018 |
| WO | WO-2018232253 A1 * | 12/2018 |

OTHER PUBLICATIONS

Zheng Wang, Jun Huang, Scott Rose "Evolution and challenges of DNS-based CDNs", Digital Communications and Networks, (2018).

(Continued)

*Primary Examiner* — Christopher B Robinson

(57) ABSTRACT

A communication system includes a user plane function (UPF) configured to receive a domain name system (DNS) query from a user equipment (UE). The DNS query includes a first destination address of a first DNS server. The DNS query is for determining an address of a data server in proximity to the UE. According to the first destination address of the first DNS server, the UPF obtains, from a session management function (SMF), a second destination address of a second DNS server for providing the address of the data server. The SMF is configured to provide, to the UPF, the second destination address of a second DNS server.

26 Claims, 15 Drawing Sheets

(56) References Cited

U.S. PATENT DOCUMENTS

| | | | | |
|---|---|---|---|---|
| 2018/0317157 | A1* | 11/2018 | Baek | H04W 28/16 |
| 2018/0367619 | A1* | 12/2018 | Jung | H04L 67/564 |
| 2019/0109823 | A1* | 4/2019 | Qiao | H04L 47/24 |
| 2019/0110238 | A1 | 4/2019 | Buckley | |
| 2019/0373441 | A1* | 12/2019 | Ryu | H04W 48/18 |
| 2020/0100303 | A1* | 3/2020 | Sankar | H04W 76/12 |
| 2020/0120446 | A1* | 4/2020 | Stammers | H04W 4/029 |
| 2020/0162270 | A1* | 5/2020 | Du | H04L 63/0428 |
| 2020/0329008 | A1 | 10/2020 | Dao | |
| 2021/0320896 | A1 | 10/2021 | Feng | |

OTHER PUBLICATIONS

"3rd Generation Partnership Project; Technical Specification Group Services and System Aspects; System Architecture for the 5G System; Stage 2"; 3GPP TS 23.501 V16.0.2 (Apr. 2019).

"3rd Generation Partnership Project; Technical Specification Group Services and System Aspects; Procedures for the 5G System; Stage 2"; 3GPP TS 23.502 V16.0.2 (Apr. 2019).

ZTE: "Solution to KI#1: Discovery of Edge Application Server", 3GPP Draft; S2-2001715, Jan. 27, 2020, XP051845613, total 5 pages.

CHINATELECOM: "pC R 23.748—solution to KI#1, Edge Application Server discovery with LDNS address information", 3GPP Draft; S2-2000597, Jan. 7, 2020, XP051842655, total 3 pages.

3GPP Draft; 23.502 V15.0.0,"3rd Generation Partnership Project; Technical Specification Group Services and System Aspects; Procedures for the 5G System; Stage 2 (Release 15)", Jan. 1, 2018, XP051384054, total 258 pages.

Samsung: "Nef service for service specific parameter provisioning", 3GPP Draft; 23502_CR0962R3_EV2XARC_(REL-16)_S2-1902611 Mar. 14, 2019, XP051697199, total 5 pages.

3GPP TR 23.748, V0.3.0 "3rd Generation Partnership Project; Technical Specification Group Services and System Aspects; Study on enhancement of support for Edge Computing in the 5G Core network (5GC) (Release 17)", Feb. 3, 2020, pp. 1-40, XP051861022.

* cited by examiner

SYSTEM, APPARATUS AND METHOD TO SUPPORT DATA SERVER SELECTION

CROSS-REFERENCE TO RELATED APPLICATIONS

This application is a continuation of U.S. patent application Ser. No. 16/845,019 entitled "SYSTEM, APPARATUS AND METHOD TO SUPPORT DATA SERVER SELECTION" filed Apr. 9, 2020, which claims the benefit of priority to U.S. Patent Application Ser. No. 62/833,526 entitled "SUPPORT WEB SERVICES IN A MOBILE EDGE COMPUTING SERVICES NETWORK" filed Apr. 12, 2019, which is hereby incorporated by reference in its entirety.

FIELD OF THE INVENTION

The present invention pertains to the field of network communications, and in particular to a system, apparatus, and method of providing DNS queries and data server selection services in a mobile edge computing and communication network system.

BACKGROUND

There are many content distribution networks (CDN) deployed to provide mobile edge computing (MEC) applications. CDN servers can be deployed in locations close to users to reduce the packet delay and provide higher connection speed between the user equipment (UE) and application server. However, there are a number of issues with the existing solutions. The present document discusses issues and solutions for CDNs, but these same solutions may be applicable to any networks that are designed to provide MEC applications to users, such as cloud computing networks or fog computing networks.

FIG. 1 illustrates a network model supporting a user plane data connection between a UE 102 and a CDN 104 in a communication network. In particular, FIG. 1 illustrates a simplified network model to support user plane data connection between a UE 102 and a CDN 104. The mobile network 106, such as 4th generation (4G) and 5th generation (5G) mobile networks specified by 3GPP (3rd Generation Partnership Programme), may consist of user plane entities, for example including radio nodes in the radio access network (RAN) 108 and user plane function (UPF) 110 in the core network (CN). The radio nodes provide wireless interface to connect the UEs 102 with the mobile networks. The radio node could be, for example an eNB, gNB of 3GPP mobile networks, or WiFi access points. The UPF 110 provides connection between the radio nodes and data networks (DN). The data network could be the public Internet, or a local data network of an enterprise. The mobile network operator (MNO) may also provide Domain Name System (DNS) 116 as a default DNS to provide mapping between a website or server name and Internet Protocol (IP) address of the server that hosts the website or application. The CDN 104 may have a number of content and applications servers 112 and its own DNS 114. In this model, there may be no, or a limited number of control messages sent between the CDN 104 and control plane (CP) network functions (NFs) of the mobile network to support UPF 110 selection as specified in 3GPP technical specification (TS) 23.501, Release 16, version 16.0.2 published in Mar. 28, 2019, clause 5.6.7, "Application Function influence on traffic routing".

When a UE 102 wants to access a service in the DN, such as an MEC service, the UE 102 may need to discover the IP address of the server that provides the service. The most popular method to identify the IP address of server is to use the DNS. The IP address of the DNS may be configured in the UE 102 by the MNO 106 or may be manually configured by the owner of the UE 102. Since there are many web services that the user may not know the right IP address of the DNS to send the DNS query to, in this document, solutions supported by the mobile network are presented.

The background information herein is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide improved systems, apparatus, and methods of providing DNS queries and data server selection services in a data, MEC, or communication network, including a wireless network.

Embodiments herein provide, in a first broad aspect, a communication system including a user plane function (UPF) configured to receive a domain name system (DNS) query from a user equipment (UE). The DNS query includes a first destination address of a first DNS server. The DNS query is for determining an address of a data server in proximity to the UE. According to the first destination address of the first DNS server, the UPF obtains, from a session management function (SMF), a second destination address of a second DNS server for providing the address of the data server. The SMF is configured to provide, to the UPF, the second destination address of a second DNS server. This may be helpful in directing the DNS query of a UE to an appropriate DNS server in a manner that is transparent to the UE.

In a further embodiment, the SMF is further configured to receive, from the UPF, a request comprising the first destination address of the first DNS server, and in response to the request, transmit to the UPF, a response including the second destination address of the second DNS server. This provides the advantage that the SMF is able to configure the system to provide an optimal DNS server address to the UPF based on the session.

In a further embodiment, the SMF is further configured to select the second DNS server according to the received request.

In a further embodiment, the UPF is further configured to transmit towards the second DNS server, a second DNS query for determining the address of the data server in proximity to the UE, and in response to the second DNS query, receive from the second DNS server, the address of the data server in proximity to the UE. This may be helpful in allowing the UE to access a data server in close proximity to the UE in a manner that is transparent to the UE.

In a further embodiment, the UPF is further configured to generate the second DNS query according to the received DNS query by replacing the first destination address of the first DNS server with the second destination address of the second DNS server.

In a further embodiment, the second DNS server is configured to receive the second DNS query, and in response to the second DNS query, provide to the UE, the address of the data server.

In a further embodiment, the SMF is further configured to transmit to the UE, a session modification request instructing the UE to perform one of the following; establish a new QoS flow for a protocol data unit (PDU) session with the data server; establish a new PDU session with the data server; and transmit a DNS query to discover a new data server. This may be helpful in causing the UE to update its connection to the data network and improving performance and efficiency.

In a further embodiment, the SMF is further configured to detect a condition of a communication between the UE and the data server, wherein the session modification request is transmitted according to the detected condition.

In a further embodiment, the condition includes that the UE has moved to a new location.

In a further embodiment, the condition includes that a quality of service (QoS) is degraded.

In a further embodiment, the data server is a MEC server configured to serve the UE.

Embodiments herein provide, in another broad aspect, an apparatus including a processor and a non-transient memory for storing instructions which when executed by the processor causes the apparatus to receive a domain name system (DNS) query from a user equipment (UE). The DNS query includes a first destination address of a first DNS server. The DNS query is for determining an address of a data server in proximity to the UE. According to the first destination address of the first DNS server, obtain, from a session management function (SMF), a second destination address of a second DNS server for providing the address of the data server. This may be helpful in directing the DNS query of a UE to an appropriate DNS server in a manner that is transparent to the UE.

In further embodiments, the instructions which when executed by the processor further cause the apparatus to transmit towards the second DNS server, a second DNS query for determining the address of the data server to trigger the second DNS server to provide the address of the data server to the UE. This may be helpful in allowing the UE to access a data server in close proximity to the UE in a manner that is transparent to the UE.

In further embodiments, the instructions which when executed by the processor further cause the apparatus to generate the second DNS query according to the received DNS query by replacing the first destination address of the first DNS server with the second destination address of the second DNS server. This provides the advantage that the SMF is able to configure the system to provide an optimal DNS server address to the UPF based on the session.

In further embodiments, the instructions which when executed by the processor further cause the apparatus to, in response to the DNS query, transmit to the UE, a response message comprising the address of the data server.

Another embodiment includes an apparatus including a processor and a non-transient memory for storing instructions which when executed by the processor cause the apparatus to receive, from a user plane function (UPF), a request comprising a first destination address of a first DNS server, wherein the first destination address of the first DNS server is included in a DNS query from a user equipment (UE) for an address of a data server, and select a second DNS server to provide the address of the data server according to the received request, and in response to the request, transmit to the UPF, a response comprising the second destination address of the second DNS server. This may be helpful in an SMF providing an appropriate remapping of DNS queries by a UPF without the UPF having to determine the new DNS server itself.

In further embodiments, the instructions which when executed by the processor further causes the apparatus to transmit to the UE, a session modification request instructing the UE to perform one of the following; establish a new QoS flow for a protocol data unit (PDU) session with the data server; establish a new PDU session with the data server; and transmit a DNS query to discover a new data server.

In further embodiments, the instructions which when executed by the processor further cause the apparatus to detect a condition of a communication between the UE and the data server. The session modification request is transmitted according to the detected condition. This may be helpful in a SMF to cause the UE to update its connection to the data network and improving performance and efficiency.

In further embodiments, the condition includes that the UE has moved to a new location.

In further embodiments, the condition includes that a quality of service (QoS) is degraded.

Embodiments herein provide, in another broad aspect, an apparatus and a method including receiving, by a Network Exposure Function (NEF), from an application function (AF), a DNS configuration request. The NEF further updates a DNS configuration in a Unified Data Repository (UDR) with a parameter of the DNS configuration request. When the DNS configuration request includes a creation or an update, the DNS configuration is modified in the UDR. When the DNS configuration request includes a deletion, the DNS configuration is removed from the UDR.

In further embodiments, the NEF authenticates the AF in response to receiving the DNS configuration request.

In further embodiments, the DNS configuration includes a packet filter to identify traffic of a DNS server.

Embodiments herein provide, in another broad aspect, an apparatus and a method including receiving, by a Network Exposure Function (NEF), from an application function (AF), a Packet Flow Description (PFD) configuration request. Transmitting, by the NEF, to a Unified Data Repository (UDR), the PFD configuration request. When the PFD configuration request includes a creation or an update, a PFD configuration is modified in the UDR. When the PFD configuration request includes a deletion, the PFD configuration is removed from the UDR.

In further embodiments, the NEF authenticates the AF in response to receiving the PFD configuration request.

In further embodiments, the NEF converts information of the PFD configuration request into operation parameters of a mobile network of a UE. In further embodiments, the PFD configuration enables the detection and forwarding of traffic of a DNS server.

Embodiments herein provide, in another broad aspect, methods according to the communication system above, methods performed by any of the apparatus above, and non-transitory storage or medium configured to store instructions for performing the methods above.

BRIEF DESCRIPTION OF THE FIGURES

Further features and advantages of the present invention will become apparent from the following detailed description, taken in combination with the appended drawings, in which.

It will be noted that throughout the appended drawings, that like features are identified by like reference numerals.

DETAILED DESCRIPTION

Embodiments of the present invention are directed towards systems and methods of unifying data transmission and storage in a communication network, including a wireless communication network.

Figure 1:
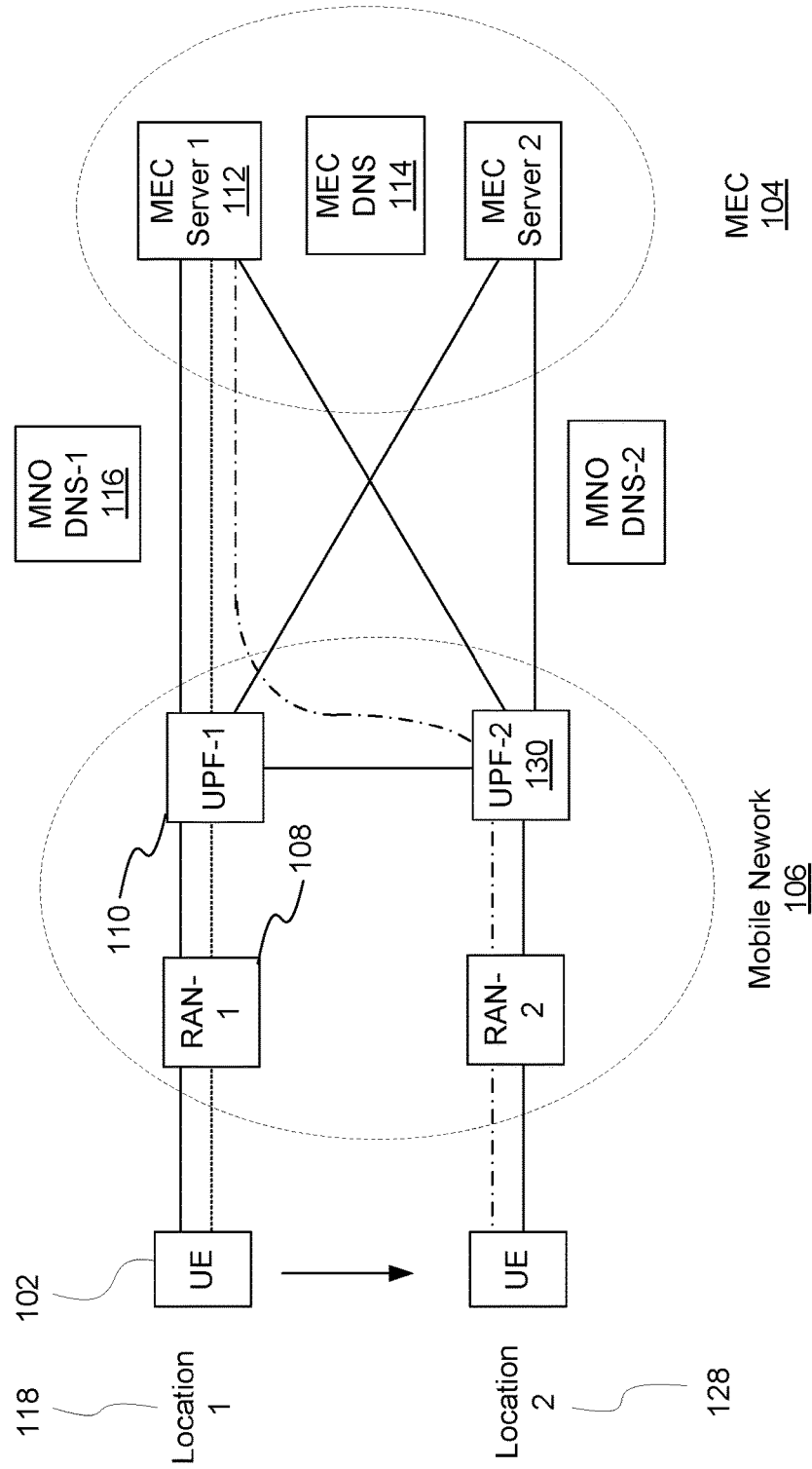
FIG. 1 illustrates, in an example embodiment, a network model supporting a user plane data connection between a user equipment (UE) and a content data network (CDN) in a communication network.

FIG. 1 illustrates a network model of a UE 102 in communication with a data source such as a Mobile Edge Computing (MEC) or Content Delivery Network (CDN) platform. The mobile network may establish one or more PDU session for the UE 102 to connect to a data network. For example, in FIG. 1, the user plane connections for two PDU sessions between the UE 102 in location 1 118 and the UPF-1 110 are indicated by a continuous line and a dotted line. When the UE 102 sends a DNS query packet to the default DNS server, such as a MNO DNS server 116, to find IP address(es) of a domain name (or FQDN), if this domain name (or FQDN) is hosted by the CDN 104 or an MEC platform, the MNO DNS 116 may create a message to the CDN DNS 114 to request a CDN server IP address that hosts the domain name (or FQDN). The default DNS server could be a MNO DNS server 116, or a public DNS server. The CDN DNS server 114 may send the IP address(es) of CDN server(s) 112 back to the MNO DNS 116. The MNO DNS server 116 sends the IP address(es) of CDN server(s) 112 back to the UE 102.

In this document, the terminology CDN DNS and MEC DNS are used interchangeably. These two terminologies refer to a DNS that is not managed by MNO, and this DNS is provided by CDN service provider or MEC service provider. The MEC service providers use CDN infrastructure to provide MEC services.

There are some issues with the above DNS query mechanism.

Problem 1: The MNO DNS 116 may not send the IP address of the UE 102 to the CDN DNS 114. The MEC DNS may select MEC server(s) that may be far from the UE location 118.

Problem 2: Once the UE 102 knows the IP address(es) of the MEC server(s), the UE 102 keeps communicating with this server. When the UE 102 moves to the new location 2 128, the UE 122 at the new location 128 still communicates with the current MEC Server 112, for example MEC server 1. The connection path of one PDU session indicated by the dash-dot line from the new UE 122 location 2 128 to the MEC server 1 112 may be no longer the optimal path according to some criteria such as packet delay, shortest path, assigned system bandwidth, load balancing among network functions (like load balancing among packet gateways of the mobile network). However, the IP address of the UE may not be allowed to change during the data session, for example HTTP (HyperText Transfer Protocol) session, or TCP (Transmission Control Protocol) session.

There are some existing solutions for the above two problems.

Solution for Problem 1: The MNO DNS server may send the IP address or IP prefix of the UE 102 to the MEC DNS server 114 so that the MEC DNS server 114 knows the UE geographical location to select the best MEC server(s) 112. However, most of current DNS servers do not send the UE location or IP address to another DNS server, such as MEC DNS server. Furthermore, the user privacy issue may not allow the MNO DNS server to send the IP address of the UE to the MEC DNS servers. Therefore, this solution may not be used in general.

Solution for Problem 2: Using Session and Service Continuity (SSC) mode 2 or SSC mode 3 specified in 3GPP TS 23.501 so that the mobile network may assign the UE 122 a new IP address associated with the UPF-2 130. The UE 122 may use the new IP address to set up a new PDU session. For example, in FIG. 1, the mobile network may establish a new PDU session having a user plane connection indicated by a continuous line, connecting the UE 102 at location 2 128 to the MEC Server 2 via RAN 2 and UPF-2 130. However, since the UE 122 still has the IP address of the old MEC application or data server 112, the UE 122 cannot select a new MEC server 126 that could provide better connection for the UE 122 in the new location.

In the disclosure herein, the MEC platform that hosts applications may not have a function, such as Application Function (AF), specified in 3GPP TS 23.501 to communicate with the mobile network. The AF influenced traffic routing solution in TS 23.501 assumes that the MEC server or the UPF may be relocated by exchanging control messages between the AF and CN CP functions. However, many current MEC applications use the TCP/IP protocol stack, which may not support changes of source IP addresses or destination IP addresses during a TCP/IP connection. It is thus required to provide new solutions that allow selection of a UPF or MEC server before the data connection (such as HTTP or TCP/IP connection) between the UE and MEC server is established. Though the term "Mobile Edge Computing server", "MEC server", "MEC platform", "MEC DNS" are used in this specification, the teachings herein can be applied for various types of computing data and the terms "data server", "data platform", "data DNS", etc. may also be used.

In embodiments, the user plane function (UPF) provides functionality to detect traffic that is sent to DNS servers for DNS queries. The UPF detects packets that the UE sends to a DNS server, such as a public DNS server, MNO DNS server, CDN DNS server, or MEC DNS server, in order to check whether the UE is establishing a connection with an MEC server. The UPF then may use a MEC Support Function (MSF) to change the destination IP in the UE packet such that the destination IP of the MNO DNS may be replaced by another local MNO DNS or CDN/MEC DNS.

For an ongoing PDU session, if the SMF finds that the user plane (UP) connection is no longer optimal because the UE has moved to a new location, the SMF may send to the UE an instruction to query the DNS again, or the SMF may send to the UE a new IP address associated with a new PDU Session Anchor (PSA) UPF. When the UE sends a new DNS query, the UE may use the new IP address to send a new DNS query for the mapping of a webpage or an application server name and its IP address. The CN SMF may establish a branching point (BP) UPF to forward the new DNS query to the new PSA UPF. The new PSA UPF may read the content of the DNS query and may use Network Address Translation (NAT) to change the destination IP of the MNO DNS to the destination IP of the CDN or MEC DNS server. The CDN/MEC DNS server sends back the location (IP address) of the CDN/MEC server that could serve the UE better.

Figure 2:
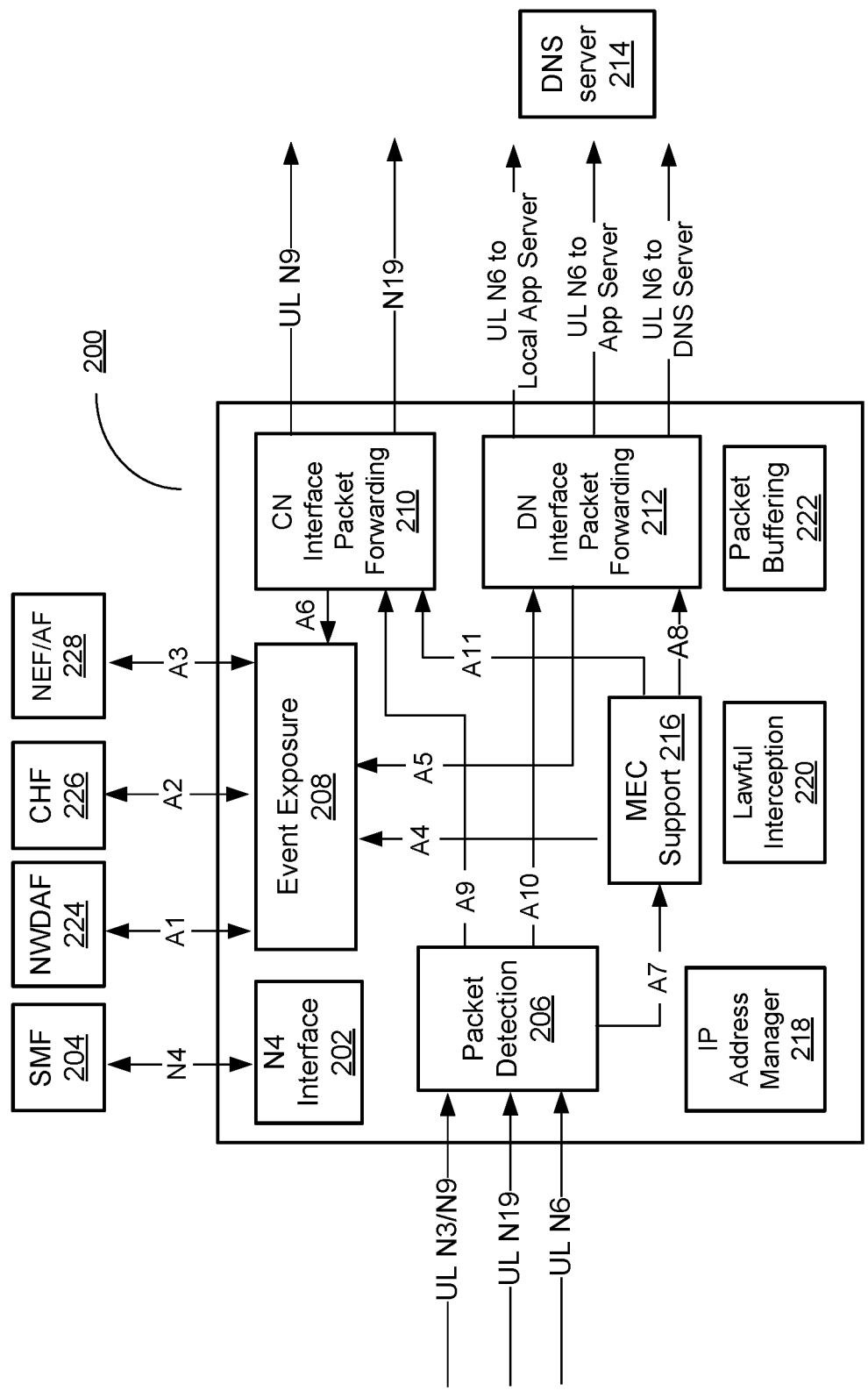
FIG. 2 illustrates an example embodiment, an architecture of a user plane function (UPF) and interfaces supporting uplink (UL) data traffic.
Figure 3:
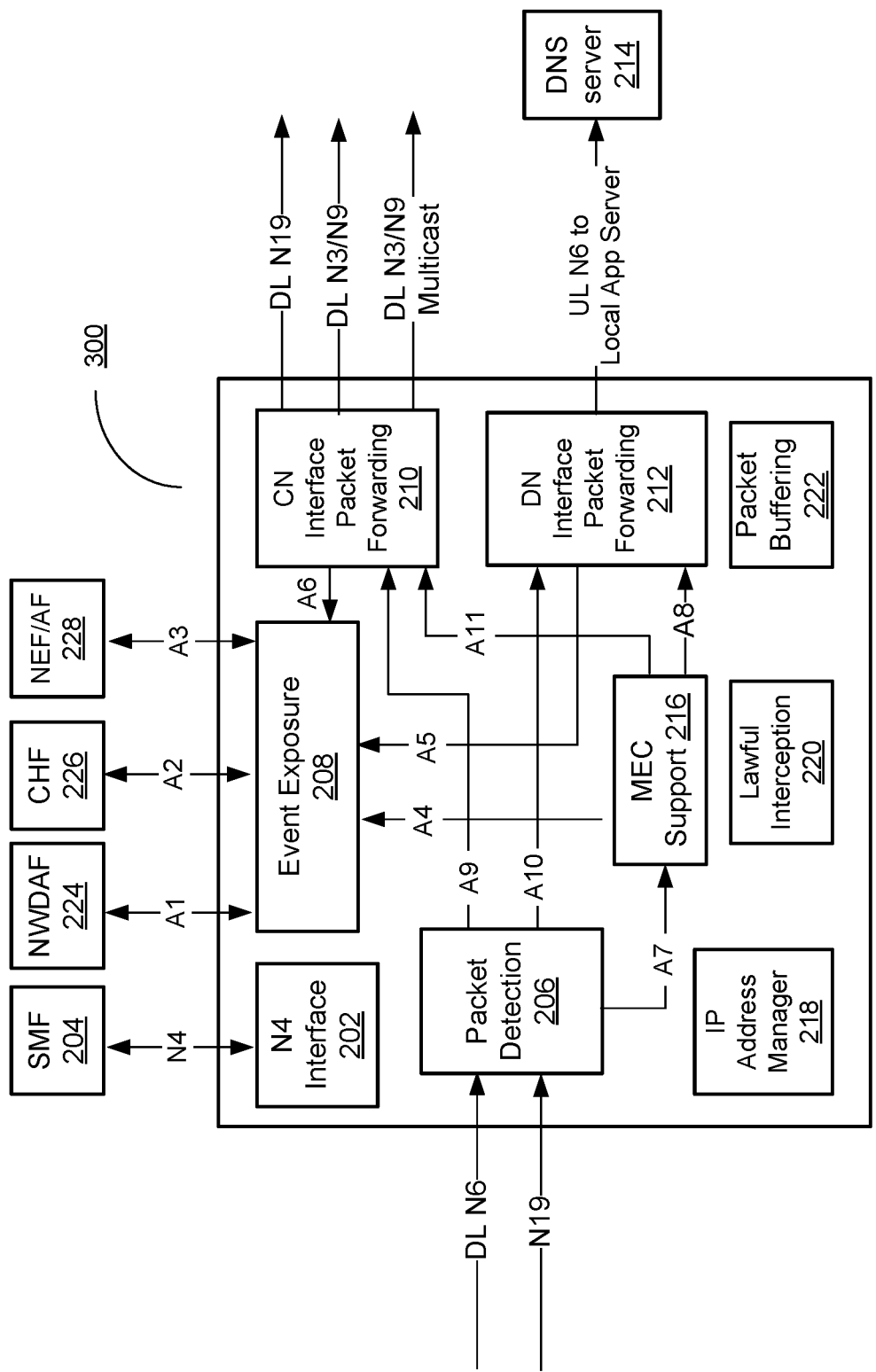
FIG. 3 illustrates, in an example embodiment, an architecture of a UPF and interfaces supporting downlink (DL) data traffic.

FIG. 2 illustrates an example embodiment of an architecture of a user plane function (UPF) 200 and interfaces supporting uplink (UL) data traffic and FIG. 3 illustrates, in an example embodiment, an architecture of a UPF 300 and interfaces supporting downlink (DL) data traffic. In particular, architectures of a UPF to support the above solutions are shown in FIGS. 2 and 3. The UPF architectures 200 or 300 may be implemented as the UPF 110 and 130 of FIG. 1. Both the UPF architectures 200 and 300 include a MEC support function 216 that interacts with the SMF 204 to detect particular traffic to and from the UE 102 in order to utilize DNS servers, and to select a UPF and data server. The functionalities of UPF functions are described as follows.

N4 Interface 202: This function is in charge of sending to and receiving N4 messages from the SMF 204. The N4 Interface 202 distributes the messages from the SMF 204 to other functions of the UPF 200 or 300.

Packet Detection Function 206: Detects the input packets (or PDUs) and forward to packets to other packet processing functions of the UPF.

Event Exposure function 208: Collects the events from other functions of UPF and sends the event notifications to other network functions of the mobile network.

CN Interface Packet Forwarding 210: Forward packets (or PDU) to other UP functions, e.g. RAN node, UPF, and other CP functions, e.g. Network Exposure Function (NEF), SMF, by using UL/DL interfaces, for example N3, N9, and N19 interfaces.

DN Interface Packet Forwarding 212: Forwards packets to the DN, or local area data network (LADN), for example by using the N6 interface. The DNS Server may be a part of the DN or local area data network (LADN). The DNS Server 214 is shown in FIGS. 2 and 3 to illustrate the signaling messages exchanged between the mobile network and DNS server 214 (such as default DNS server, centralized MNO DNS server, local MNO DNS server, public DNS server, MEC DNS server, CDN DNS server) in other embodiments.

The DN Interface Packet Forwarding function 212 may perform QoS monitoring, enforcement, and reporting:
  Packet counting for charging.
  Data rate monitoring and enforcement: e.g. guaranteed flow bit rate (GFBR), maximum flow bit rate (MFBR), session aggregate flow bit rate (Session-AMBR).
  Packet delay monitoring.
  MEC Support function (MSF) 216: This function supports MEC applications.

The MEC Support function 216 may interact with the SMF 204 via the N4 interface:
  The SMF 204 or another network function, e.g. OAM (Operations, Administration and Maintenance) function, may assign IP address(es), or range(s) of IP addresses, or IP prefix(es), or range(s) of IP prefix(es) to the MEC Support function 216 to perform NAT actions. The IP address in this pool may be used to replace the source IP address of the UE in the UL packet header. The replaced address may be used to protect user privacy, and/or for traffic routing between the mobile network and a data server in the data network. The data server may be a DNS server, or application server, or content server.
  The SMF 204 may notify the IP address(es) of local MEC DNS Server, or MNO DNS Servers.
  The SMF 204 may provide mapping between domain name, or host name, or URL or significant part of URL (such as FQDN) and IP address(es) of a local DNS server(s), where the local DNS server could be a local MNO DNS server, or a MEC DNS server. There can be multiple MEC DNS servers, each MEC DNS server may serve certain applications or web services. The MEC Support function 216 may read the domain name, host name, or the URL or significant part of URL (such as FQDN) to identify which MEC DNS server that can be used to provide the IP address(es) of the application server.

Detect DNS Query in the UL Packets Sent from UEs
  NAT Functionality: If a UE DNS query is detected in the UL, the MEC Support function 216 may replace UE Source IP address by another IP address, called UE-DNS-query IP address, and/or replace the destination IP address in the DNS query packet by an IP Address of a local MEC DNS server of the MEC system or a IP address of the local MNO DNS server.

If a DNS response is detected in the DL, the MEC Support function 216 may replace the destination IP address, which may be called UE-DNS-query IP address, by the actual UE's IP address, and/or replace the IP address of local MEC DNS server (or local MNO DNS server) by the original IP address of the DNS server that UE has sent to in the UL DNS query message.

Content Analysis for Data Caching:
  If the UL data request is sent from the UE to an MEC server is detected, the MSF 216 may analyze the packet payload to understand what content or application is requested. The UE may use an application layer command, like HTTP GET command, to request a specific content. The MEC Support function 216 may keep statistics of content, website a UE may request or access.

If a DL packet from a MEC server is detected, the MEC Support function 216 may analyze the size of content and make decision whether to cache this content or not.

The Packet Detection function 206 and MEC Support function 216 may be implemented in the same function.

IP Address Manager 218: This function manages a pool of IP addresses. This IP Address Manager 218 can be used for NAT functionality. The UE's IP address in the UL packet (source IP address) may be replaced by another IP address managed by the IP Address Manager 218. For example, the UE source IP address may be replaced by another IP address for a DNS query.

Lawful Interception 220: To support lawful interception where law enforcement agencies with court orders or other legal authorization may monitor UE traffic.

Packet Buffering 222: Provide packet buffering functionality.

The UL and DL packets may be buffered in some scenarios:
  Time deterministic transmission: If a DL or UL packet needs to be sent at a specific time.
  Broadcast/multicast transmission: If a packet or file needs to be sent to multiple UEs at a specific time.
  Delay tolerant applications: If a UE is in a power saving mode, the packet may be buffered in the UPF 200 or 300 until the UE enters a connected state.

Details of Messages Exchanged Over the Interfaces:

A1 interface: Provides an interface between the Network Data Analytics Function (NWDAF) 224 and a UPF 200 or 300. This interface can be implemented by service-based messages used in a 5G service based architecture as specified in 3GPP TS 23.501. The NWDAF 224 may use A1 interface to send request or subscription messages to the UPF 200 or 300. The UPF 200 or 300 may send responses or notifications to the NWDAF 224 to convey event notifications related to packets, QoS flow, PDU Session, content detection and traffic handled by the UPF 200 or 300.

A2 interface: Provides an interface for the UPF 200 or 300 to send reports related to charging to the Charging Function (CIF) 226 according to Usage Reporting Rule (URR).

A3 interface: Provides an interface for the UPF 200 or 300 to interact with a NEF and/or AF 228.

The NEF 228 may receive small packets from an AF and forward to the UPF 200 or 300 for user plane data delivery.

The NEF 228 may request or subscribe to receive event notifications directly.

The NEF may receive data for broadcasting from the AF and send to the UPF 200 or 300.

A4 interface: An interface for the MEC Support function 216 to send event notifications to other NFs.

Statistics of DNS Server queries for domain names, URLs, or FQDNs, webpages, applications, and specific contents. This information may be used by CIF 226 for charging purposes and/or AF 228 for content popularity analysis, and/or by the SMF 204 for content popularity analysis.

A5 interface: For reporting event notifications to other NFs about UL and DL traffic that sent between UPF 200 or 300 and DN.

A6 interface: For reporting to other NFs about UL and DL traffic that sent within the mobile network.

A7: To transfer the packets to be processed by MEC Support function 216.

A8: To transfer the processed packets from the MEC Support function 216 towards DN.

A9: To transfer packets between the Packet Detection function 206 and the CN Interface Packet Forwarding 210.

A10: To transfer packets between the Packet Detection function 206 to DN Interface Packet Forwarding function 212.

A11: To transfer packets between MEC Support function 216 and CN Interface Packet Forwarding function 210.

When the UPF 200 receives a UL PDU that contains a DNS query, the UPF 200 may send a notification to the NWDAF 224. The DNS query notification may include one or more of the following information: A timestamp of the event, UE ID, PDU Session ID, QoS flow ID, DNN, S-NSSAI, DNAI, QoS parameters, 5G QoS Identifier (5QI), a copy of the UE's UL packet, the queried domain, the queried URL, the queried host name, or the queried significant part of the URL.

When the UPF 300 receives a DNS response in the DL, the UPF 300 may send notification to the NWDAF 224 to report DNS response event. The DNS response notification may include a timestamp of the event, UE ID, PDU Session ID, QoS flow ID, DNN, S-NSSAI, DNAI, QoS parameters, 5G QoS Identifier (5QI), a copy of the UE's DL packet, the IP address of the MEC server that hosts the domain name (or host name, or URL, or significant part of URL (such as FQDN)).

Figure 4:
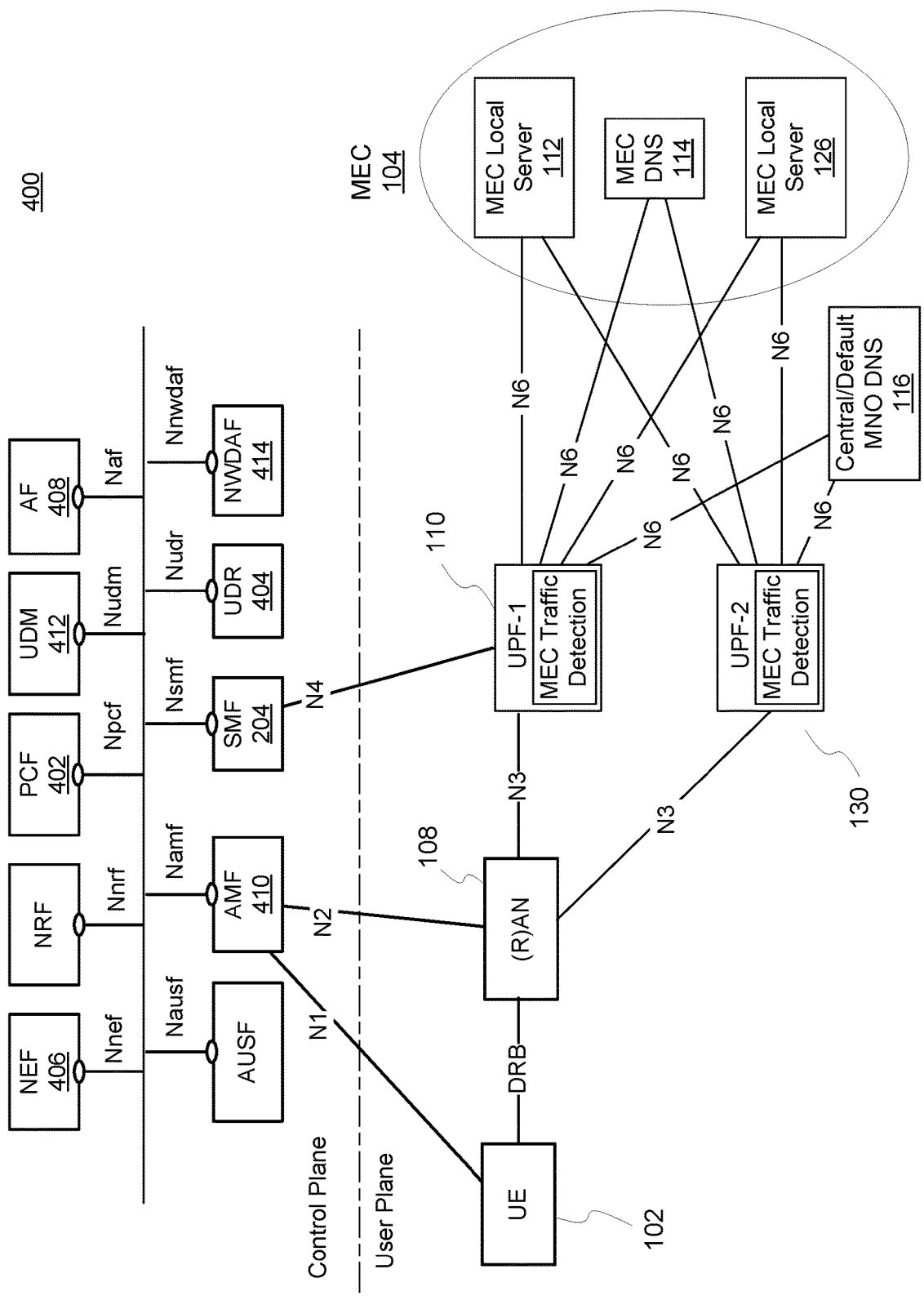
FIG. 4 illustrates in an example embodiment, a network model to support a mobile edge computing (MEC) application.

FIG. 4 illustrates in an example embodiment, a network model 400 to support a mobile edge computing (MEC) application. In the embodiment of FIG. 4, the UPF 110 and 130 is provided a functionality to detect and support MEC traffic. The UE 102 has one or more established PDU session to access a DN. The DN, such as MEC 104, may host one or multiple MEC applications, such as video streaming, AV/VR applications, social networks, data storage, emails, video processing, medical applications. When the UE 102 wants to access the DN to use a particular MEC service, the following steps may happen to establish an IP connection with the MEC server 112 or 126.

Step 1: If the UE 102 does not have a PDU session established to support connection between the UE 102 and the DN that hosts application servers 112 or 126, the UE 102 may send a PDU Session Establishment request to the mobile network to establish a new PDU Session.

Step 2: After having a PDU session established, the UE 102 may send a DNS query to the default DNS server, such as MNO DNS server 116 to obtain the IP address of application server 112 or 126.

Step 3: The MNO DNS server 116 may send a DNS query to the MEC DNS server 114 that provides DNS service for the MEC application. The MNO DNS server 116 may or may not send the UE IP address to the MEC DNS 114.

Step 4: The MEC DNS 114 may select a MEC server 112 or 126 and send the IP address of the selected MEC server 112 or 126 to the MNO DNS 116. If the MNO DNS 116 includes the UE IP address, the MEC DNS 114 may be able to select a MEC server 112 or 126 close to the UE 102. Otherwise, there is no guaranty that the selected MEC server is optimal.

Step 5: the MNO DNS 116 forwards the MEC server 112 or 126 IP address to the UE 102 in a DNS response message.

Step 6: The UE 102 uses the IP address of the MEC server to establish a data session with the MEC server 112 or 126. The UE 102 communicates with the MEC server 112 or 126 by using the IP address of the MEC server provided in the DNS response message.

In the above procedure, the selected MEC server 112 or 126 may be not optimal, depending whether the MNO DNS server 116 support a protocol to send the UE 102 information to the MEC DNS 114. To avoid this issue, the UPF 110 or 130 may first detect the DNS query from the UE 102.

Then, the UPF 110 or 130 may forward the DNS query to either the local MEC DNS Server 114 or the Local MNO DNS Server 116. If the MNO has a local MNO DNS server 116, the UPF 110 or 130 may forward the UE's DNS query to the local MNO DNS instead of the default MNO DNS server. Then the local MNO DNS server may send a DNS query to the MEC DNS server 114.

One embodiment herein introduced to support the case when the MNO has a centralized DNS, which may be the default DNS for all DNS queries from UEs. Another embodiment is introduced to support the case when the MNO has local DNS servers. However, the UE 102 may be unaware of whether the MNO has local DNS servers or not. The operating system in the UE 102 is configured with a default MNO DNS server 116 or a default public DNS server.

When the UE 102 sends an uplink packet that contain destination IP address of the MNO DNS server 116 (or public DNS server), the MEC Support Function 216 (MSF) of the UPF may check the destination IP address of the UL packets and may detect the DNS query sent to the default MNO DNS 116. The MSF 216 then may read the payload, which may contain the domain name or FQDN of the DNS query message to identify the domain name or FQDN of the requested content. The domain name may be also a host name, a URL, or a significant part of URL (such as FQDN). The MSF 216 has a mapping between the domain name or FQDN, and a local MEC DNS 114 that can provide IP address of the MEC server 112 or 126 hosting the domain name or URL, or a significant part of URL (e.g. FQDN). The MEC DNS 114 may be represented by one or multiple IP address(es).

The MSF 216 may notify the SMF 204 about the DNS query for MEC server connection. The message may include the domain name or FQDN that the UE 102 is querying.

The SMF 204 may have a mapping from the domain name (or FQDN) and IP address of MEC DNS server 114.

The SMF 204 may have a mapping between domain name (or FQDN) and potential MEC servers that can serve the UE 102.

The SMF 204 may send the IP address of the MEC DNS server 114 to the UPF 110 or 130.

The MSF 216 may replace the destination IP in the UE packet by the IP address of the MEC DNS 114. The new destination IP address of MEC DNS server could be pre-configured in the UPF or sent from the SMF.

The MSF 216 may also replace the UE 102 IP address (source address) by another IP address or IP prefix associated with the PSA UPF 110 or 130 and may be unique to map to the source IP of the UE 102.

The MSF 216 then may send the modified DNS query packet to one of the egress ports of the UPF 200, which is the DN Interface Packet Forwarding function 212 that is configured to send packets towards the MEC DNS server 114 in the DN. The MEC DNS 114 receives the DNS query message and sends back the IP address of the MEC server 112 or 126 towards the UE 102 via the UPF 300. The UPF 300 reads the input packets and detects the packet comes from the MEC DNS server 114 for the UE 102. The UPF 300 may forward this packet to the MSF 216. The MSF 216 may replace the source IP address, which is the IP address of the MEC DNS 114, by the IP address of the MNO DNS 116 that UE 102 has sent the UL DNS query packet to. The MSF 216 may also replace the destination IP address by the original IP address of the UE 102 if the original IP address of the UL packet from the UE 102 has been replaced. The MSF 216 may then send the modified packet that carries the DNS response to an egress port of UPF 300, which is the CN Interface Packet Forwarding function 210 that provides the N3, N19 or N9 connection for the PDU session of the UE 102. The UPF 300 then forwards the PDU towards the UE 102. The UE 102 receives the packet that carries the MEC server 112 or 126 IP address. The UE 102 uses this IP address to communicate with the MEC server 112 or 126.

Figure 5:
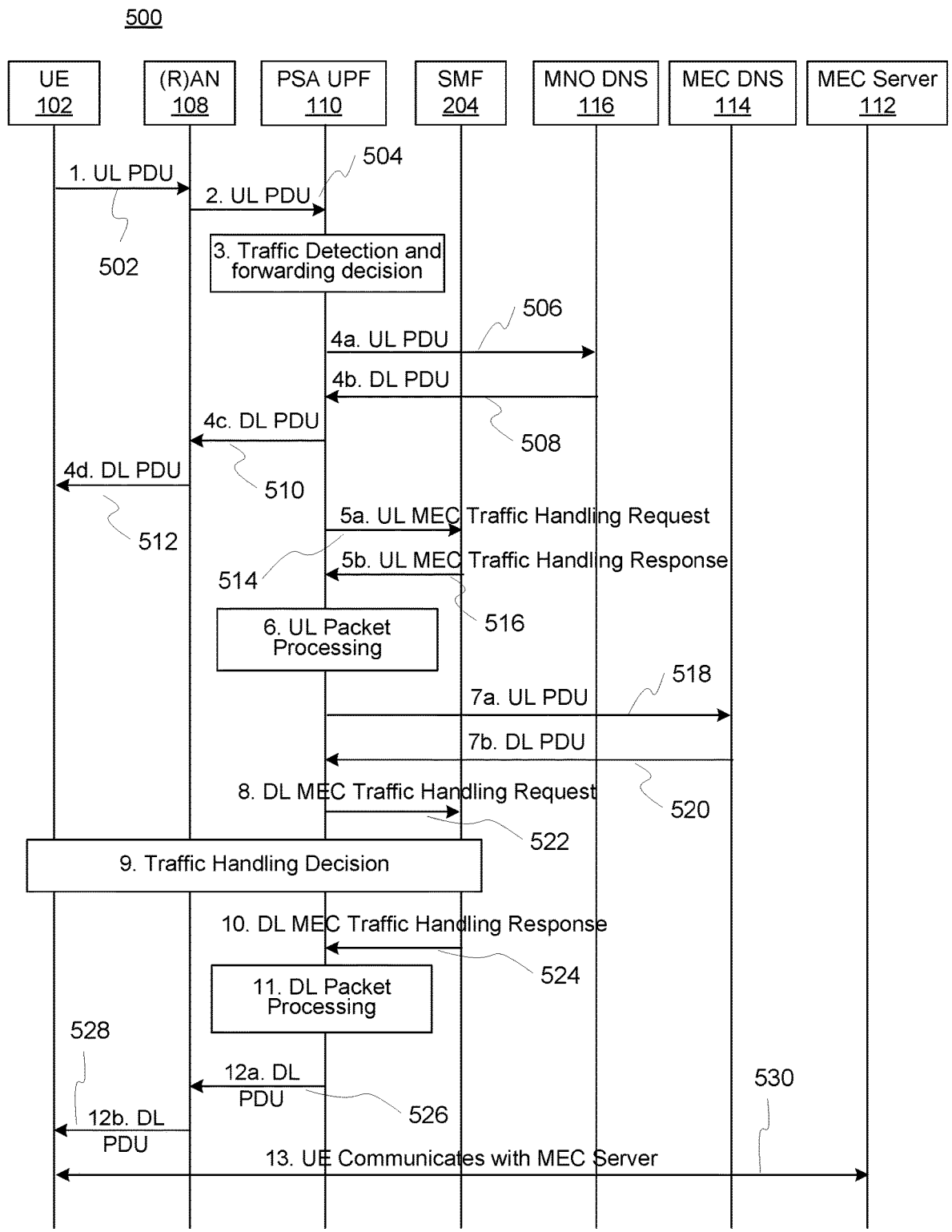
FIG. 5 illustrates, in an example embodiment, a signaling procedure to support MEC traffic.

FIG. 5 illustrates, in an example embodiment, a signaling procedure 500 to support MEC traffic. The method illustrated allows for the detection of DNS queries contained in UL PDUs and the forwarding of the DNS query to a DNS server in proximity to the UE 102. The method also facilitates address translation to improve the selection of the DNS server and to obscure the address of the UE 102. It is assumed that the UE 102 has a PDU Session established to support communication between the UE 102 and DN that hosts the MEC application. During the PDU Session establishment or PDU Session modification procedure, the SMF 204 may provide the UPF 110 with, a packet flow description (PFD), a packet detection rule (PDR) and a packet forward action rule (FAR), or a usage reporting rule (URR). The PDR and/or PFD may include one or more packet filter sets that may be used to detect packets carrying a DNS Query. Details of this step will be discussed in regard to another embodiment.

While the following embodiments mention that the DNS query may contain the domain name (or FQDN) in the packet payload, the DNS query may also carry a URL, or significant part of a URL (e.g. FQDN), or host name, or similar information representing the server, the content object that the DNS server may provide, an IP address of the domain name, server, host name, URL, significant part of URL (e.g. FQDN), or a content object. The UPF 110 may detect DNS query packets and inspect the packet payload to apply suitable modification to the packet header and/or forward the DNS query packets to the relevant DNS server, such as local MNO DNS server 116, local public DNS server, MEC DNS server 114.

Step 1: The UE 102 sends an uplink (UL) packet, which is also referred to an UL PDU 502, to the (R)AN node 108.

Step 2: The (R)AN 108 forwards the UL PDU 504 towards the PSA UPF 110.

Step 3: The PSA UPF 110 analyzes the packet header using a PDR or Packet Flow Description (PFD) so that a suitable packet forward action rule (FAR) can be applied.

Step 4a: If the destination IP address of the UL packet is the IP address of the default MNO DNS server 116, this packet may be forwarded to the MSF 216 to analyze the domain name (or FQDN) carried in the packet, for example in the packet payload, or in a packet extension header. If the domain name (or FQDN) belonged to traffic types, or application identifiers, that does not need to be handled by an MEC DNS 114, the PSA UPF 110 forwards the UL PDU 506 towards the default MNO DNS 116.

Note that the default MNO DNS server 116 could be provided by the MNO or by a public DNS. The public DNS may be not managed by the MEC DNS system.

Step 4b: The MNO DNS 116 sends the DL packet 508 containing DNS response towards the UE 102.

Step 4c: The PSA UPF 110 forwards the DL PDU 510 towards the UE 102 via a serving (R)AN node 108.

Step 4d: The (R)AN node 108 sends the DL PDU 512 to the UE 102 over a radio interface, such as a DL data radio bearer (DRB).

Step 5a: If in step 3, if the MSF 216 finds that the domain name (or FQDN) carried in the UL packet payload can be served by an MEC DNS 114, the PSA UPF 110 may send a UL MEC Traffic Handling Request 514 to the SMF 204. This message may carry one or more of the following information: UE information (such as UE ID, PDU Session ID, QoS Flow ID), a copy of the UL PDU, or a time stamp of the UL MEC Traffic Handling Request. The time stamp could be the time the UPF 110 received the UL packet, or the time the UPF 110 sends the UL MEC Traffic Handling Request 514 to the UPF 110.

Step 5b: The SMF 204 receives the UL MEC Traffic Handling Request 514 from the PSA UPF 110 and reads the content of UL packet payload. The SMF 204 may have a mapping between domain name (or FQDN) and the IP address of the MEC DNS server 114, and may be a mapping between the domain name (or FQDN) and IP address(es) of the MEC servers 112 (or DNAI) that can serve the UE request 502. The SMF 204 may send a message UL MEC Traffic Handling Response 516 to the PSA UPF 110. The UL MEC Traffic Handling Response 516 message may contain one or more of following information: UE information, traffic routing information.

The UE information may include one or more of following information: A new IP address or IP prefix to be assigned to the UE 102. This new IP address or IP prefix may be sent also by the SMF 204 to the UE 102 in an N1 non-access-stratum (NAS) message so that the UE 102 may use this new IP address or IP prefix to establish a new QoS flow or a new PDU session to communicate with the MEC server 112. The new IP address may be also a temporary IP address or IP prefix to replace the actual IP address or IP prefix of the UE 102 to hide the real UE identity.

The traffic routing information may include one or more of following information: IP address of the MEC DNS server.

If the UL traffic is to be handled by another UPF, such as UPF 130, the N9 tunnel information is included, which contains the UPF address (for example IP address or (FQDN)) and UL N9 Tunnel Endpoint ID (TEID) of another UPF.

The SMF 204 may store the information received in UL MEC Traffic Handling Request 514 and the information derived from the UL PDU to the UE context, or the PDU Session Context, or QoS flow context, or in a DNS Query Context. The derived information may contain the time the UE 102 sent the DNS query or the domain name (or FQDN) of the requested service (e.g. the domain name (or FQDN) mapped to a specific MEC service). If the time stamp was not included in the UL MEC Traffic Handling Request 514, the SMF 204 may store another time stamp, which may indicate the time the SMF 204 received the UL MEC Traffic Handling Request 514.

Step 6: The PSA UPF 110 may use the information provided by the SMF 204 or pre-configured routing information to process the UL packet.

The MSF 216 may replace the UE source IP address or IP prefix by another IP address or IP prefix associated by this PSA UPF 110. The replaced source IP address or IP prefix may be provided by the SMF 204 in step 5b, or the PSA UPF may assign the replaced source IP address or IP prefix for the UE 102.

The MSF 216 may replace the destination IP address or IP prefix by another IP address or IP prefix. The replaced destination IP address or IP prefix may be provided by the SMF 204 in step 5b. The PSA UPF 110 may itself have a locally configured IP address or IP prefix or an IP address or IP prefix provided by the SMF 204 or OAM previously. This may include a mapping between the destination IP address (or destination IP prefix) and/or domain name (or FQDN) carried in the UL packet and the replaced destination IP address (or destination IP prefix). The replaced destination IP address or IP prefix may be the IP address or IP prefix of the MEC DNS server 114, which may be configured in the UPF 110 to serve UE's DNS queries in some specific locations, or specific geographical locations, geographical zones, or specific (R)AN nodes (represented by (R)AN node ID, or cell ID), or specific domain names (or FQDNs).

Step 6 may be optional. The PSA UPF 110 may have an N6 tunnel connection with the MEC DNS server 114. The UL PDU may be sent without modification to the MEC DNS server 114 over the N6 tunnel connected to the MEC DNS server 114.

Step 7a: The PSA UPF 110 may send the UL PDU 518, possibly with modification to the packet header in step 6, over the N6 interface to the MEC DNS sever 114. The N6 interface could be a tunnel, like an IP tunnel, where the UL PDU 518 is wrapped in an IP packet.

In case the N6 interface is a tunnel, such as an IP tunnel, the UL PDU may not be modified in step 6. The UL PDU carries the source IP address or source IP prefix of the UE 102.

Step 7b: The MEC DNS server 114 receives the DNS query. The MEC DNS server 114 uses the source IP address or IP prefix of the received UL PDU to identify suitable MEC servers, such as MEC server 112, which may be represented by IP address(es). The MEC DNS server 114 sends a DL PDU 520 to the UE 102, via the PSA UPF 110. The DL PDU 520 may carry a DNS response message, which may include one or more of IP addresses of MEC servers that the UE may establish a connection with.

Step 8: The PSA UPF 110 may detect that the DL packet comes from a MEC DNS 114, for example by examining the source IP address/IP prefix, and/or the destination IP address, or whether the packet sent over the DL N6 tunnel is connected with a MEC DNS server 114. The PSA UPF 110 may send a DL MEC Traffic Handling Request 522 to the SMF 204 over an interface, such as N4 interface or a service-based interface. The DL MEC Traffic Handling Request 522 message may contain a copy of the received DL PDU, and UE information (e.g. UE ID, PDU Session ID, QoS Flow ID), and a time stamp. The time stamp may indicate the time the PSA UPF 110 receives the DL packet.

Step 9: The SMF 204 may receive the message DL MEC Traffic Handling Request 522 from the PSA UPF 110. The SMF 204 may analyze the DL PDU 520, and may refer to the information received in step 5a to understand whether the DL PDU 520 contains a DNS response that corresponds to the DNS query 502 previously sent by the UE 102 and the context information of the DNS query stored in the SMF 204 in step 5b.

The SMF 204 may read the IP address(es) or IP prefix(es) carried in the DNS response message 520 of the MEC DNS server 114 to know which MEC server 112 may serve the UE. If more than one IP address or more than one IP prefix is provided in the DNS response message, the SMF 204 may select one IP address or one IP prefix of MEC server such that the SMF 204 can select a suitable UPF that can provide UP connection between the UE 102 and the selected MEC server 112. The selected UPF could be the same as or different from the current PSA UPF 110.

If the selected UPF is different from the current PSA UPF 110, the SMF 204 may perform other steps to establish connection between the UE 102 and the newly selected UPF, such as inserting a uplink classifier (ULCL) as described in 3GPP TS 23.501, or inserting one or more intermediate UPF (I-UPF), applying procedure to support SSC mode 2 or 3.

If the current PSA UPF 110 is selected to serve the UE 102, the SMF 204 may modify the DL PDU, for example by removing one or more of IP addresses or IP prefixes that are not selected by the SMF 204.

The SMF 204 may take decision to add UL CL (Uplink Classifier): If the current PSA UPF 110 is not optimal, the SMF 204 may send a PDU Session modification request to the UE 102. The request may include a new IP address or IP prefix assigned to the UE 102 that the UE 102 may use to communicate with the MEC server 112 having IP address in the DNS response message. The SMF 204 may insert a UL CL, which is a specific type of UPF, and connect the UL CL with the current PSA UPF and connect the UL CL with a new PSA UPF. The UL CL will detect the source IP address of UL PDUs and forward the UL PDUs to the new PSA UPF. The UE 102 may use the newly assigned IP address or IP Prefix to communicate with the MEC server 112.

The SMF 204 may take decision to add a BP (Branching Point): If the current PSA UPF 110 is not optimal, the SMF 204 may add a BP between the (R)AN 108 and the current PSA UPF 110. The BP is connected to a new PSA UPF. When the UE 102 sends UL PDUs, the BP may check the destination IP address and forward traffic destined the MEC server 112 to the new PSA UPF. The BP may receive the UL packets sent to the MEC application server 112, the BP may replace the source IP address of the UE with another IP address, which may be provided by the SMF 204 when the BP is inserted by the SMF 204. The replaced source IP address may be associated with the new PSA UPF so that the MEC application server 112 can send DL packets to the UE 102 by using this replaced source IP address. In the DL, when the new PSA UPF received the DL packets, the new PSA UPF will forward the DL PDUs to the BP UPF. The BP UPF may change the destination IP addressed, which is the replaced IP address, by the original IP address of the UE 102. After that, the BP UPF forward the DL PDU towards the UE 102 via the (R)AN 108.

The SMF 204 may take decision to establish a new PDU Session and request the UE 102 to use the new PDU Session to transport packets between the UE 102 and the MEC server 112. During the PDU Session establishment, the SMF 204 may select a new PSA UPF to server the UP connection between the UE 102 and the MEC application server 112.

Step 10: The SMF 204 may send a DL MEC Traffic Handling Response 524 to the UPF 110.

The DL MEC Traffic Handling Response message 524 may include the modified DL PDU, in which only IP address(es) or IP prefix(es) of one or more selected MEC servers are kept in the DL PDU.

The DL MEC Traffic Handling Response message 524 may include UL and DL traffic handling, depending on the selected MEC servers. For example, the message may include an instruction to establish N6 tunnel(s) to the selected MEC server(s) so that later the UE UL PDUs may be sent towards the MEC server over the N6 tunnel.

Step 11: The MSF 216 may process the DL packet that carry the DNS response.

If the UE source IP address was replaced by another UE source IP address in step 6, the MSF 216 may replace the destination IP address (or destination IP prefix) by the IP address (or IP prefix) of the UE 102.

If the destination IP of DNS server was replaced in step 6, the MSF 216 may replace the source IP of MEC DNS 114 by the IP address of the MNO DNS server 116.

Step 11 may be skipped if the DL PDU was received from an N6 tunnel, and/or no modification to the DL packet was made in step 9, and/or no modification to the corresponding UL packet was made in step 6.

Step 12a: The PSA UPF 110 may send the DL PDU towards the UE 102 via (R)AN 108.

Step 12b: The (R)AN 108 forwards the DL PDU 526 to the UE 102 over a radio interface, such as a DL DRB.

Step 13: The UE 102 communicates with the MEC server 112. The UE 102 sends UL packets to and receives DL packets from the MEC server 112.

In the above solution of FIG. 5, the UPF 110 perform traffic detection by the MEC Support Function 216. The operation of the MSF 216 is transparent to the UE 102. The user of the UE 102 does not need to reconfigure the IP address of the local DNS server for discovering IP addresses of MEC servers. This is useful for a UE with high mobility, when the UE moves to a location that far from the default DNS server.

Figure 6:
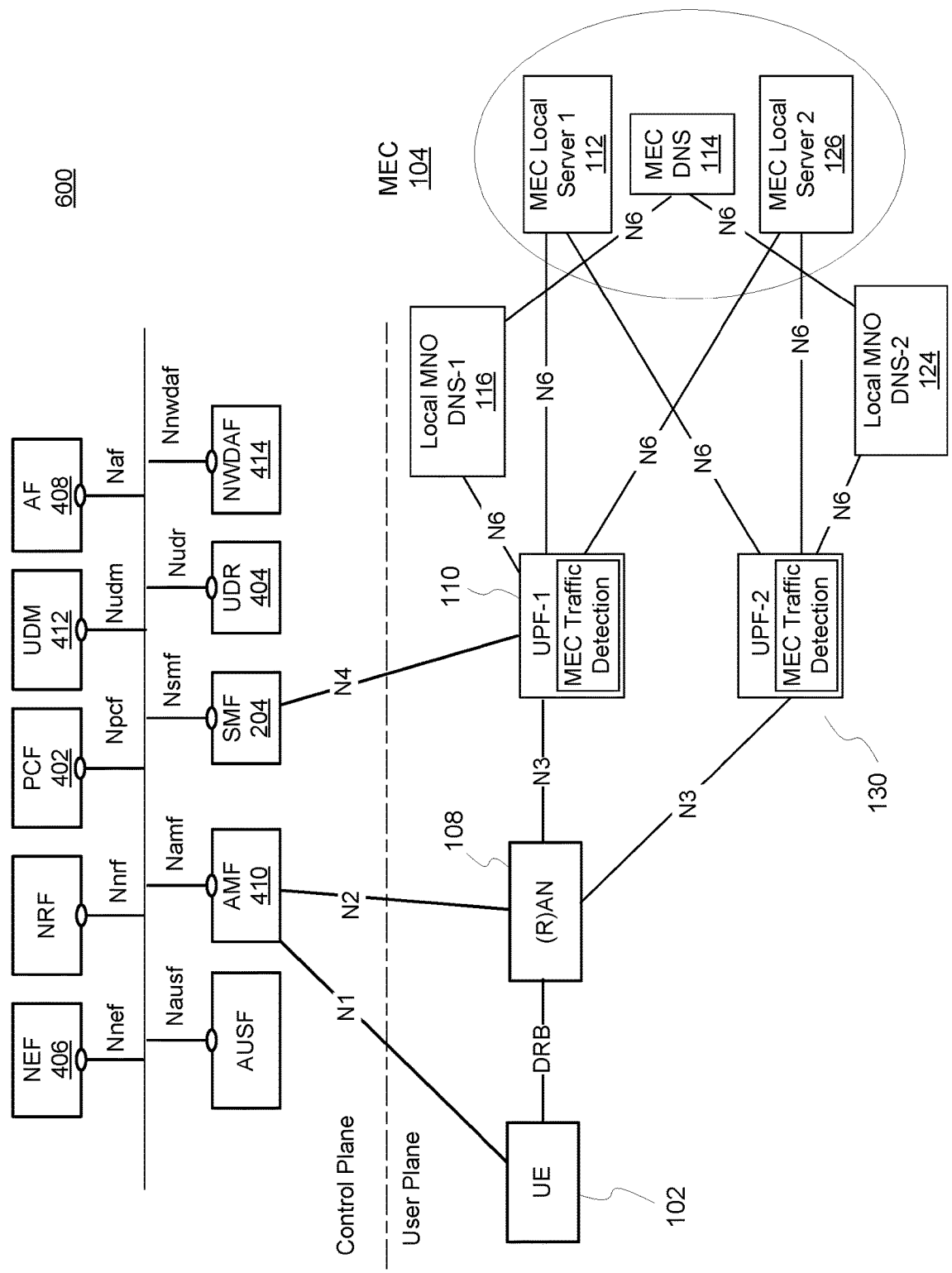
FIG. 6 illustrates, in an example embodiment, a network model to support MEC applications.

FIG. 6 illustrates, in an example embodiment, a network model to support MEC applications. In the embodiment of FIG. 6, the MNO has local DNS servers 116 and 124. However, the UE 102 may be unaware of whether the MNO has local DNS servers or not. The operating system in the UE 102 is configured with a default MNO DNS.

When the UE 102 sends an uplink packet that contain a destination IP address of the default DNS server, which could be a default MNO DNS server, the MEC Support Function (MSF) 216 of the UPF 200 may check the destination IP address of the UL packets and may detect the DNS query sent to the default MNO DNS. The MSF 216 may then read the content of the DNS query message in the PDU payload to identify the domain name (or URL, or FQDN) of the requested content. The MSF 216 may have a mapping between the domain name (or URL, or FQDN) and a local MNO DNS, or the MSF 216 may have a list of domain names (or URLs, or FQDNs) that host MEC applications.

The MSF 216 may notify the SMF 204 about the DNS query for the MEC server 112 or 126 connection. The message may include one or more of following information: the UL PDU, the domain name that the UE 102 is querying, time stamp. The time stamp may indicate the time the UPF receives the UL PDU.

The SMF 204 may have a mapping from the domain name (or FQDN) that can be resolved by a local MNO DNS server. The local MNO DNS server may be represented by one or more IP address(es) of the local MNO DNS server.

The SMF 204 may have a mapping between domain names (or URLs, or FQDNs) and potential MEC servers 112 or 126 (e.g. represented by IP address(es) of MEC servers) that can serve the UE 102. The SMF 204 may cache the DNS responses that have been sent from the MEC DNS 114 to other UEs and may use this DNS responses to create the mapping between domain name (or FQDN) and MEC servers (e.g. represented by IP address(es) of potential MEC servers) that can serve the UE 102.

The SMF 204 may send the IP address of the MEC DNS server to the UPF. The SMF 204 may know the IP address (es) of local MEC DNS server(s) 112 and 126 that may host the applications or web services by caching the DNS responses that the MEC DNS servers 114 have sent to other UEs.

The MSF 216 may replace the destination IP in the UE's UL packet, which is the default IP address of default MNO DNS, by the IP address of the local MNO DNS. The destination IP address of local MNO DNS server could be preconfigured in the UPF (e.g. in the MSF 216) or sent from the SMF 204.

The MSF 216 may also replace the UE 102 IP address (source address) by another IP address or IP prefix associated with the UPF and may be unique to map to the source IP of the UE 102. This replaced IP address can be used to identified which UE has sent a UL DNS query previously so that the UPF can recover the IP header of the DNS response to forward the DL DNS response to the right UE.

The MSF 216 then may send the modified DNS query packet to one of the egress ports of the UPF that is configured to send packets toward the local MNO DNS in the DN. The local MNO DNS receives the DNS query message. The local MNO DNS server may send a DNS query to the (local) MEC DNS server 114. The MEC DNS server 114 may use the IP address of the local MNO DNS server as an indication of the UE location to select a MEC application server. The MEC DNS server 114 sends the IP address of the selected MEC application server to the local MNO DNS server. The local MNO DNS server uses the received DNS response message from the MEC DNS server 114 and creates a DNS response. The local MNO DNS sends the DNS response towards the UE 102 via the PSA UPF.

The PSA UPF may read the payload of DL packets and may detect that the DL packet was sent from a local MNO DNS. The Packet Detection function of the UPF may forward this DL packet to the MSF 216. The MSF 216 may replace the source IP address, which is the IP address of the local MNO DNS, by the IP address of the default MNO DNS that the UE 102 has sent to in the UL DNS query packet. The MSF 216 may then send the modified packet that carries the DNS response to an egress port of the UPF, through the CN Interface Packet Forwarding 210, that provides the DL N3 or N9 connection for the PDU session of the UE 102. The PSA UPF then forward the DL PDU towards the UE 102. The UE 102 receives the packet that carries the DNS response containing IP address of MEC server. The UE 102 uses this IP address to communicate with the MEC server.

Figure 7:
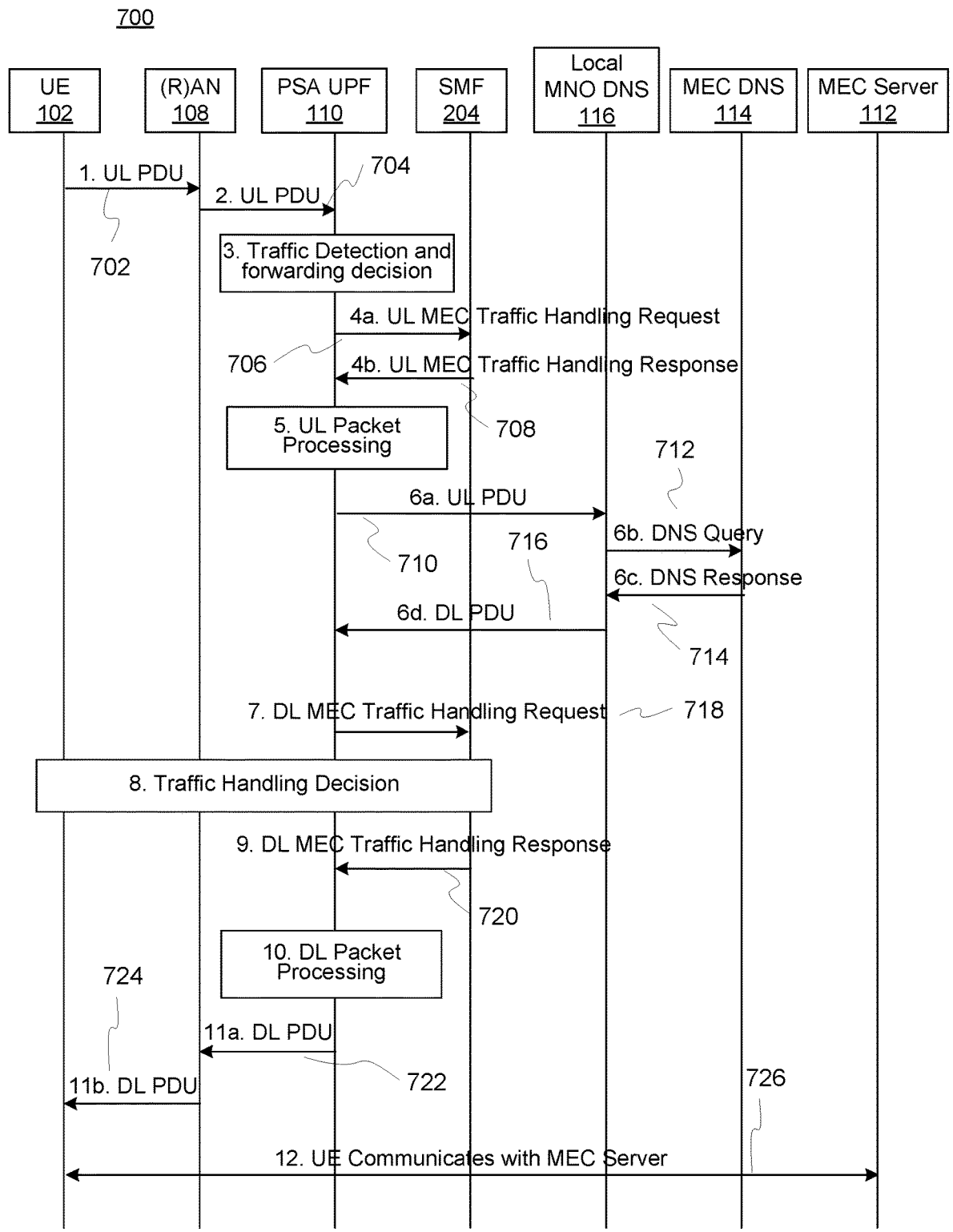
FIG. 7 illustrates, in an example embodiment, a signaling procedure to support MEC data traffic.

FIG. 7 illustrates, in an example embodiment, a signaling procedure to support MEC data traffic, where the MNO may have a local DNS server 116 as illustrated in FIG. 6. The method illustrated allows for the detection of DNS queries contained in UL PDUs and the forwarding of the DNS query to a DNS server in proximity to the UE 102. The method also facilitates address translation to improve the selection of the DNS server and to obscure the address of the UE 102. This method allows for a local MNO DNS server 116 to forward the DNS query to a MEC DNS server 114 without additional action by the UPF 110. It is assumed that the UE 102 has a PDU Session established to support communication between the UE 102 and the DN that hosts the MEC application. During the PDU Session establishment, the SMF 204 provides the UPF 110 with packet detection rules (PDR) and packet forward action rules (FAR), and usage reporting rules (URR). The PDRs may include one or more packet filter sets, and/or one or multiple PFD that can be used to detect DNS queries. Details of this step will be discussed in another embodiment.

Step 1: The UE 102 sends an uplink (UL) packet, which is also referred to an UL PDU 702, to the (R)AN node 108.

Step 2: The (R)AN 108 forwards the UL PDU 704 towards the PSA UPF 110.

Step 3: The PSA UPF 110 analyzes the packet header using PDRs or PFDs so that a suitable packet forward action rule (FAR) can be applied.

If the destination IP address of the UL packet is the IP address of the default MNO DNS server, this packet may be forwarded to the MSF 216 to analyze the URL (or domain name, or FQDN) carried in the packet, for example in the packet payload, or in a packet extension header. If the domain name (or URL, or FQDN) belonged to traffic types, or application identifiers, that does not need to be handled by an MEC DNS 114, the PSA UPF 110 may forward the UL PDU 704 to the default MNO DNS. The default MNO DNS sends the DL PDU carrying the DNS response towards the UE 102. The PSA UPF 110 forwards the DL PDU to the UE 102 via a serving (R)AN node 108. The (R)AN node 108 sends the DL PDU to the UE 102 over a radio interface, such as a DL data radio bearer (DRB). Other steps 4 to 12 can be skipped.

In another solution, the MSF 216 may not need to read the packet payload and may not analyze the URL in the DNS query. Steps 4a and 4b may be skipped. The PSA UPF 110 may change the packet header information in step 5.

Step 4a: If in step 3, if the MSF 216 finds that the domain name (or URL, or FQDN) carried in the UL packet payload 704 can be served by an MEC DNS 114, the PSA UPF 110 may send a UL MEC Traffic Handling Request 706 to the SMF 204. This UL MEC Traffic Handling Request 706 message may carry one or more of following information: UE information (such as UE ID, PDU Session ID, QoS Flow ID), a copy of the UL PDU, a timestamp. The timestamp may be the time the PSA UPF 110, or the MSF 216 receives the UL packet 704. The timestamp may be the time the PSA UPF 110 or the MSF 216 sends the UL MEC Traffic Handling Request 704 to the SMF 204.

Step 4b: The SMF 204 receives the UL MEC Traffic Handling Request 706 from the PSA UPF 110 and reads the content of the UL packet payload. The SMF 204 may have a mapping between the domain name (or URL, or FQDN) and IP address of the MEC DNS server 114, and may be a mapping between the domain name (or URL, or FQDN) and IP address(es) of the MEC application or MEC data servers 112 (or DNAI) that can serve the UE request 702. The SMF 204 may send a message UL MEC Traffic Handling Response 708 to the PSA UPF 110. The message may contain one or more of following information: UE information, traffic routing information.

The UE information may include one or more of following information: A new IP address or IP prefix to be assigned to the UE 102. This new IP address or IP prefix may be sent also by the SMF 204 to the UE 102 in an N1 NAS message so that the UE 102 may use this new IP address or IP prefix to establish a new QoS flow or a new PDU session to communicate with the MEC server 112. The new IP address may be also a temporary IP address or IP prefix to replace the actual IP address or IP prefix of the UE 102 to hide real UE identity and protect UE privacy.

The traffic routing information may include one or more of following information: IP address of the MEC DNS server 114, which could be a local MEC DNS server 116 or a centralized MEC DNS server; or IP address of another MNO DNS server, which could be a local MNO DNS server 116.

If the UL traffic is to be handled by another UPF, the N9 (or another interface) tunnel information is included, which contains the UPF address (for example IP address or FQDN) and UL N9 TEID. The N9 tunnel (or another interface) is used to connect the PSA UPF 110 and another UPF.

The SMF 204 may store the information obtained in the UL MEC Traffic Handling Request 706 in step 4a, for example the UL PDU 704, or the packet header, and/or the domain name (or URL, or FQDN), the timestamp, in the UE context, or the PDU Session Context, or QoS flow context, or in a DNS Query Context. The stored information may contain additional information related to the event, e.g. one or more of following information, the time the UE 102 sent the DNS query, the domain name of the requested service (e.g. the domain name (or URL, or FQDN) mapped to a specific MEC service), the UE location (e.g. represented by the (R)AN node ID, cell ID, UPF ID, geographical zone ID, tracking area ID, registration area ID).

Step 5: The PSA UPF 110 may use the information provided by the SMF 204 or pre-configured routing information, and/or preconfigured IP address translation mapping to process the UL DNS query packet.

The MSF 216 may replace the UE source IP address or IP prefix by another IP address or IP prefix associated with this PSA UPF 110. The replaced source IP address or IP prefix may be provided by the SMF 204 in step 4b. Alternatively, the PSA UPF 110 may assign a replacement IP address or IP prefix for the UE 102, by using one IP address obtained from the IP Address Manager 218 of the UPF 110.

The MSF 216 may replace the destination IP address or IP prefix by another IP address or IP prefix. The replaced destination IP address or IP prefix may be provided by the SMF 204 in step 4b, or the PSA UPF 110 may itself have, locally configured or previously provided by the SMF 204 a mapping between the destination IP address (or destination IP prefix) (which is the IP address or IP prefix of the default MNO DNS server), and/or the domain name (or FQDN) carried in the UL packet, and the replaced destination IP address (or destination IP prefix). The replaced destination IP address or IP prefix may be the IP address or IP prefix of the local MNO DNS server 116, which may be configured in the UPF 110 to serve the UE's DNS queries in some specific locations, or specific geographical locations, geographical zones, or specific (R)AN nodes (represented by (R)AN node ID, or cell ID, or tracking area ID), or specific domain names.

Step 5 may be optional. The PSA UPF 110 may have an N6 tunnel connection with the local MNO DNS server 116. The UL PDU 704 may be sent without modification to the local MNO DNS server 116 over the N6 tunnel connected to the local MNO DNS Server 116.

Step 6a: The PSA UPF 110 may send the UL PDU 710, possibly with modification to the packet header performed in step 5, over the N6 interface to the local MNO DNS server 116. The N6 interface could be a tunnel, like an IP tunnel, where the UL PDU 706 is wrapped in an IP packet.

In case the N6 interface is a tunnel, such as an IP tunnel, the UL PDU may not be modified in step 5. The UL PDU carries the source IP address or source IP prefix of the UE without modification.

Step 6b: The local MNO DNS server 116 receives the DNS query from the UE 102. The local MNO DNS 116 may send a DNS query 712 to the MEC DNS server 112. The DNS query 712 message include the domain name (or URL, or FQDN) that was sent from the UE 102.

Step 6c: The MEC DNS server 114 receives the DNS query 712 from the local MNO DNS 116. The MEC DNS server 114 uses the source IP address or IP prefix of the received DNS query packet 712 to identify suitable MEC servers, which may be represented by IP address(es). The MEC DNS server 114 sends a DNS response 714 to the local MNO DNS server 116. The DL PDU may carry DNS response 714 message, which may include one or more of IP addresses of MEC servers 112 that the UE 102 may establish connection with.

Step 6d: The local MNO DNS 116 receives the DNS response from the MEC DNS 114 and uses this message to create the DNS response to be sent to the UE 102. The local MNO DNS server 116 sends a DL PDU 716 towards the UE 102 via the PSA UPF 110, which carries the DNS response.

Step 7: The PSA UPF 110 may detect that the DL packet comes from local MNO DNS 116, for example by examining the source IP address/IP prefix, and/or the destination IP address, or whether the packet sent over the DL N6 tunnel connected with a local MNO DNS server 116. The PSA UPF 110 may send DL MEC Traffic Handling Request 718 to the SMF 204 over an interface, such as N4 interface or a service-based interface. The DL MEC Traffic Handling Request 718 message may contain a copy of the received DL PDU 716, and UE information (e.g. UE ID, PDU Session ID, QoS Flow ID), and a timestamp. The timestamp may indicate the time the PSA UPF 110, or the MSF 216, receives the DL PDU. The timestamp may indicate the time the PSA UPF 110, or the MSF 216, sends the DL MEC Traffic Handling Request 718 to the SMF 204.

Step 8: The SMF 204 may receive the message DL MEC Traffic Handling Request 718 from the PSA UPF 110. The SMF 204 may analyze the DL PDU and may refer to the information received in step 4a to understand whether the DL PDU contains DNS response that corresponds to the DNS query previously sent by the UE 102 and stored in the SMF 204 in step 5b.

The SMF 204 may read the IP address(es) or IP prefix(es) carried in the DNS response 714 packet of the MEC DNS server 114 to know which MEC server 112 may serve the UE 102. If more than one IP address or more than one IP prefix is provided in the DNS response message 714, the SMF 204 may select one IP address or one IP prefix of a MEC server such that the SMF 204 can select a UPF 110 that can provide connection between the UE 102 and the selected MEC server 112 to meet the QoS requirements in terms of packet delay, and/or the data rate of data flow, and/or traffic load balancing among UPFs. The selected UPF could be the same as or different from the current PSA UPF 110.

If the selected UPF is different from the current PSA UPF 110, other steps may be required to establish connection between the UE 102 and the newly selected UPF, such as ULCL, I-UPF insertion, SSC mode 2 and 3.

If the current PSA UPF 110 is selected to serve the UE 102, the SMF 204 may modify the DL PDU, for example by removing one or more IP addresses or IP prefixes of the application or data servers that are not selected by the SMF 204.

SMF 204 may take decision to add an UL CL: If the current PSA UPF 110 is not optimal, the SMF 204 may send a PDU Session modification request to the UE 102. The request may include a new IP address or IP prefix assigned to the UE so that the UE 102 may use to communicate with the MEC server 112. The SMF 204 may insert a UL CL, referencing an UPF, and connect the UL CL with a new PSA UPF. The UL CL will detect the source IP address of UL PDUs and forward the UL PDUs to the new PSA UPF. The UE 102 may use the newly assigned IP address or IP Prefix to communicate with the MEC server 112. The SMF 204 may take a decision to add a BP (Branching Point): If the current PSA UPF is not optimal, the SMF 204 may add a BP between the (R)AN 108 and the current PSA UPF 110. The BP is connected to a new PSA UPF. When the UE 102 sends UL PDUs, the BP may check the destination IP address and forward traffic destined to the MEC server 112 to the new PSA UPF.

The SMF 204 may take a decision to establish a new PDU Session and request the UE 102 to use the new PDU Session to transport packets between the UE 102 and the MEC server 112.

Step 9: The SMF 204 may send a DL MEC Traffic Handling Response 720 to the UPF 110.

The DL MEC Traffic Handling Response 720 message may include the modified DL PDU, in which only IP address(es) or IP prefix(es) of one or more selected MEC servers may be kept in the DL PDU.

The DL MEC Traffic Handling Response 720 message may include UL and DL traffic handling instructions, depending on the selected MEC server(s). For example, the DL MEC Traffic Handling Response 720 message may include an instruction to establish N6 tunnel(s) to the selected MEC server(s) so that later the UE 102 UL PDUs may be sent towards the MEC server 112 over the N6 tunnel.

Step 10: The MSF 216 may process the DL PDU that carries the DNS response.

If the UE source IP address was replaced by another UE source IP address in step 5, the MSF 216 may replace the destination IP address (or destination IP prefix) in the DL PDU by the IP address (or IP prefix) of the UE 102.

If the destination IP of DNS server was replaced in step 5, the MSF 216 may replace the source IP of local MNO DNS 116 by the IP address of the MNO DNS server that was in the UL PDU DNS query.

Step 10 may be skipped if the DL PDU was received from an N6 tunnel, and/or no modification to the DL packet was made in step 9, and/or no modification to the corresponding UL packet was made in step 5.

Step 11a: The PSA UPF 110 may send the DL PDU 722 towards the UE 102 via the (R)AN 108.

Step 11b: The (R)AN 108 forwards the DL PDU 724 to the UE 102 over a radio interface, such as a DL DRB.

Step 12: The UE 102 communicates with the MEC server 112. The UE 102 sends and received UL packets and DL packets 726 to and from the MEC server 112.

In the above embodiment of FIG. 7, the UPF 110 perform traffic detection by the MEC Support Function 216. The operation of the MSF 216 is transparent to the UE 102. The user of the UE 102 does not need to reconfigure the IP address of local MNO DNS server 116 for discovering IP addresses of MEC servers 112. This is useful for a UE with high mobility, when the UE moves to a location that far from the default DNS server.

In the methods described in FIGS. 5 and 7, the UE 102 may send a DNS query containing a domain name (or URL, or FQDN) in order to find the IP address(es) of server(s) that host the domain name (or URL, or FQDN). Alternatively, the UE 102 may send a DNS query that contains a URL, or significant part of URL (e.g. FQDN) in order to find the IP address of server(s) that hosts the URL.

Figure 8:
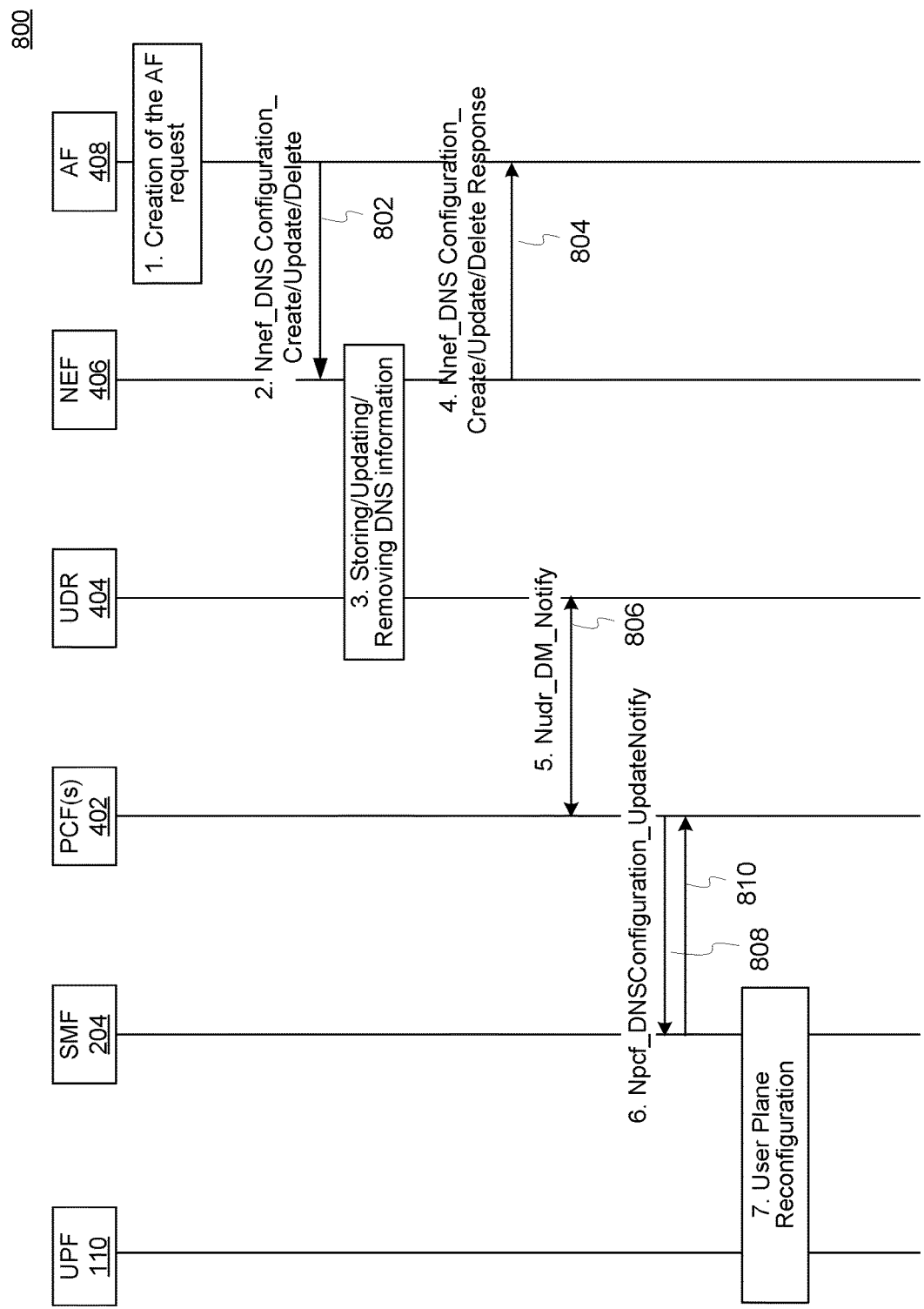
FIG. 8 illustrates, in an example embodiment, a signaling procedure for an application function (AF) to provide a domain name system (DNS) selection configuration to the mobile network.

FIG. 8 illustrates, in an example embodiment, a signaling procedure 800 for an application function (AF) to provide a domain name system (DNS) selection configuration to the mobile network. The method allows for the AF to configure or update a DNS selection configuration that is stored in a UDR 404 to be accessed by the UPF 110. The AF of a MEC system may provide information on a DNS server selection configuration as shown in FIG. 8. This procedure supports the UE 102 being served by a home public land mobile network (HPLMN) and visiting PLMN in roaming scenarios.

Step 1: The AF 408 may create a request to provide a new DNS Configuration, or to modify or delete an existing DNS Configuration.

The AF may invoke a service of the NEF 406, such as a Nnef_DNSConfiguration_Create 802 service operation to provide a new DNS Configuration. The message 802 may contain one or more of the following parameters for DNS Configuration:

AF Transaction ID;

One or more of packet filter sets to identify traffic sent to or received from MEC DNS servers 112, which may include one or more of following information of MEC DNS servers: IP address(es), IP prefix(es), port number (e.g. UDP or TCP port numbers), DNAI that provide access to the DN hosting MEC servers.

Serving location(s) of each MEC DNS server 112: may be represented, for example, by geographical zones, a list of (R)AN node IDs, a list of cell IDs or (R)AN, a list tracking area IDs, a list of DNAIs.

For each MEC DNS server 112 (may be represented by IP address of the MEC DNS server 112): a list of domain names, or a list of URLs, or a list of significant part of URLs (such as FQDN) that can be resolved by this MEC DNS server.

Alternatively, for all MEC DNS servers 112: a list of domain names, or a list of URL, or a list of significant parts of URLs (such as FQDNs), that can be resolved by all MEC DNS servers 112.

The address (IP or Ethernet) of the UEs if available, Generic Public Subscription Identifiers (GPSIs) of UEs if available, DNN that hosts MEC applications if available, S-NSSAI(s) that can provide connection to MEC server(s) 112 if available, External Group Identifier of UE groups if available, application identifier of MEC application or traffic filtering information, AF-Service-Identifier, a list of DNAI(s) and corresponding routing profile ID(s) or N6 traffic routing information, indication of application relocation possibility.

To update an existing request, the AF 408 may invoke a service of the NEF 406, for example the Nnef_DNSConfiguration_Update service of the NEF 406. The AF 408 may provide an AF Transaction Id that was provided when creating a DNS Configuration. The AF 408 may provide new values of parameters of the DNS Configuration.

To remove an existing request, the AF 408 may invoke a service of the NEF 406, for example the Nnef_DNSConfiguration_Delete service operation, by providing the corresponding AF Transaction Id that was provided when creating a DNS Configuration.

Step 2: The AF 408 sends its request 802 to the NEF 406. The NEF 406 ensures the necessary authorization control, including throttling of AF 408 requests and, as described in clause 4.3.6.1 of 3GPP TS 23.502 (Release 16, version 16.0.2, published in Apr. 1, 2019), mapping from the information provided by the AF 408 into information needed by the 5GCN.

Step 3: In the case of Nnef_DNSConfiguration_Create or Nnef_DNSConfiguration_Update: The NEF 406 stores the AF request information in the Unified Data Repository (UDR) 404, for example by providing parameters (Data Set=Application Data; Data Subset=DNS Configuration information, Data Key=AF Transaction Internal ID, S-NSSAI and DNN and/or Internal Group Identifier or Subscription Permanent Identifier (SUPI), and/or Application ID) for the application data to be stored in the UDR 404.

The AF Transaction Internal ID, and/or S-NSSAI and/or DNN, and/or Application ID, and/or Internal Group Identifier or SUPI may be regarded as a Data Key when the AF request information are stored into the UDR 404.

In the case of Nnef_DNSConfiguration_Delete: The NEF 406 deletes the AF requirements in the UDR 404, for example by providing parameters (Data Set=Application Data; Data Subset=DNS Configuration information, Data Key=AF Transaction Internal ID) of the data records to be deleted.

Step 4. The NEF 406 responds 804 to the AF 408 to confirm whether the service request in step 2 has been performed.

Step 5. The PCF(s) 402 that have subscribed to modifications of AF requests (Data Set=Application Data; Data Subset=DNS Configuration, Data Key=S-NSSAI and DNN and/or Internal Group Identifier, and/or SUPI, and/or Application ID) receive(s) a Nudr_DM_Notify notification of data change 806 from the UDR 404.

Step 6. The PCF 402 may provide updates 808 to the SMF 204 with a new or modified DNS Configuration Policy by invoking a service of the PCF 402, for example an existing PCF service Npcf_SMPolicyControl_UpdateNotify specified in 3GPP TS 23.502, or a new PCF service like Npcf_DNSConfiguration_Update operation described later.

The DNS Configuration Policy may include one or more of following information provided by the AF 408 in step 2 and may include additional information configured by the PCF 402 as follows.

- DNS Configuration Policy Identifier (ID)
- The address(es) (e.g. IP address, IP prefix) of MEC DNS servers 114.
- Serving location(s) of each MEC DNS server 114 may be represented, for example, by a list of (R)AN node IDs, a list of cell IDs or (R)AN, a list tracking area IDs, a list of DNAIs.
- For each MEC DNS server 114 (may be represented by MEC DNS address): a list of domain names, a list of URLs or a list of significant part of URLs (such as FQDNs) that can be resolved by this MEC DNS server 114.
- Alternatively, for all MEC DNS servers 114: a list of domain names, or a list of URLs, or a list of significant parts of URLs (such as FQDNs) that can be resolved by all MEC DNS servers 114.
- The address (IP or Ethernet) of the UEs 102 if available, GPSIs of UEs 102 if available, DNN that hosts MEC applications if available, S-NSSAI(s) that can provide connection to MEC server(s) 112 if available, External Group Identifier of UE groups if available, application identifier of MEC application or traffic filtering information, AF-Service-Identifier, a list of DNAI(s) and corresponding routing profile ID(s) or N6 traffic routing information, Indication of application relocation possibility.

Step 7. When a DNS Configuration Policy is received from the PCF 402, the SMF 204 may take appropriate actions to reconfigure the UPF(s) 110 managed by the SMF 204, such as:

- Create, modify, or delete Packet Detection Rule (PDR) and packet Forwarding Action Rule (FAR) to be configured in the UPF 110. The PDR and FAR is described in 3GPP TS 23.501, and are provided below as an example, including DNS Configuration parameters.
- Send the DNS Configuration parameters to the UPF 110 for UL and DL traffic detection and forwarding rules.
- Send a request to the UPF 110 to establish N6 tunnel(s) with MEC DNS servers 114. The UPF 110 may use the DNS Configuration parameters, such as IP address(es) (or IP prefix(es)) of the MEC DNS servers 114, port number(s) of MEC DNS servers, Furthermore, the SMF 204 may configure user plane of the existing PDU Session such as:

- Adding, replacing or removing a UPF 110 in the data path to, for example, act as an UL CL or a Branching Point e.g. as described in clause 4.3.5 of 3GPP TS 23.502.
- Allocate a new IP address, or a new Prefix to the UE (when IPv6 multi-Homing applies).
- Updating the UPF 110 in the target DNAI with new traffic steering rules.

The following table describes the Packet Detection Rule (PDR) containing information required to classify a packet arriving at the UPF 110. Every PDR is used to detect packets in a certain transmission direction, e.g. UL direction or DL direction:

| Attribute | | Description | Comment |
| --- | --- | --- | --- |
| N4 Session ID | | Identifies the N4 session associated to this PDR | |
| Rule ID | | Unique identifier to identify this rule | |
| Precedence | | Determines the order, in which the detection information of all rules is applied | |
| Packet detection information | Source interface | Contains the values "access side", "core side", "SMF", "N6-LAN", "5G LAN internal", "5G LAN N19" | Combination of UE IP address (together with Network instance, if necessary), CN tunnel info, packet filter set, application ID, Ethernet PDU Session |
| | UE IP address | One IPv4 address and/or one IPv6 prefix with prefix length (NOTE 3) | |
| | Network instance (NOTE 1) | Identifies the Network instance associated with the incoming packet | Information and QFI are used for traffic detection. Source interface identifies the interface for incoming packets where the PDR applies, e.g. from access side (i.e. up-link), from core side (i.e. down-link), from SMF 204, from N6-LAN (i.e. the DN or the local DN), from "5G LAN internal" (i.e. local switch), or from "5G LAN N19" (i.e. N19 interface). Details like all the combination possibilities on N3, N9 interfaces are left for stage 3 decision. The packet filter set may be used to detect traffic sent to or received from the MNO DNS servers 116, or MEC DNS servers 114. |
| | CN tunnel info | CN tunnel info on N3, N9 interfaces, i.e. F-TEID | |
| | Packet Filter Set | Details see clause 5.7.6, 3GPP TS 23.501. | |
| | Application ID | | |
| | QoS Flow ID | Contains the value of 5QI or non-standardized QFI | |
| | Ethernet PDU Session Information | Refers to all the (DL) Ethernet packets matching an Ethernet PDU session, as further described in clause 5.6.10.2 and in TS 29.244 [65]. | |
| | Framed Route Information | Refers to Framed Routes defined in clause 5.6.14 | |

| Attribute | Description | Comment |
| --- | --- | --- |
| Outer header removal | Instructs the UP function to remove one or more outer header(s) (e.g. IP + UDP + GTP, IP + possibly UDP, VLAN tag), from the incoming packet. | Any extension header shall be stored for this packet. |
| Domain name, or FQDN, or URL Detection | Instructs the UPF 110 whether to read the domain name, or FQDN, or URL in the packet payload if the packet filter is matched with Packet Filter Sets or PFDs. | |
| Domain Name (or QFDN) List ID | The ID of Domain Name (or FQDN) List | |
| Domain Name (or FQDN) List | The list of Domain Names (or FQDNs) | |
| URL List ID | The ID of URL List | |
| URL List | The list of URLs | Contain the URLs that can be resolved by MEC DNS server(s) 114 matching Packet Filter Set. |
| Forwarding Action Rule ID (NOTE 2) | The Forwarding Action Rule ID identifies a forwarding action that has to be applied. | |
| Multi-Access Rule ID (NOTE 2) | The Multi-Access Rule ID identifies an action to be applied for handling forwarding for a MA PDU Session. | |
| List of Usage Reporting Rule ID(s) | Every Usage Reporting Rule ID identifies a measurement action that has to be applied. | |
| List of QoS Enforcement Rule ID(s) | Every QoS Enforcement Rule ID identifies a QoS enforcement action that has to be applied. | |

(NOTE 1):
Needed e.g. in case:
UPF 110 supports multiple DNN with overlapping IP addresses.
UPF 110 is connected to other UPF or AN node in different IP domains.
UPF 110 "local switch" and N19 forwarding is used for different 5G LAN groups.
(NOTE 2):
Either a FAR ID or a MAR ID is included, not both.
(NOTE 3):
The SMF 204 may provide an indication asking the UPF 110 to allocate one IPv4 address and/or IPv6 prefix. When asking to provide an IPv6 Prefix the SMF 204 provides also an IPv6 prefix length.

The following table describes the Forwarding Action Rule (FAR) that defines how a packet shall be buffered, dropped or forwarded, including packet encapsulation/decapsulation and forwarding destination:

| Attribute | Description | Comment |
| --- | --- | --- |
| N4 Session ID | Identifies the N4 session associated to this FAR. | |
| Rule ID | Unique identifier to identify this information. | |
| Action | Identifies the action to apply to the packet | Indicates whether the packet is to be forwarded, duplicated, dropped, replaced destination (IP) header, replaced source (IP) header, or buffered. When action indicates forwarding or duplicating, a number of additional attributes are included in the FAR. For buffering action, a Buffer Action Rule is also included. |
| Network instance (NOTE 2) | Identifies the Network instance associated with the outgoing packet (NOTE 1). | |
| Destination interface (NOTE 3) (NOTE 7) | Contains the values "access side", "core side", "SMF", "N6-LAN", "5G LAN internal" or "5G LAN N19". | Identifies the interface for outgoing packets towards the access side (i.e. down-link), the core side (i.e. up-link), the SMF 204, the N6-LAN (i.e. the DN or the local DN), to 5G LAN internal (i.e. local switch), or to 5G LAN N19 (i.e. N19 interface). |
| Outer header creation (NOTE 3) | Instructs the UP function to add an outer header (e.g. IP + UDP + GTP + QFI, VLAN tag), IP + possibly UDP to the outgoing packet. | Contains the CN tunnel info, N6 tunnel info or AN tunnel info of peer entity (e.g. NG-RAN, another UPF 110, SMF 204, local access to a DN represented by a DNAI). Any extension header stored for this packet shall be added. The outer header may be a tunnel |

| Attribute | Description | Comment |
| --- | --- | --- |
| | | header of a tunnel that connects the UPF 110 with a MEC DNS server 114, or with a (local) MNO DNS server 116. |
| Send end marker packet(s) (NOTE 2) | Instructs the UPF 110 to construct end marker packet(s) and send them out as described in clause 5.8.1. | This parameter should be sent together with the "outer header creation" parameter of the new CN tunnel info. |
| Transport level marking (NOTE 3) | Transport level packet marking in the uplink and downlink, e.g. setting the DiffServ Code Point. | |
| Forwarding policy (NOTE 3) | Reference to a preconfigured traffic steering policy or http redirection (NOTE 4). | Contains one of the following policies identified by a TSP ID: an N6-LAN steering policy to steer the subscriber's traffic to the appropriate N6 service functions deployed by the operator, or a local N6 steering policy to enable traffic steering in the local access to the DN according to the routing information provided by an AF as described in clause 5.6.7. or a Redirect Destination and values for the forwarding behaviour (always, after measurement report (for termination action "redirect")). |
| Request for Proxying in UPF 110 | Indicates that the UPF 110 shall perform ARP proxying and/or IPv6 Neighbour Solicitation Proxying as specified in clause 5.6.10.2. | Applies to the Ethernet PDU Session type. |
| Container for header enrichment (NOTE 2) | Contains information to be used by the UPF 110 for header enrichment. | Only relevant for the uplink direction. |
| Replacing destination (IP) header rule | Instructs the UPF 110 to replace destination header, e.g. IP header (may include one or more fields such as destination IP address, protocol header field), by another destination header. The original destination header may be stored in the PDU Session Context. | Example: In the UL, if the UPF 110 detects DNS query packet sent to an MNO DNS server 116, the UPF 110 replaces the destination IP header, by the destination IP header of MEC DNS server 114, or by the destination IP header of local MNO DNS server 116. Example; in the DL, if the UPF 110 detects a DNS response packet sent from MNO DNS server 116 (or local MNO DNS server), or MEC DNS server 114, to a UE 102 that the destination IP header of the UE 102 was replaced earlier, the UPF 110 replaces the destination IP header by the original destination IP header, which is the IP address of the UE 102. |
| Replacing source (IP) header rule | Instructs the UPF 110 to replace source header, for example source IP header (may include the source IP address), of packets by another source header for packets. The original source packet header of UE 102 may be stored in the PDU Session Context. | Example: In the UL, if the UPF 110 detects a DNS query packet sent to a default MNO DNS server 116, the UPF 110 replaces the original source IP address by another unique IP address. Example: in the DL, if the UPF 110 detects a DNS response packet sent from an MEC DNS server 114, or from a local MNO DNS server 116, to the UE 102, the UPF 110 may replace the source IP header of MEC DNS server 114 (or the source IP header of the local MNO DNS server 116) by the source IP header of default MNO DNS server 116. |

| Attribute | Description | Comment |
|---|---|---|
| Buffering Action Rule (NOTE 5) | Reference to a Buffering Action Rule ID defining the buffering instructions to be applied by the UPF 110 (NOTE 6) | |

(NOTE 1):
Needed e.g. in case:
UPF 110 supports multiple DNN with overlapping IP addresses.
UPF 110 is connected to other UPF or NG-RAN node in different IP domains.
UPF 110 "local switch" and N19 forwarding is used for different 5G LAN groups.
(NOTE 2):
These attributes are required for FAR action set to forwarding.
(NOTE 3):
These attributes are required for FAR action set to forwarding or duplicating.
(NOTE 4):
The TSP ID is preconfigured in the SMF, and included in the FAR according to the description in clauses 5.6.7 of 3GPP TS 23.501, and 6.1.3.14 of 3GPP TS 23.503 (Release 16, version 16.0.0, published in Mar. 26, 2019) for local N6 steering and 6.1.3.14 of 3GPP TS 23.503 for N6-LAN steering. The TSP ID action is enforced before the Outer header creation actions.
(NOTE 5):
This attribute is present for FAR action set to buffering.
(NOTE 6):
The buffering action rule is created by the SMF and associated with the FAR in order to apply a specific buffering behaviour for DL packets requested to be buffered, as described in clause 5.8.3 and clause 5.2.4 in 3GPP TS 29.244 (Release 15, version 15.5.0, published in Mar. 22, 2019).
(NOTE 7):
The use of "5G LAN Internal" instructs the UPF to send the packet back for another round of ingress processing using the active PDRs pertaining to another N4 session of the same 5G LAN. To avoid that the packet matches again the same PDR, it is assumed that the packet has been modified in some way (e.g. tunnel header has been removed, the packets being received from the source interface 5G LAN Internal of the same 5G LAN).

The AF 408 may provide a PFD to the mobile network by using a service Nnef_PFDManagement_Create of the NEF 406 as described in clause 5.2.6.3.6 of 3GPP TS 23.502. The PFD is a set of information to detect application traffic. The PFD may include additional DNS-related information so that the mobile network can use the DNS related information to identify which MEC DNS server 114 or local MNO server 116 may be used to resolve DNS query from the UE 102. The PFD for MEC DNS servers 114 sent from the AF 408 may include one or more of following parameters:

- A 3-tuple including protocol, server side IP address (i.e. the IP address of MEC DNS server 114) and port number of MEC DNS server 114.
- A list of URLs or a list of significant parts of the URL (such as FQDN) to be matched, e.g. host name, domain name (or FQDN), that their IP address can be resolved by the MEC DNS server 114.
- A list of domain names (or FQDNs), or a list of host names, that their IP address can be resolved by the MEC DNS server 114.
- A domain name (or FQDN) matching criteria and information about applicable protocol(s).

Based on the agreement between the AF 408 and mobile operator, the PFD can be designed to convey proprietary extension for proprietary application traffic detection mechanisms.

- Location information: Indicate the locations of the UEs 102 that can be served by the MEC DNS server 114. The UE 102 location may be represented by one or more of following parameters: one or more geographic zone IDs, one or more cell IDs or (R)AN, one or more (R)AN node IDs, one or more ranges of IP address(es) or IP prefix(es), one or more geographical areas where each area is a polygon described, e.g. by a list of edges.
- DNN(s) of the DN that hosts CDN or MEC applications.
- Network slice information (e.g. S-NSSAI(s), NSI(s)) of the mobile network.
- External Group ID.
- AF-Service-ID.
- Application ID.

Figure 9:
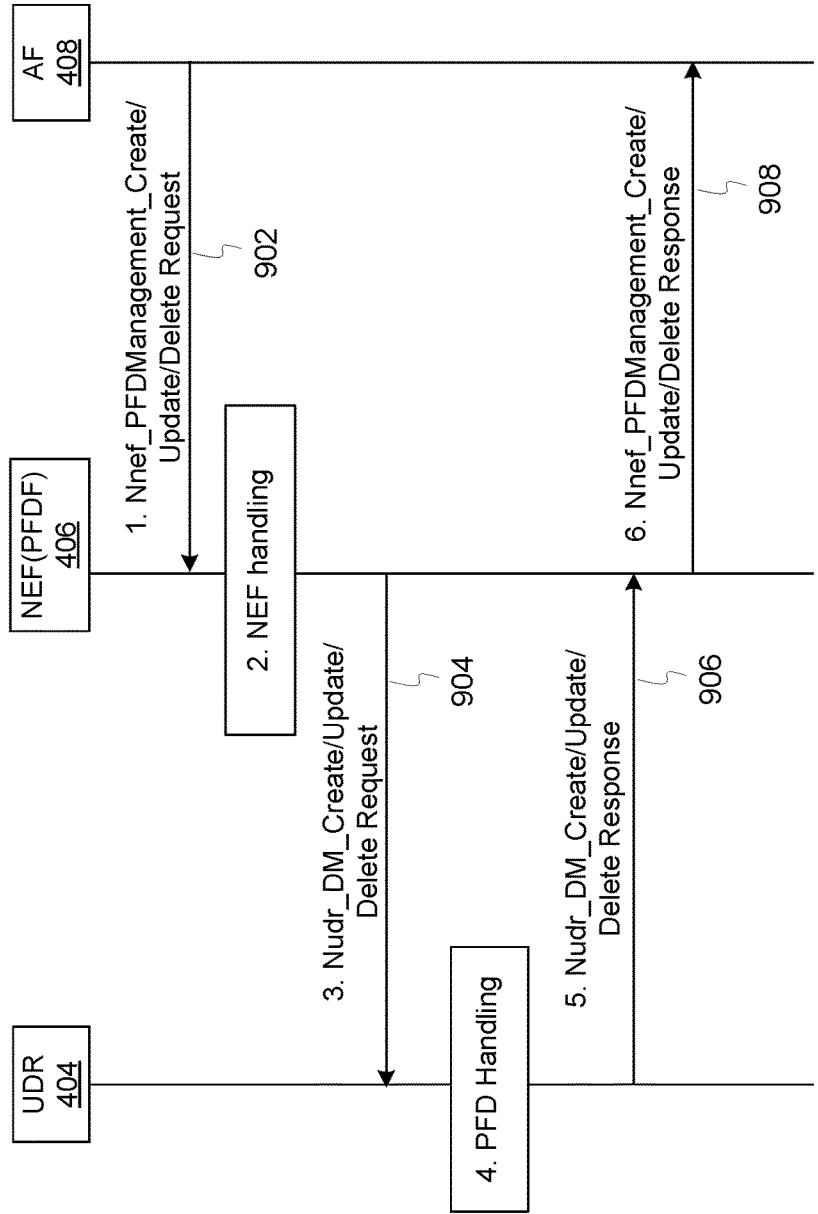
FIG. 9 illustrates, in an example embodiment, a signaling procedure for an AF to provide packet flow descriptions together with DNS configuration to the mobile network

A procedure in FIG. 9, which is similar to that described in clause 4.18.2 of 3GPP TS 23.502 for PFD management via a NEF may use the AF 408 to provide a PFD to support DNS traffic. The method allows for an AF 404 to manage packet flow descriptions (PFD)s, used by the UDR 404 to detect traffic to and from MEC DNS server 114.

Step 1: The AF 408 of a CDN or MEC system may invoke the Nnef_PFDManagement_Create/Update/Delete 902 service to create, update, or delete PFDs that are used to detect traffic sent to or received from MEC DNS servers 114. The services Nnef_PFDManagement services of the NEF 406 are described in clause 5.2.6.3 of 3GPP TS 23.502. Some new input parameters to support DNS queries are described above. The AF 408 may create a new PFD with DNS related parameters by using the Nnef_PFDManagement_Create service. The AF 408 may update the DNS related parameters by using the Nnef_PFDManagement_Update service. The AF 408 may delete a PFD with DNS related parameters by using Nnef_PFDManagement_Delete service.

Step 2: The NEF 406 checks whether the AF 408 is authorized to perform this request based on the operator policies. The NEF 406 may convert the information provided by the AF 408 into operation parameters of the mobile network. For example, the location information may include a list of geographic zone IDs. The NEF 406 may convert the geographic zone ID into the list of cell IDs of RAN 108, or the list of RAN node IDs. The NEF 406 may convert the External Group ID to an Internal Group ID. The External (or Internal) Group ID represents the group ID of users.

Step 3: The NEF 406 (or the Packet Flow Description Function (PFDF) of the NEF 406) may invoke the Nudr_DM_Create/Update/Delete 904 of the UDR 404 to provide a PFD to the UDR 404. The Nudr_DM services are described in clause 5.2.12.2 of 3GPP TS 23.502. Some modifications to support DNS-related parameters are presented in the present document. The stored PFD may include some information converted by the NEF 406 in step 2. The NEF 406 may send one or more of following information to the UDR 404: Application Identifier, one or more sets of PFDs, Allowed Delay.

Step 4: The UDR 404 updates the list of PFDs for the Application Identifier.

Step 5: The UDR 404 sends a Nudr_DM_Create/Update/Delete Response 906 to the NEF (PFDF) 406.

Step 6: The NEF 406 sends Nnef_PFDManagement_Create/Update/Delete Response 908 to the AF 408.

The MNO may create PFDs in the UDR 404 to support detection and forwarding of traffic that sent to or received from the local MNO DNS servers 116. The mobile network control function (such as Operations, Administration and Maintenance (OAM) function) may use some information provided in the MEC DNS PFD to create the MNO DNS PFD, which may include one or more of following information:

- Aa 3-tuple including protocol, server side IP address (i.e. the IP address of central MNO DNS server, or IP address of local MNO DNS 116) and port number of server.
- A list of URLs or a list of significant parts of the URL (such as FQDN) to be matched, e.g. host name, domain name (or FQDN). This information is provided by the AF 408, for example in the MEC DNS PFD.
- A list of domain names (or FQDN), or a list of host names, that can be resolved by the MEC DNS server 114. This information is provided by the AF, for example in the MEC DNS PFD.
- A Domain name (or FQDN) matching criteria and information about applicable protocol(s).

Based on the agreement between the AF 408 and mobile operator, the PFD can be designed to convey proprietary extension for proprietary application traffic detection mechanisms.

- Location information: This information may be provided by the AF 408, for example in the MEC DNS PFD, or by the operator network or policy designs. The location indicates the locations of the UEs that can be served by the MEC DNS server 112. The UE location may be represented by one or more of following parameters: one or more geographic zone IDs, one or more cell IDs or (R)AN, one or more (R)AN node IDs, one or more ranges of IP address(es) or IP prefix(es), one or more geographical areas where each area is a polygon described, e.g. by a list edges.

The SMF 204 may receive the MNO DNS PFD(s) and/or MEC DNS PFD(s) from the NEF 406 (or PFDF of the NEF) as described in clause 4.18.3.1 "PFD Retrieval by the SMF" of 3GPP TS 23.502. The SMF 204 may create PDR, FAR, and URR for existing or future PDU sessions and QoS flows to support traffic sent to or received from the MNO DNS, local MNO DNS 116 and MEC DNS 114, public DNS. For example, from the location information in the MNO DNS PFD, and/or local MNO DNS PFD, and/or MEC DNS PFD, the SMF 204 may select one or more UPFs 110 that can provide connection to the RAN nodes and DN. The SMF 204 may send to the selected UPF(s) 110 the PDR and FAR that are used to handled PDUs sent to or received from the MNO DNS 116 servers, such as default MNO DNS servers and local MNO DNS servers 116. For example, some UE location can be served by default MNO DNS server, the SMF 204 may not send PDR and FAR that are required to handle traffic DNS traffic detection and forwarding. Some UE locations that may be need a local MNO DNS 116 server or MEC DNS server 114, the SMF 204 may send the PDR and FAR that are required to detect and forward DNS query to the local MNO DNS server 116 or the MEC DNS server 114.

In some other embodiments, the SMF 204 may receive the MNO DNS PFD(s) and/or MEC DNS PFD(s) from the NEF 406 (or the PFDF of NEF). Using the information in MNO DNS PFD, and/or MEC DNS PFD, the SMF 204 may select one or more UPF that support the (R)AN nodes (represented by RAN node ID or cell IDs), and/or DNN(s), and/or network slices (represented by NSI ID or S-NSSAI) resources, and/or Internal Group ID of a UE group, and/or Application ID. The NEF 406 may send updates of PFD, in which the updated PFD may contain new parameters related to the default, centralized or local MNO DNS servers 116 or MEC DNS PFDs, to the SMF 204 by using a method described in clause 4.18.3.2 "Management of PFDs in the SMF" of 3GPP TS 23.502.

The above embodiment of FIG. 8 provides an automation method for the AF 408 to provide the MEC DNS Configuration to the mobile network. The new information elements to implement DNS Configuration in the UPF 110 for DNS traffic detection and forwarding are introduced.

The UE 102 may move to different locations during a communication session with the MEC application server 112. In general, the UPF 110 may detect the MEC traffic of the UE 102 and notify the SMF 204. The SMF may perform some action to improve traffic routing:

- The SMF 204 may instruct the UE 102 to establish a new PDU session as described in SSC Mode 3.
- The SMF 204 may add ULCL to divert UL PDU to a new PSA UPF 110 as described in SSC Mode 2.

However, if the UE 102 is not aware that the current MEC server 112 is no longer optimal, the UE 102 may keep communicating with the current MEC server 112, even though there is some other MEC server 126 that could be better serve the UE 102. Such MEC servers may be closer to the UE 102, or have more resources to process the UE requests and to provide higher bandwidth connection.

In this embodiment, a new method to allow the UE 102 to be aware of availability of other MEC servers. The UPF 110 may detect the PDUs that sent to or received from MNO DNS servers and/or MEC server; and the UPF 110 may notify the SMF 204 about this traffic. The SMF 204 may send a NAS message to the UE 102 to notify the availability of other MEC servers. The notification may include one or more of following parameters: a new IP address or IP prefix that the UE may use to communicate with the new MEC server 126. A cause may indicate the reason that the SMF 204 sends the notification message. The cause could be one or more of following reasons: to establish a new PDU session, to use new IP address to communicate with the new MEC server 126.

The UE 102 may send a new DNS query to discover new MEC servers 126. This DNS query can be detected by the UPF 110. Solutions to support DNS query are provided in various embodiments above.

The UE 102 may perform one or more of following actions.

Method 1: Use existing PDU session and establish a new data connection to the new server with a new IP address of the new MEC server 126. If the current PSA UPF 110 is suitable, the SMF 204 keeps using the PSA UPF 110. If the current PSA UPF 110 is not optimal, the SMF 204 may insert a new ULCL and new PSA UPF to support the UE 102 connection to the new MEC server 126.

Method 2: Establish a new PDU Session. The SMF 204 may request the UE 102 to establish a new QoS flow by sending a notification to the UE. Alternatively, the UE 102 may also request a new PDU Session. During the PDU session establishment, the SMF 204 assigns a new IP address(es) or IP prefix(es). After having a new PDU Session established, the UE 102 may again send a DNS query to the MNO DNS 116. The newly selected UPF 110 will forward the DNS query to the local MEC DNS server 114. The UL and DL packets of the new PDU Session will be handled as described in Embodiments 2 and 3.

Method 3: The UE 102 may start using the newly assigned IP address to communicate with the current or new MEC server 126 without establishing a new PDU session. The SMF 204 may establish a new branching point and new PSA UPF 130 to handle the traffic sent from UE 102 using new source IP address of the UE 102 and new destination IP address of the MEC server.

Figure 10:
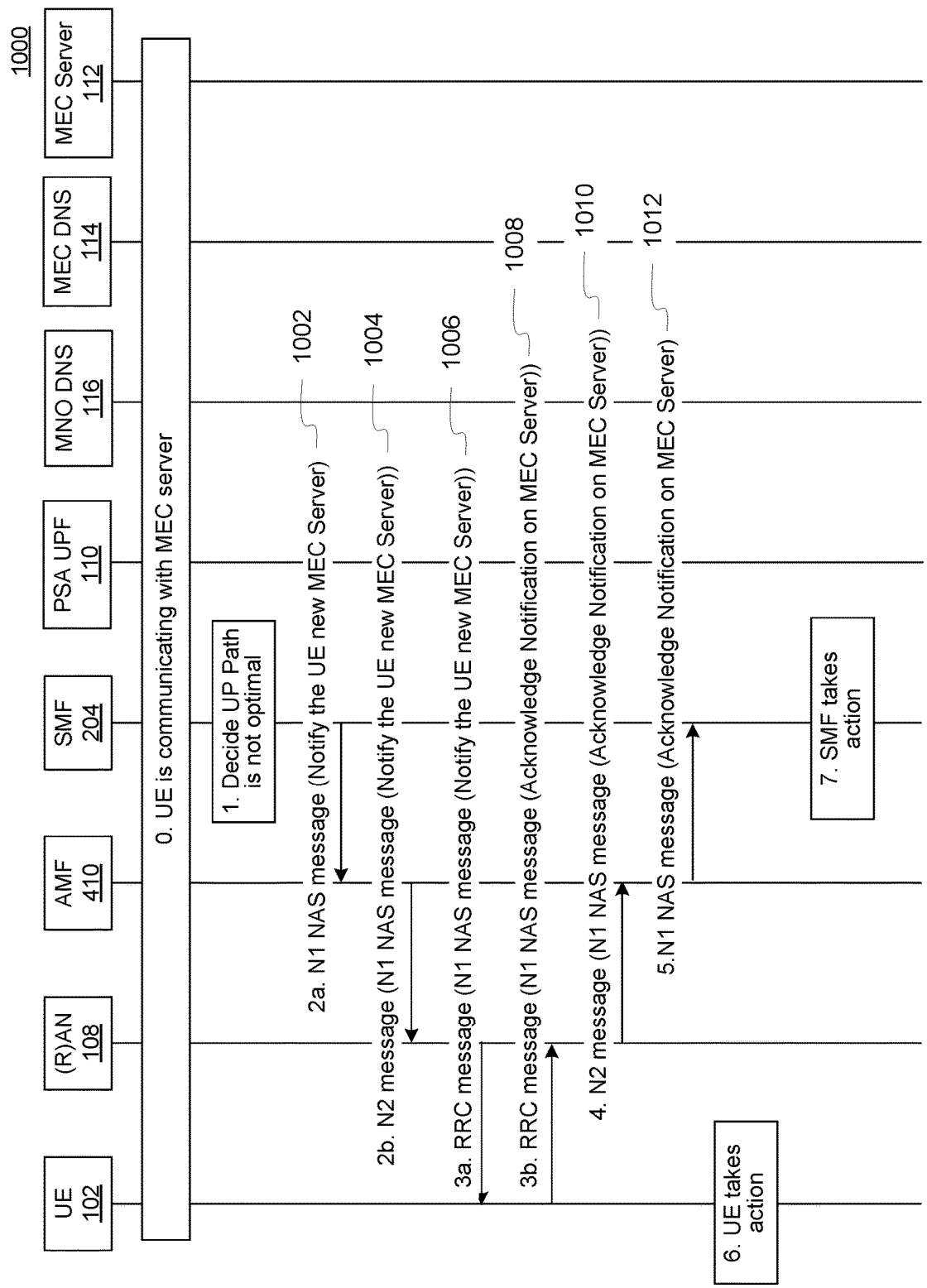
FIG. 10 illustrates, in an example embodiment, a signaling procedure to support a session management function (SMF) sending notifications to the UE for selecting a new MEC server.

FIG. 10 illustrates, in an example embodiment, a signaling procedure to support a session management function (SMF 204) sending notifications to the UE 102 for selecting a new MEC server 126. This allows the system including the SMF 204 to control the UE 102 to discover and utilize optimal UPFs 110, DNS servers 114, and data servers 112.

Step 0: The UE 102 is communicating with the MEC server 112.

Step 1: The SMF 204 may detect some conditions and decide that the current user plane (UP) path is not optimal. One or more of following conditions may be detected by the SMF 204.

The SMF 204 is notified by the AMF 410 that the UE 102 has moved to another location. The UE 102 location notification may be sent from the AMF 410 to the SMF 204 during handover procedures, as described in 3GPP TS 23.502. The new location of UE 122 may be better served by another MEC application server.

The SMF 204 may be notified or reported to by the UPF 110 about the current bit rate of the QoS flow and/or PDU Session that is used to support connections between the UE 102 and the MEC server 112. If the bit rate, such as average flow bit rate, guaranteed flow bit rate (GFBR), average session bit rate is dropped below a threshold, the UPF 110 may send a notification to report the bit rate. If there is no congestion in the network, there may be issues in the MEC application server 112, or the transport network between the MEC server 112 and the PSA UPF 110 may be congested.

The UPF 110 notifies the SMF 204 about UL or DL PDUs of a QoS flow that are sent to or received from MEC servers 112.

Step 2a: The SMF 204 may send a N1 NAS message 1002 towards the UE 102 via the AMF 410. This message could be a PDU Session modification request. The N1 NAS message 1002 may carry one or more of following information: PDU Session ID, QoS Flow Identifier (QFI), an indication to the UE 102 that the current UP is not optimal, one or more IP addresses, one or more IP prefixes, the address (e.g. IP address) of the MEC server 112, recommended action for UE 102, one or more of packet filter set(s).

The packet filter set(s) include the destination IP address of the MEC servers 112.

The recommended, or suggested, or requested, action for the UE 102 could be one or more of following actions:

The UE 102 receives the N1 NAS message 1002. This message 1002 could be PDU Session modification request from the SMF 204. The UE 102 may use the newly assigned IP address to communicate with the MEC server 112 having destination IP address(es) given in the packet filter set(s). The new IP address may be associated with a new PSA UPF 110.

Using the provided IP address(es) or IP prefix(es) to communicate with the MEC server 112; the UE 102 may not need to establish a new QoS flow for an existing PDU Session; the UE 102 may not need to establish new PDU Session to communicate with the MEC server 112.

The UE 102 needs to establish a new QoS flow for an existing PDU Session to communicate with the MEC server 112 using the provided IP address(es) or IP prefix(es) to communicate with the MEC server 112.

The UE 102 needs to establish a new PDU Session to communicate with the MEC server 112 using the provided IP address(es) or IP prefix(es) to communicate with the MEC server 112.

The UE 102 needs to establish a new QoS flow for an existing PDU Session to communicate with the MEC server 112.

The UE 102 needs to establish a new PDU Session to communicate with the MEC server 112.

The UE 112 needs to send a DNS query to discover another MEC server. In this case, the SMF 204 may not send new IP address(es) or new IP prefix(es) to the UE 102; the SMF 204 may not send address(es) of MEC servers 112 to the UE 102.

Step 2b: The AMF 410 forwards the N1 NAS message 1004 received from the SMF 204 to the (R)AN 108 that serves the UE 102 over an N2 interface.

Step 3a: The (R)AN 108 forwards the N1 NAS message to the UE 102 by using a RRC message 1006.

Step 3b: The UE 102 may send a RRC message 1008 to the (R)AN 108 to carry an N1 NAS message that acknowledges the reception of the N1 NAS message 1002 sent from the SMF 204.

Step 4: The (R)AN 108 forwards the N1 NAS message received from the UE 102 towards the AMF 410 over an N2 interface message 1010.

Step 5: The AMF 410 receives the N2 message 1010 and forwards the N1 NAS message 1012 to the SMF 204.

Step 6: The UE 102 may take some action as suggested, recommended, or requested in the N1 NAS message 1002 from the SMF 204. The UE 102 may take action in step 6 before, or at the same time, or after performing step 3b.

Step 7: Depending on the request, or recommendation, or suggestion, and/or the action the UE 102 takes in step 6, the SMF 204 may start different procedures to support the UE 102 action. Some of the actions the SMF 204 may take are as follows:

If the SMF 204 provided one or more IP addresses, or one or more IP prefix(es) to the UE 102 in step 2a, and the UE 102 agrees to use the new IP address(es) or the new IP prefix(es), the SMF 204 may insert a branching point function (BPF) to the user plane path and establish a new PSA UPF 110. When the UE 102 uses the new IP address(es) or new IP prefix(es) to send UL PDUs, the BPF can detect the PDUs that carry the new IP address(es) or new IP prefix(es). The BPF forwards these PDUs to the new PSA UPF 110. The new PSA UPF 110 forwards the packets to the MEC server 112. The MEC server 112 may sends some packets to the UEs in response to the packets received from the UE 102. The MEC server 112 will use the new UE's IP address or new IP prefix to set the destination IP address for packet header of (DL) packets that are sent to the UE 102. These DL packets may be sent to the new PSA UPF 110. The new PSA UPF 110 forwards the DL PDUs to the BPF, then the BPF forwards the PDU to the (R)AN 108. Then the (R)AN 108 forwards the PDU to the UE 102.

The UE 102 needs to establish a new QoS flow for an existing PDU session to communicate with the MEC server 112 using the provided IP address(es) or IP prefix(es) to communicate with the MEC server 112.

If the SMF 204 sends a request to the UE 102 to establish a new QoS flow for an existing PDU Session to communicate with the MEC server 112 using the new IP address(es) or IP prefix(es), the SMF 204 may also send a PDU Session Modification Request to the (R)AN 108 in step 2a. The PDU Session Modification message may include an N1 NAS message and an N2 message. The N1 NAS message may consist of PDU Session Modification for the UE 102 to establish a new QoS flow, including QoS Rule of the new QoS flow as described in 3GPP TS 23.502, clause 4.3.3 "Session Modification". The N2 message carries information for the RAN 108 to handle the new QoS flow, which may consist one or more of following information: QoS profile of the new QoS flow, the QFI of the QoS flow, the N3 tunnel information in the UL and DL that connect with the PSA UPF 110 (UPF address (e.g. IP address, FQDN) and TEID in the UL and DL). The SMF 204 may use the current or select a new PSA UPF 110 to support the new QoS flow. The SMF 204 may send a PDU Session Modification to the current PSA UPF 110 to support a new QoS flow. If a new PSA UPF 110 is selected, the SMF 204 may send a PDU Session Establishment request to the newly selected PSA UPF 110 as described in TS 23.502, clause 4.3.5.1, or clause 4.3.5.2.

In this solution, the (R)AN 108 may forward UL PDUs of different QoS flows of the same PDU session to one or more UPFs. The UE 102 may use different IP addresses or different IP prefixes for each QoS flows to access different services. The (R)AN 108 may establish multiple DRBs for the UL and multiple DRBs for the DL of the same PDU Session. Each UL or DL DRB may be used for one QoS flow. Each UL (or DL) DRB may be mapped to a corresponding UL (or DL) N3 tunnel.

The UE 102 needs to establish a new PDU Session to communicate with the MEC server 112 using the provided IP address(es) or IP prefix(es) to communicate with the MEC server 112. During the PDU Session establishment, the SMF 204 may select a suitable UPF for this PDU Session.

The UE 102 needs to send DNS query to discover another MEC server 112. The UPF 110 may detect the DNS query packet sent from the UE 102 as discussed previously. Depending on the DNS response, the SMF 204 may select another PSA UPF 110 to forward the traffic between the UE 102 and the MEC application server 112.

Figure 11:
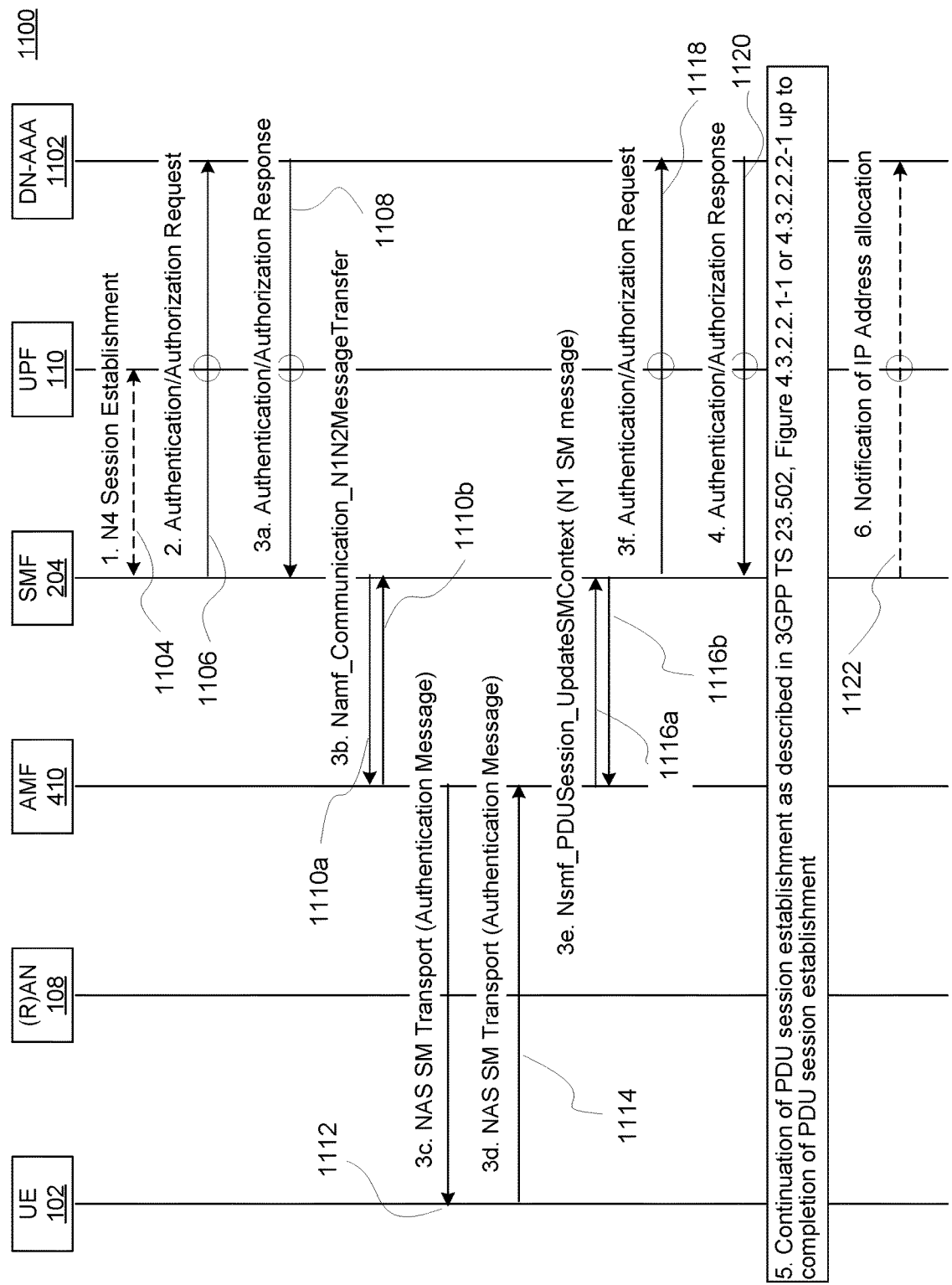
FIG. 11 illustrates, in an example embodiment, a protocol data unit (PDU) session establishment authentication/authorization by a domain name authentication, authorization and accounting services (DN-AAA) server.

FIG. 11 illustrates, in an example embodiment, a protocol data unit (PDU) session 1100 establishment authentication/authorization by a domain name authentication, authorization and accounting services (DN-AAA) server 1102. During the PDU session establishment procedure, the UE 102 may need an authorization to access a specific service as described in 3GPP TS 23.502. The authorization can be provided by an entity such as DN-AAA as described in 3GPP TS 23.502, clause 4.3.2.2.1, step 6 and clause 4.3.2.3. In the following, the third party authorization procedure is modified to allow additional information exchanged between the mobile network function and the DN-AAA server 1102.

Steps 2, 3a, 3f and 4 are not defined in this specification. The steps 3a, 3b, . . . , 3f can be repeated as a group, depending on the mechanism used.

The circle indicated midpoint of the line in steps 2, 3a, 3f, 4, and 6, indicates that the transmission occurs "via" the UPF 110.

When the SMF 204 directly communicates with the DN-AAA server 1102 without involving the UPF 110, Step 1 is skipped and Step 2, 3a, 3f, 4 and 6 are executed without involving the UPF 110.

Step 0. The SMF 204 determines that it needs to contact the DN-AAA 1102 server. The SMF 204 identifies the DN-AAA 1102 server based on local configuration, possibly using the SM PDU DN Request Container provided by the UE 102 in its NAS request. The SMF 204 may use DNN and S-NSSAI, and/or an indication, such as MEC Application Identifier (ID), to identify the DN-AAA server 1102 that provide authorization for the UE 102 to access the MEC Application. The SMF 204 may include the UE location information, such as a geographical zone ID that contains UE location, a cell ID of the (R)AN 108 that serves the UE 102. The UE location information may be associated with a range of IP addresses or IP prefix(es). The SMF 204 may include a temporary IP address or a temporary IP prefix associated with the geographical area (such as geographical zone ID) containing UE location to represent the UE location.

Step 1. If there is no existing N4 session that can be used to carry DN-related messages between the SMF 204 and the DN 1102, the SMF 204 selects a UPF 110 and triggers N4 session establishment 1104. The selected UPF 110 may provide UP connection between the UE 102 and the application server for the PDU session the UE 102 is requesting.

Step 2. The SMF 110 provides a SM PDU DN Request Container received from the UE 102 and the UE location information to the DN-AAA 1102 via the UPF 110.

When available, the SMF 204 provides the GPSI in the signalling exchanged with the DN-AAA 1102.

The UPF 110 transparently relays the Authentication/Authorization request message 1106 received from the SMF 204 to the DN-AAA server 1102.

The content of the SM PDU DN Request Container is defined in 3GPP TS 33.501.

Step 3a. The DN-AAA server 1102 sends an Authentication/Authorization response message 1108 towards the SMF 110. The message is carried via the UPF 110. The message may include location information to identify one or more possible MEC application or data server 112 locations. For example, the MEC server 112 location may be represented by any combination of following information: one or more of DNAIs, one or more of IP addresses, one or more of IP prefixes. The DN-AAA server 1102 may include the address of MEC DNS server 114 and/or MEC application or data server 112 locations, such as the IP address(es) of the DNS server and/or IP address(es) of the of MEC application or data server 112 locations that may serve the location of the UE 102.

The DN-AAA 1102 may use the UE location information provided by the SMF 204 to select one or more MEC servers 112. Alternatively, the DN-AAA 1102 may use the IP address of the PSA UPF 110 as an indication of UE location to select one or more MEC servers 112.

The SMF 204 may use the MEC server 112 location information to select or re-select the UPF 110 if needed.

Step 3b. The SMF 204 transfers of DN Request Container information received from DN-AAA 1102 towards the UE 102.

The DN Request Container may consist of an IP address or IP prefix of the MEC DNS 114.

In non-roaming and local breakout (LBO) cases, the SMF 204 invokes the Namf_Communication_N1N2MessageTransfer 1110*a* service operation on the AMF 410 to transfer the DN Request Container information within N1 SM information sent towards the UE 102.

In the case of Home Routed roaming, the H-SMF initiates a Nsmf_PDUSession_Update service operation to request the V-SMF to transfer DN Request Container to the UE 102 and the V-SMF invokes the Namf_Communication_N1N2MessageTransfer 1110*a* service operation on the AMF 410 to transfer the DN Request Container information within N1 SM information sent towards the UE 102.

Step 3c: The AMF 410 sends the N1 NAS message 1112 to the UE 102.

Step 3d-3e. Transfer of DN Request Container information received from UE 102 towards the DN-AAA 1102.

When the UE 102 responds with a N1 NAS message containing DN Request Container information, the AMF 410 informs the SMF 204 by invoking the Nsmf_PDUSession_UpdateSMContext service 1116*a* operation. The SMF 204 issues an Nsmf_PDUSession_UpdateSMContext response 1116*b*.

In the case of Home Routed roaming, the V-SMF relays the N1 SM information to the H-SMF via a Nsmf_PDUSession_Update service operation.

Step 3f: The SMF 204 (In HR case it is the H-SMF) sends the content of the DN Request Container information (authentication message) to the DN-AAA server 1102 via the UPF 110.

Step 3 may be repeated until the DN-AAA server 1102 confirms the successful authentication/authorization of the PDU Session.

Step 4. The DN-AAA server 1102 confirms the successful authentication/authorization of the PDU Session. The DN-AAA server 1102 may provide:

An SM PDU DN Response Container to the SMF 204 to indicate successful authentication/authorization.

Authorization information as defined in TS 23.501 [2] clause 5.6.6.

A request to get notified with the IP address(es) allocated to the PDU Session and/or with N6 traffic routing information or MAC address(es) used by the UE 102 for the PDU Session.

An IP address (or IPV6 Prefix) for the PDU Session.

The N6 traffic routing information is defined in TS 23.501 [2] clause 5.6.7.

After the successful DN authentication/authorization, a session is kept between the SMF 204 and the DN-AAA 1102.

Step 5. The PDU Session establishment continues and completes.

Step 6. If requested so in step 4 or if configured so by local policies, the SMF 204 notifies the DN-AAA 1102 with the IP/MAC address(es) and/or with N6 traffic routing information allocated to the PDU Session together with the GPSI.

Later on, the SMF 204 notifies the DN-AAA 1102 if the DN-AAA had requested to get notifications about:

Allocation or release of an IPV6 Prefix for the PDU Session of IP type or addition or removal of source MAC addresses for the PDU Session of Ethernet type (e.g. using IPV6 multi-homing as defined in TS 23.501 [2] clause 5.6.4.3).

Change of N6 traffic routing information.

The DN-AAA server 1102 may use the IP address(es) or IP prefix(es) of the UE 102 or the IP address of PSA UPF 110 to identify the geographical location area of the UE 102. The DN-AAA server 1102 may send the MEC server 112 location information to the SMF 204 so that the SMF 204 may configure the traffic routing rule for N6 interface toward one of the MEC server 112.

When later the PDU Session gets released as described in clause 4.3.4, the SMF 204 notifies the DN-AAA 1102.

The DN-AAA server 1102 may revoke the authorization for a PDU Session or update DN authorization data for a PDU Session. According to the request from DN-AAA server 1102, the SMF 204 may release or update the PDU Session.

At any time after the PDU Session establishment, the DN-AAA server 1102 or SMF 204 may initiate Secondary Re-authentication procedure for the PDU Session as specified in clause 11.1.3 in TS 33.501. Step 3a to step 3f are performed to transfer the Secondary Re-authentication message between the UE 102 and the DN-AAA server 1102. The Secondary Re-authentication procedure may start from step 3a (DN-AAA 1102 initiated Secondary Re-authentication procedure) or step 3b (SMF 204 initiated Secondary Re-authentication procedure). For the DN-AAA server 1102 initiated Secondary Re-authentication, the message in step 3a shall include GPSI, if available, and the IP/MAC address(es) of the PDU session, for SMF 204 to identify the corresponding UE 102 and PDU session.

The advantages of the embodiments of FIG. 11 above include:

Allowing the DN-AAA 1102 to send the IP address of MEC DNS 114 or MEC application/data servers 112 to the UE 102 during the authorization process so that the UE 102 can communicate with the right MEC DNS 114 and the MEC DNS 114 can select the optimal MEC server 112. This help to avoid the issue that the UE 102 sends a DNS query to the MMNO DNS 116 and MNO DNS 116 queries the MEC DNS 114, which may return MEC server 112 information that suitable with the location of the MNO DNS 116, but may be not suitable for the actual UE location.

Allowing the DN-AAA 1102 to send the MEC Server 112 location information to the SMF 204 to help the SMF 204 select a suitable UPF 110.

The following embodiments describe services of network functions to support transfer of DNS Configuration parameters from the AF 408 to the mobile network functions.

An existing service of the PCF, eg. Npcf_SMPolicyControl_UpdateNotify service, may be modified to carry the DNS Configuration Policy to the SMF 204 as follows:

Npcf_SMPolicyControl_Create service operation Service operation name: Npcf_SMPolicyControl_Create.

Description: The NF Service Consumer can request the creation of a SM Policy Association and provide relevant parameters about the PDU Session to the PCF 402.

Inputs, required: SUPI (or Permanent Equipment Identifier (PEI) in case of emergency PDU Session without SUPI), PDU Session id, DNN and S-NSSAI, Inputs, optional: Information provided by the SMF 204 as defined in clause 6.2.1.2 of 3GPP TS 23.503, such as Access Type, the IPv4 address and/or IPv6 prefix, PEI, GPSI, User Location Information, UE Time Zone, Serving Network, RAT type, Charging Characteristics information, Session AMBR, subscribed default QoS information, Trace Requirements and Internal Group Identifier (see 3GPP TS 23.501, clause 5.9.7), NSI ID, DN Authorization Profile Index, Frame Routes, DNS Configuration Policy.
Frame Routes are defined in Table 5.2.3.3.1-1 of 3GPP TS 23.502.
NOTE: If the SMF 204 receives the DN authorized Session AMBR from the DN-AAA 1102 at PDU session establishment, it includes the DN authorized Session AMBR within the Session-AMBR, instead of the subscribed Session AMBR received from the UDM 412, in the request.
Outputs, required: None
Outputs, optional: Policy information for the PDU Session as defined in clause 5.2.5.4.1 of 3GPP TS 23.502.
    Npcf_SMPolicyControl_UpdateNotify service operation
Service operation name: Npcf_SMPolicyControl_UpdateNotify
Description: Provides to the NF Service Consumer, e.g. SMF 204 updated Policy information for the PDU Session evaluated based on the information previously provided by the SMF 204, AF 408, CHF 226, UDR 404 and NWDAF 414, as defined in clause 6.2.1.2 of 3GPP TS 23.503.
Inputs, required: PDU Session Id and SUPI (or PEI in case of emergency PDU Session without SUPI).
Inputs, optional: Policy information for the PDU Session as defined in clause 5.2.5.4.1 of 3GPP TS 23.502, DNS Configuration Policy.
Outputs, required: Success or Failure.
Outputs, optional: None.
    Npcf_SMPolicyControl_Delete service operation
Service operation name: Npcf_SMPolicyControl_Delete
Description: The NF Service Consumer can request the deletion of the SM Policy Association and of the associated resources.
Inputs, required: PDU Session id, SUPI (or PEI in case of emergency PDU Session without SUPI).
Inputs, optional: DNS Configuration Policy ID.
Outputs, required: Success or Failure.
Outputs, optional: None.
    Npcf_SMPolicyControl_Update service operation
Service operation name: Npcf_SMPolicyControl_Update.
Description: The NF Service Consumer can request the update of the SM Policy Association to receive updated Policy information for the PDU Session.
Inputs, required: PDU Session Id and SUPI (or PEI in case of emergency PDU Session without SUPI).
Inputs, optional: Information on the Policy Control Request Trigger condition, as defined in clause 6.1.3.5 of TS 23.503, that has been met such as Access Type, (new or removed) IPv4 address and/or IPv6 network prefix, User Location Information, UE Time Zone, Serving Network, RAT type, Session AMBR, or subscribed default QoS information, DN Authorization Profile Index, new DNS Configuration Policy.
Outputs, required: Success or not.
Outputs, optional: Policy information for the PDU Session as defined in clause 5.2.5.4.1 of 3GPP TS 23.502.
    A new service of PCF may be designed to transfer the DNS Configuration Policy to the SMF 204. One example of PCF service is illustrated as follows.
    Npcf_DNSConfiguration_Create service operation
Service operation name: Npcf_DNSConfiguration_Create.
Description: The NF Service Consumer can request the creation of a DNS Configuration and provide relevant parameters about the DNS Configuration to the PCF 402. The DNS Configuration could be applied to one UE, several UEs, a group of UEs, or all UEs.
Inputs, required: DNS Configuration.
Inputs, optional: DNN, S-NSSAI, SUPI (or PEI in case of emergency PDU Session without SUPI), and Internal Group Identifier (as defined in 3GPP TS 23.501, clause 5.9.7), NSI ID.
Outputs, required: Success or Failure.
Outputs, optional: None.
    Npcf_DNSConfiguration_UpdateNotify service operation
Service operation name: Npcf_DNSConfiguration_UpdateNotify
Description: Provides to the NF Service Consumer, e.g. SMF 204 updated DNS Configuration Policy for the PDU Session.
Inputs, required: DNS Configuration Policy.
Inputs, optional: None.
Outputs, required: Success or Failure.
Outputs, optional: None.
    Npcf_DNSConfiguration_Delete service operation
Service operation name: Npcf_DNSConfiguration_Delete
Description: The NF Service Consumer can request the deletion of the DNS Configuration.
Inputs, required: DNS Configuration ID.
Inputs, optional: None.
Outputs, required: Success or Failure.
Outputs, optional: None.
    Npcf_DNSConfiguration_Update service operation
Service operation name: Npcf_DNSConfiguration_Update.
Description: The NF Service Consumer can request the update of the DNS Configuration.
Inputs, required: DNS Configuration ID, DNS Configuration.
Inputs, optional: None.
Outputs, required: Success or Failure.
Outputs, optional: None.
    Modification of UDR Data Management Services:
    The Data Management (DM) service of UDR 404, Nudr_DataManagement (DM) service, is specified in 3GPP TS 23.502, clause 5.2.12.2. This service can be modified to manage the DNS Configuration data as follows.
    In general, the operations defined for Nudr_DM service use following set of parameters defined in this clause:
- Data Set Identifier: uniquely identifies the requested set of data within the UDR (described in clause 4.2.5 of 3GPP TS 23.502).
- Data Subset Identifier: it uniquely identifies the data subset within each Data Set Identifier. As specified in the procedures in clause 4. e.g. subscription data can consist of subsets particularised for specific procedures like mobility, session, etc.
- Data Keys defined in Table 5.2.12.2.1-1 of 3GPP TS 23.502.
- For Nudr_DM_Subscribe and Nudr_DM_Notify operations:
  - The Target of event reporting is made up of a Data Key and possibly a Data Sub Key both defined in Table 5.2.12.2.1-13 of GPP TS 23.502. When a Data Sub Key is defined in the table but not present in the Nudr_DM_Subscribe this means that all values of the Data Sub Key are targeted.
  - The Data Set Identifier plus (if present) the (set of) Data Subset Identifier(s) corresponds to a (set of) Event ID(s) as defined in clause 4.15.1 of 3GPP TS 23.502.
  - An NF Service Consumer may include an indicator when it invokes Nudr_DM Query/Create/Update service operation to subscribe the changes of the data, to avoid a separate Nudr_DM_Subscribe service operation.

Depending on the use case, it is possible to use a Data Key and/or one or multiple Data sub keys to further identify the corresponding data, as defined in Table 5.2.12.2.1-1 of 3GPP TS 23.502 and modified below.

| Data Set | Data Subset | Data Key | Data Sub Key |
|---|---|---|---|
| Subscription Data (see clause 5.2.3.3.1) | Access and Mobility Subscription data | SUPI | — |
| | SMF 204 Selection Subscription data | SUPI | — |
| | UE 102 context in SMF 204 data | SUPI | PDU Session ID or DNN |
| | SMS Management Subscription data | SUPI | — |
| | SMS Subscription data | SUPI | |
| | Session Management Subscription data | SUPI | S-NSSAI |
| | | | DNN |
| | Slice Selection Subscription data | SUPI | — |
| Application data | Packet Flow Descriptions (PFDs) | Application ID | — |
| | Packet Flow Descriptions (PFDs) for public DNS or MNO DNS Support, may include local MNO DNS Server 116 information | Application ID, and/or AF-Service-ID, and/or DNS Configuration ID, and/or AF transaction internal ID, and/or DNN, or DNN and/or S-NSSAI, and/or Internal Group Identifier, and/or External Group ID | |
| | Packet Flow Descriptions (PFDs) for MEC DNS Support, may include MEC DNS Server 114 information | Application ID, and/or AF-Service-ID, and/or DNS Configuration ID, and/or AF transaction internal ID, and/or DNN, or DNN and/or S-NSSAI, and/or Internal Group Identifier, and/or External Group ID | |
| | AF traffic influence request information (See clause 5.6.7 and clause 6.3.7.2 in 3GPP TS 23.501 [2]). | AF transaction internal ID S-NSSAI and DNN and/or Internal Group Identifier or SUPI | |
| Policy Data | UE context policy control data (See clause 6.2.1.3 in TS 23.503 [20]) | SUPI | |
| | PDU Session policy control data (See clause 6.2.1.3 in TS 23.503 [20]) | SUPI | S-NSSAI DNN |
| | Policy Set Entry data (See clause 6.2.1.3 in TS 23.503 [20]) | SUPI (for the UDR in HPLMN) PLMN ID (for the UDR in VPLMN) | |
| | Remaining allowed Usage data (See clause 6.2.1.3 in TS 23.503 [20]) | SUPI | S-NSSAI DNN |
| | Sponsored data connectivity profiles (See clause 6.2.1.6 in TS 23.503 [20]) | Sponsor Identity | |
| | Background Data Transfer data (See clause 6.2.1.6 in TS 23.503 [20]) | Background Data Transfer Reference ID. (NOTE 2) None. (NOTE 1) | |
| Exposure Data (see clause 5.2.12.1) | Access and Mobility Information | SUPI or GPSI | PDU Session ID or |
| | Session Management information | SUPI or GPSI | UE IP address or DNN |

| Data Set | Data Subset | Data Key | Data Sub Key |
|---|---|---|---|
| DNS Configuration | DNS Server Configuration Information | Application ID, and/or AF-Service-ID, and/or DNS Configuration ID, and/or AF transaction internal ID, and/or DNN, or DNN and S-NSSAI, and/or Internal Group Identifier, and/or External Group ID | SUPI |

(NOTE 1):
Retrieval of the stored Background Data Transfer References for all ASP identifiers in the UDR requires Data Subset but no Data Key or Data Subkey(s).
(NOTE 2):
Update of a Background Data Transfer Reference in the UDR requires a Data key to refer to a Background Data Transfer Reference as input data.

The above arrangement of Packet Flow Descriptions (PFDs) for DNS query support may be arranged in the above in the UDR 404 for illustration. Other modification to the arrangements of Packet Flow Descriptions (PFDs) for DNS query support can be made.

The content of the UDR 404 storage for (Data Set Id=Application Data, Data Subset Id=AF TrafficInfluence request information) is specified in 3GPP TS 23.501 clause 5.6.7, Table 5.6.7-1. This information is written by the NEF 406 and read by the PCF(s) 402. PCF(s) 402 may also subscribe to changes onto this information.

The DNS Configuration sent from the AF 408 to the NEF 406 may include one or more of following information:

AF Transaction Id.

One or more of packet filters to identify traffic sent to or received from MEC DNS servers 114, which may include one or more of following information of MEC DNS servers 114: IP address(es), IP prefix(es), Protocol, port number (e.g. UDP or TCP port numbers), DNAI.

Serving location(s) of each MEC DNS server 114: may be represented, for example, by geographical zones, a list of (R)AN node IDs, a list of cell IDs or (R)AN, a list tracking area IDs, a list of DNAIs.

For each MEC DNS server 114 (may be represented by IP address of the MEC DNS server 114): a list of URLs, or a list of significant part of URLs (such as FQDNs) that can be resolved by this MEC DNS server 114.

Alternatively, for all MEC DNS servers 114: a list of URLs, or a list of significant parts of URLs (such as FQDNs), that can be resolved by all MEC DNS servers 114.

The address (IP or Ethernet) of the UEs 102 if available, GPSIs of UEs 102 if available, DNN that hosts MEC applications if available, S-NSSAI(s) that can provide connection to MEC server(s) 114 if available, External Group Identifier of UE groups if available, application identifier of MEC application or traffic filtering information, AF-Service-Identifier, a list of DNAI(s) and corresponding routing profile ID(s) or N6 traffic routing information, Indication of application relocation possibility.

The DNS Server Configuration Information stored in the UDR 404 may contain the DNS Configuration sent from the AF 408. Before sending the DNS Configuration to the UDR 404, the NEF 406 may perform one or more of data conversions as follows.

If the AF 408 provides an External Group ID, the NEF 406 may convert the External Group ID to Internal Group ID.

If the AF 408 provides a Geographical Zone ID, the NEF 406 may convert the Geographical Zone ID into UE 102 location parameters of the mobile network, such as the list of Cell IDs, the list of RAN 108 node IDs.

If the GPSI of UE 102 is provided, the NEF 406 may convert GPSI to SUPI.

The NEF 406 then may send the converted parameters together with other DNS Configuration parameters to the UDR 404.

In case the MNO has local MNO DNS server(s) 116, the DNS Server Configuration Information may include one or more of following information.

DNS Configuration ID.

One or more of packet filters to identify traffic sent to or received from local MNO DNS servers 116, which may include one or more of following information of local MNO DNS servers 116: IP address(es), IP prefix(es), port number (e.g. UDP or TCP port numbers), DNAI.

Serving location(s) of each local MNO DNS server 116: may be represented, for example, by geographical zones, a list of (R)AN node IDs, a list of cell IDs or (R)AN, a list tracking area IDs, a list of DNAIs.

For each local MNO DNS server 116 (may be represented by IP address of the local MNO DNS server): a list of URLs, or a list of significant part of URLs (such as FQDNs) that can be resolved by this MEC DNS server 114.

Alternatively, for all local MNO DNS servers 116: a list of URLs, or a list of significant parts of URLs (such as FQDNs), that can be resolved by all local MNO DNS servers 116.

The address (IP or Ethernet) of the UEs 102 if available, SUPIs of UEs 102 if available, DNN that hosts MEC applications if available, S-NSSAI(s) that can provide connection to MEC server(s) 112 if available, Internal Group Identifier of UE groups if available, application identifier of MEC application or traffic filtering information, AF-Service-Identifier, a list of DNAI(s) and corresponding routing profile ID(s) or N6 traffic routing information, Indication of application relocation possibility.

Nudr_DM_Query service operation
Service operation name: Nudr_DM_Query.
Description: NF service consumer requests a set of data from UDR 404.

Inputs, required: Data Set Identifier, for example DNS Configuration.
Inputs, optional: Data Key(s) (for example DNN that host MEC Application, like DNN="Internet"), Data Subset Identifier(s), SUPI, Data Sub Key(s) (for each Data Subset. The SUPI is used to identify which UE 102 the latest list of stored Policy Section Identifiers (PSIs) belongs to.
Outputs, required: Requested data, for example DNS Configuration.
Outputs, optional: None.
 Nudr_DM_Create service operation
Service operation name: Nudr_DM_Create.
Description: NF service consumer intends to insert a new data record into the UDR 404, e.g. a NF service consumer intends to insert a new application data record into the UDR 404. For example, the NEF 406 may insert the DNS Configuration into the UDR 404.
Inputs, required: Data Set Identifier, e.g. DNS Configuration; Data Key(s), e.g. DNN="Internet".
Inputs, optional: Data Subset Identifier(s), Data Sub Key(s).
Outputs, required: Result.
Outputs, optional: None.
 Nudr_DM_Delete service operation
Service operation name: Nudr_DM_Delete.
Description: NF service consumer intends to delete user data stored in the UDR 404, e.g. a NF service consumer intends to delete an application data record. For example, the AF 408 may send a request to the NEF 406 to delete a DNS Configuration, the NEF 406 may use this service to delete one existing DNS Configuration.
Inputs, required: Data Set Identifier, e.g. DNS Configuration; Data Key(s), e.g. DNN="Internet".
Inputs, optional: Data Subset Identifier(s), Data Sub Key(s).
Outputs, required: Result.
Outputs, optional: None.
 Nudr_DM_Update service operation
Service operation name: Nudr_DM_Update.
Description: NF service consumer intends to update stored data in the UDR 404. For example, an AF 408 may send a request to the NEF 406 to update DNS Configuration. The NEF 406 may send the updated DNS Configuration to the UDR 404.
Inputs, required: Data Set Identifier, e.g. DNS Configuration; Data Key(s), e.g. DNN="Internet"; Data, e.g. new DNS Configuration.
Inputs, optional: Data Subset Identifier(s), Data Sub Key(s).
Outputs, required: Result.
Outputs, optional: None.
 Nudr_DM_Subscribe service operation
Service operation name: Nudr_DM_Subscribe.
Description: NF service consumer performs the subscription to notification to data modified in the UDR 404. The events can be changes on existing data, addition of data. For example, the PCF 402 may use this service to receive notification of DNS Configuration updates.
Inputs, required: Data Set Identifier, e.g. DNS Configuration; Notification Target Address, e.g. PCF ID=100 (+ Notification Correlation ID), Event Reporting Information, for example as defined in Table 4.15.1-1 of TS 23.502.
Inputs, optional: Target of event reporting as defined in clause 5.2.12.2.1 of 3GPP TS 23.502, Data Subset Identifier(s), e.g. as defined in clause 5.2.12.2.1 of 3GPP TS 23.502, Subscription Correlation ID (in the case of modification of the event subscription).
Outputs, required: When the subscription is accepted: Subscription Correlation ID.
Outputs, optional: None.
 Nudr_DM_Unsubscribe service operation
Service operation name: Nudr_DM_Unsubscribe
Description: NF service consumer performs the un-subscription to notification to data modified in the UDR 404. For example, the PCF 402 may unsubscribe to DNS Configuration updates. The events can be changes on existing data, addition of data.
Inputs, required: Subscription Correlation ID.
Inputs, optional: None.
Outputs, required: Result.
Outputs, optional: None.
 Nudr_DM_Notify service operation
Service operation name: Nudr_DM_Notify.
Description: UDR 404 notifies NF service consumer(s) about modification of data, when data in the UDR 404 is added, modified or deleted, and an NF needs to be informed about this, due to a previous subscription to notifications procedure or due to a local configuration policy in the UDR 404. For example, the UDR 404 may notify the PCF 402 about DNS Configuration updates.
Inputs, required: Notification Correlation Information; Data Set Identifier, e.g. DNS Configuration; Target of event reporting, for example as defined in clause 5.2.12.2 of 3GPP TS 23.502; Updated Data, for example DNS Configuration updates.
Inputs, optional: Data Subset Identifier, e.g. as defined in clause 5.2.12.2.1 of 3GPP TS 23.502.
Outputs, required: Result.
Outputs, optional: None.
 The NEF 406 can provide service to allow the AF 408 providing DNS Configuration to the mobile network.
 Service description: This service provides:
 Request authorization of NF Service Consumer requests.
 Request parameter mapping from NF Service Consumer (e.g. AF 408) requests to 5GC parameters and vice versa, for example as described in 3GPP TS 23.501, clause 5.6.7.
 Nnef_DNSConfiguration_Create operation
Service operation name: Nnef_DNSConfiguration_Create
Description: Authorize the request and forward the request for DNS Configuration.
Inputs, required: AF Transaction Id.
The AF Transaction Id refers to the request.
Inputs, optional:
 AF Transaction Id;
 DNS Configuration ID to identify specific DNS Configuration;
 One or more of packet filters to identify traffic sent to or received from MEC DNS servers 114, which may include one or more of following information of MEC DNS servers 114: IP address(es), IP prefix(es), Protocol, port number (e.g. UDP or TCP port numbers), DNAI.
 Serving location(s) of each MEC DNS server 114: may be represented, for example, by geographical zones, a list of (R)AN node IDs, a list of cell IDs or (R)AN, a list tracking area IDs, a list of DNAIs.
 For each MEC DNS server 114 (may be represented by IP address of the MEC DNS server 114): a list of URLs, or a list of significant part of URLs that can be resolved by this MEC DNS server 114.

Alternatively, for all MEC DNS servers 114: a list of URL, or a list of significant parts of URLs (such as FQDNs), that can be resolved by all MEC DNS servers 114.

The address (IP or Ethernet) of the UEs 102 if available, GPSIs of UEs if available, DNN that hosts MEC applications if available, S-NSSAI(s) that can provide connection to MEC server(s) 112 if available, External Group Identifier of UE groups if available, application identifier of MEC application or traffic filtering information, AF-Service-Identifier, a list of DNAI(s) and corresponding routing profile ID(s) or N6 traffic routing information, Indication of application relocation possibility.

Outputs, required: Operation execution result indication.
Outputs, optional: None.

Nnef_DNSConfiguration_Update operation
Service operation name: Nnef_DNSConfiguration_Update
Description: Authorize the request and forward the request to update the DNS Configuration.
Inputs, required: AF Transaction Id. The AF Transaction Id identifies the NF Service Consumer request to be updated.
Inputs, optional: Same optional information as in Nnef_DNSConfiguration_Create Input.
Outputs, required: Operation execution result indication.
Outputs, optional: None.

Nnef_DNSConfiguration_Delete operation
Service operation name: Nnef_DNSConfiguration_Delete
Description: Authorize the request and forward the request to delete(s) request for traffic influence.
Inputs, required: AF Transaction Id. The AF Transaction Id identifies the NF Service Consumer request for DNS Configuration to be deleted.
Inputs, optional: DNS Configuration ID.
Outputs, required: Operation execution result indication.
Outputs, optional: None.

Nnef_DNSConfiguration_Notify operation
Service operation name: Nnef_DNSConfiguration_Notify
Description: Forward the notification of DNS Configuration event report to AF.
Known NF Service Consumers: AF.
Inputs, required: AF Transaction Id, Event ID. The AF Transaction Id identifies the AF request for DNS Configuration that the event report is related to. The event may be: Detected DNS query. The event report for detected DNS query may include one or more of following information: UE ID (e.g. SUPI, or GPSI), timestamp of the event, IP address of the DNS server such as MEC DNS server 114, local MNO DNS server 116, URL or significant part of URL (such as FQDN), IP address of MEC server 112 that host application.
Inputs, optional: Event information (defined on a per Event ID basis).
Outputs, required: Operation execution result indication.
Outputs, optional: None.

Figure 12A:
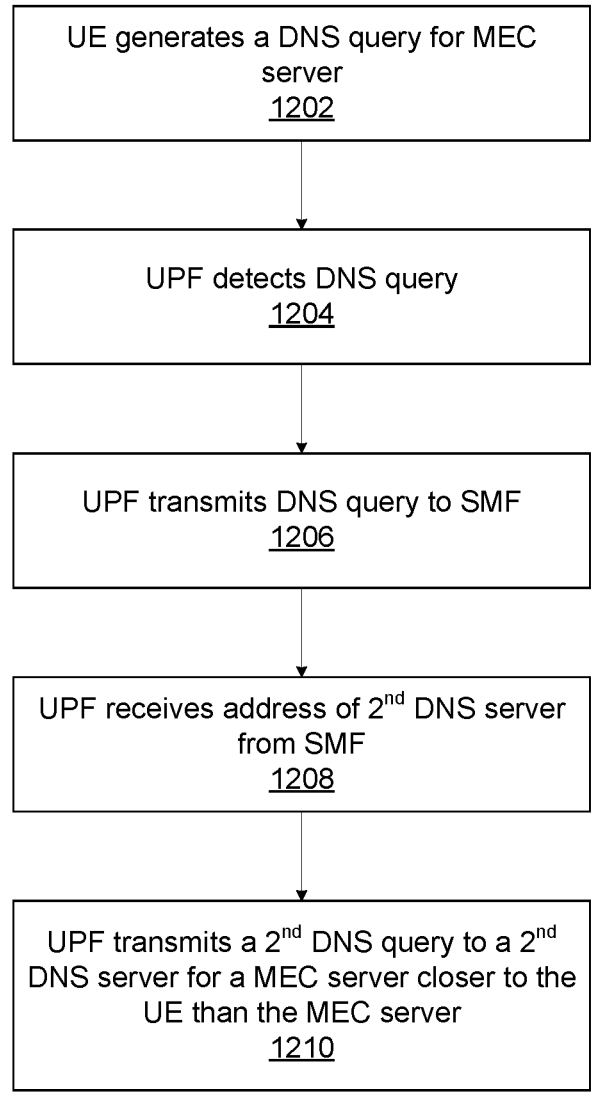
FIG. 12A illustrates, in an example embodiment, a method performed in a UPF.

FIG. 12A illustrates, in an example embodiment, a method performed in a user plane function (UPF). The method illustrated allows for the UPF 110 to detect DNS queries contained in UL PDUs from the UE 102 and the forwarding of the DNS query to a DNS server in proximity to the UE 102. The method also facilitates address translation to improve the selection of the DNS server and to obscure the address of the UE 102.

The method commences when in operation 1202, a UE 102 generates a DNS query to determine an address of a MEC server 112. The DNS query includes a destination address of a DNS server known to the UE 102 which may be an MNO DNS server 116. The DNS query may be transmitted in a UL PDU or in a PDU wrapped in an IP packet. At operation 1204, UPF 110 detects the DNS query from the UE. In operation 1206, the UPF 110 may transmit a request to the SMF 204. The request includes the DNS query received from the UE 102. In operation 1208, the UPF 110 receives a response from the SMF 204 that includes a second destination address (e.g. IP address) of a second DNS server. In operation 1210, the UPF 110 transmits a second DNS query to the second DNS server which will return an address (e.g. IP address) of an MEC server 112 that is in proximity to the UE. When the second DNS server responds to the second DNS query, the DNS response message from the second DNS server is received by the UPF 110. The response from the second DNS server contains a source address (e.g. IP address) of the second DNS server. The UPF 110 forwards the DNS response to the UE 102, and may replace the source address (e.g. IP address) with the address (e.g. IP address) of the first DNS server, known to the UE 102.

Figure 12B:
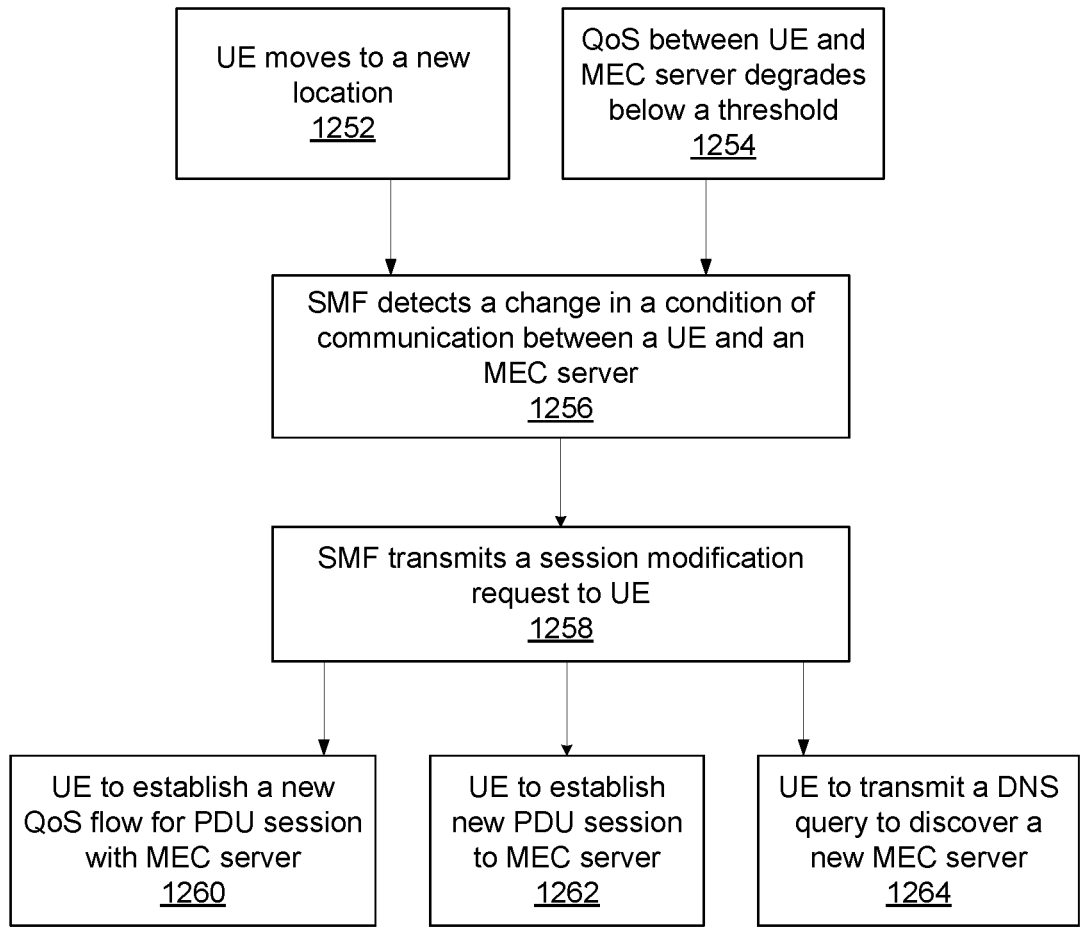
FIG. 12B illustrates, in an example embodiment, a method performed in a SMF.

FIG. 12B illustrates, in an example embodiment, a method performed in a session management function (SMF). This allows the system, including the SMF 204, to detect when the location of a UE 102 has changed or the QoS of communication with the UE is not optimal, and to control the UE 102 to discover and utilize optimal UPFs 110, DNS servers 114, and data servers 112 to ameliorate the situation.

The method is triggered based on a condition of the PDU session between the UE 102 and the MEC server 112 that indicates that the PDU session is not optimal. The condition is related to aspects of the PDU session that impact performance if the PDU session. Examples may be related to the selection of the UPF 110, the selection of the MNO DNS server 116, or the selection of the MEC server 112. One trigger is that the AMF 410 detects that the UE 102 has moved to a new location 1252 at which point it is located closer to a UPF 130 than to the original UPF 110. "Closer" in this case may be a geographical distance, a network congestion, or other suitable measurement. Similarly, the UE 102 may move so that it is closer to a MEC server 126 than to the original server 112. Another trigger is that the UPF 110 may report that a QoS measurement of the PDU session between the UE 102 and the MEC server 112 has degraded below a threshold 1254 and the selection of the UPF 110 or the MNO server 112 will be evaluated. In step 1256 the SMF 204 detects a change in the condition of the PDU session between the UE 102 and the MEC server 112. In step 1258 the SMF 204 transmits a PDU session modification request to the UE 102. In the session modification request, the SMF 204 can instruct the UE 102 in several ways. One way is for the UE 102 to establish a new QoS flow for the PDU session with the MEC server 1260. A second way is for the UE 102 to establish a new PDU session to the MEC server 1262. A third way is for the UE 102 to transmit a DNS query to discover a new MEC server 1264.

Figure 13:
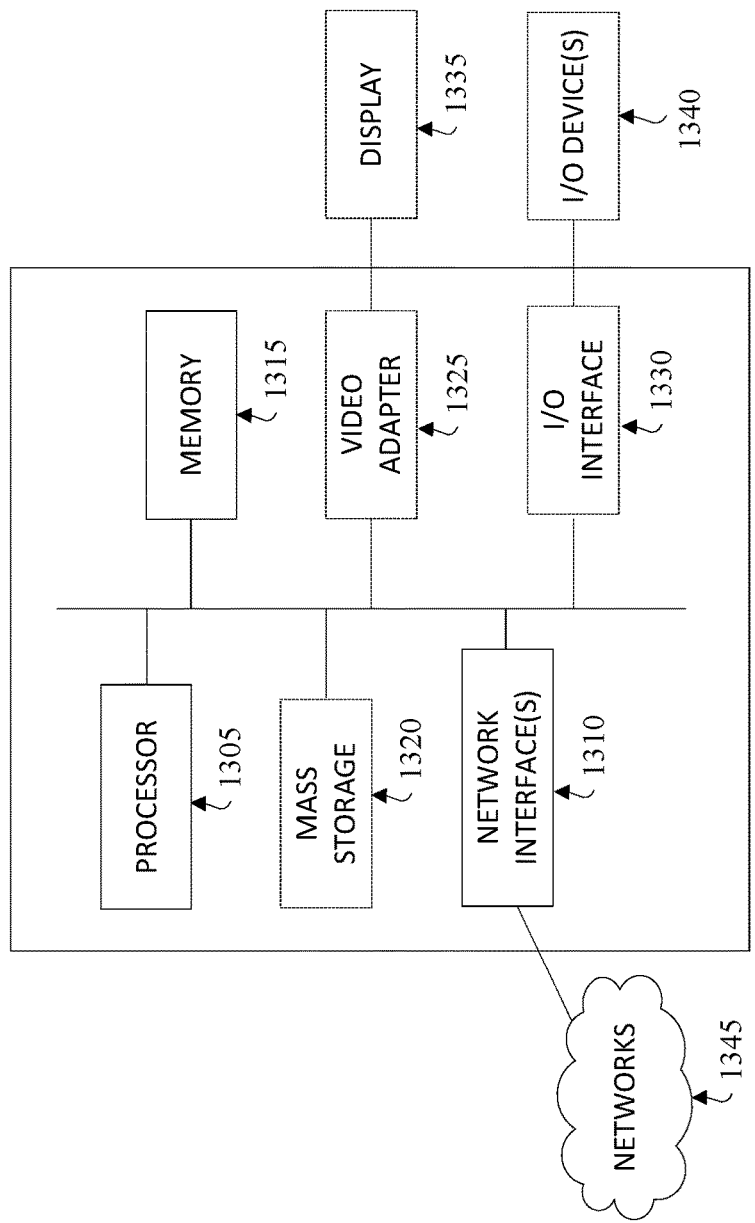
FIG. 13 illustrates, in an example embodiment, an architecture of a computing system that may be used for implementing the devices and methods disclosed herein.

FIG. 13 illustrates, in an example embodiment, an architecture 1300 of a computing system that may be used for implementing the devices and methods disclosed herein. The operations may be performed by one or more functional modules of a computing device, which may be one or more server computing devices. In some embodiments, the computing system 1300 may be an element of the communications network infrastructure, such as a base station (for example a NodeB, an enhanced Node B (eNodeB), a next generation eNodeB (ng-eNodeB or ng-eNB), a next generation NodeB (sometimes referred to as a gNodeB or gNB)), a home subscriber server (HSS), a gateway (GW) such as a packet gateway (PGW) or a serving gateway (SGW) or various other nodes or functions within an evolved packet core (EPC) network. In other embodiments, the computing system 1300 may be a device that connects to network infrastructure over a radio interface, such as a mobile phone, smart phone or other such device that may be classified as a UE 102. In some embodiments, computing system 1300 may be a Machine Type Communications (MTC) device (also referred to as a machine-to-machine (m2m) communication device), or another such device that may be categorized as a UE 102 despite not providing a direct service to a user. In some references, a computing system 1300 may also be referred to as a mobile device (MD), a term intended to reflect devices that connect to mobile network, regardless of whether the device itself is designed for, or capable of, mobility. Specific devices may utilize all of the components shown or only a subset of the components, and levels of integration may vary from device to device. Furthermore, a device may contain multiple instances of a component, such as multiple processors, memories, transmitters, receivers, etc. The computing system 1300 typically includes a processor 1305, such as a Central Processing Unit (CPU) or microprocessor, and may further include specialized processors such as a Graphics Processing Unit (GPU) or other such processor, a memory 1315, a network interface 1310 and a bus to connect the components of computing system 1300. Computing system 1300 may optionally also include components such as a mass storage device 1320, a video adapter 1325, and an I/O interface 1330 (shown in dashed lines).

The memory 1315 may comprise any type of non-transitory system memory, readable by the processor 1305, such as static random-access memory (SRAM), dynamic random access memory (DRAM), synchronous DRAM (SDRAM), read-only memory (ROM), or a combination thereof. In specific embodiments, the memory 1315 may include more than one type of memory, such as ROM for use at boot-up, and DRAM for program and data storage for use while executing programs. The bus may be any combination of any type of several bus architectures including a memory bus or memory controller, a peripheral bus, or a video bus.

The computing system 1300 may also include one or more network interfaces 1310, which may include at least one of a wired network interface and a wireless network interface. Network interface 1310 may include a wired network interface to connect to a network 1345, and also may include a radio access network interface for connecting to other devices over a radio link. When computing system 1300 is network infrastructure, the radio access network interface may be omitted for nodes or functions acting as elements of the CN other than those at the radio edge (e.g. an eNB). When computing system 1300 is infrastructure at the radio edge of a network, both wired and wireless network interfaces may be included. When computing system 1300 is a wirelessly connected device, such as a UE 102, radio access network interface may be present, and it may be supplemented by other wireless interfaces such as WiFi network interfaces. The network interfaces 1310 allow the computing system 1300 to communicate with remote entities such as those connected to network 1345.

The mass storage 1320 may comprise any type of non-transitory storage device configured to store data, programs, and other information and to make the data, programs, and other information accessible over the bus. The mass storage 1320 may comprise, for example, any combination of a solid-state drive, hard disk drive, a magnetic disk drive, or an optical disk drive. In some embodiments, mass storage 1320 may be remote to the computing system 1300 and accessible through use of a network interface such as interface 1310. In the illustrated embodiment, mass storage 1320 is distinct from memory 1315 where it is included and may generally perform storage tasks compatible with higher latency, but may generally provide lesser or no volatility. In some embodiments, mass storage 1320 may be integrated with a memory 1315 to form a heterogeneous memory.

The optional video adapter 1325 and the I/O interface 1330 (shown in dashed lines) provide interfaces to couple the computing system 1300 to external input and output devices. Examples of input and output devices include a display 1335 coupled to the video adapter 1325 and an I/O device 1340 such as a touch-screen coupled to the I/O interface 1330. Other devices may be coupled to the computing system 1300, and additional or fewer interfaces may be utilized. For example, a serial interface such as Universal Serial Bus (USB) (not shown) may be used to provide an interface for an external device. Those skilled in the art will appreciate that in embodiments in which computing system 1300 is part of a data center, I/O interface 1330 and Video Adapter 1325 may be virtualized and provided through network interface 1310.

In some embodiments, computing system 1300 may be a standalone device, while in other embodiments computing system 1300 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as Ethernet or optical communication links, and may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created.

It should be understood that the network functions (NFs), such as UPF 110, SMF 204, MEF 216, etc., described herein can be instantiated using any of a number of known techniques, including network function virtualization (NFV), to create Virtual Network Functions (NTs). While conventional telecommunications networks, including so-called Third Generation and Fourth Generation (3G/4G) networks, can be implemented using virtualized functions in their CNs, next generation networks, including so-called Fifth Generation (5G) networks, are expected to use NFV and other related technologies as fundamental building blocks in the design of a new CN and RAN. By using NFV, and technologies such as Software-Defined Networking (SDN), functions in a CN can be instantiated at a location in the network that is determined based on the needs of the network. It should be understood that if a network slice is created, the allocation of resources at different data centers allows for the instantiation of a function at or near a particular geographic location, even within the slice where resources have been abstracted. This allows virtualized functions to be "close" in a physical sense to the location at which they are used. This may be useful and may combined with a sense of topological closeness to select a logical location at which to instantiate a function so that it is geographically or topologically close to a selected physical or network location.

The described embodiments allow the UPF 110 to detect the UL packet carrying a DNS query to the MNO DNS server 116 or to a default DNS server. The UPF 110 may replace the source IP address and/or destination IP address of the packet header. The UPF 110 may forward the packet to a local MNO DNS server 116, or a MEC DNS server 114. When receiving a DNS response in the DL, the UPF 110 may recover the source and destination IP address so that the DL DNS response can be sent to the UE 102 that has sent the UL DNS query.

The described embodiments allow the UPF 110 to forward the UL packet querying a DNS server without modifying the UL packet. The UPF 110 may have a N6 tunnel connection to a local MNO DNS server 116 or a MEC DNS server 112. When the UPF 110 detects a UL packet sent to a DNS server, the UPF 110 may forward the UL packet without modification to another DNS server, such as local MNO DNS server 116 or MEC DNS sever 114, over the configured N6 tunnel.

The described embodiments allow the AF 408 to provide a PFD to the mobile network. The PFD may include DNS configuration information so that the UL DNS query sent from the UE 102 can be forwarded to the right MEC DNS server.

The described embodiments allow mobile operators to configure the packet detection rules, forwarding action rules, usage reporting rules, packet flow descriptions in the UDR 404, and/or in the SMF 204, and/or in the UPF 110 so that the DNS query packets can be sent to the right DNS server.

The described embodiments allow the SMF 204 and/or NWDAF 414 to collect the DNS queries and responses. The mobile operator, or control plane functions like the SMF 204 and/or NWDAF 414 may use this information to create statistics on content consumption, perform traffic routing optimization, network function selection (such as UPF 110 selection), radio network selection, QoS parameter optimization, optimization of mobility parameters.

Figure 14:
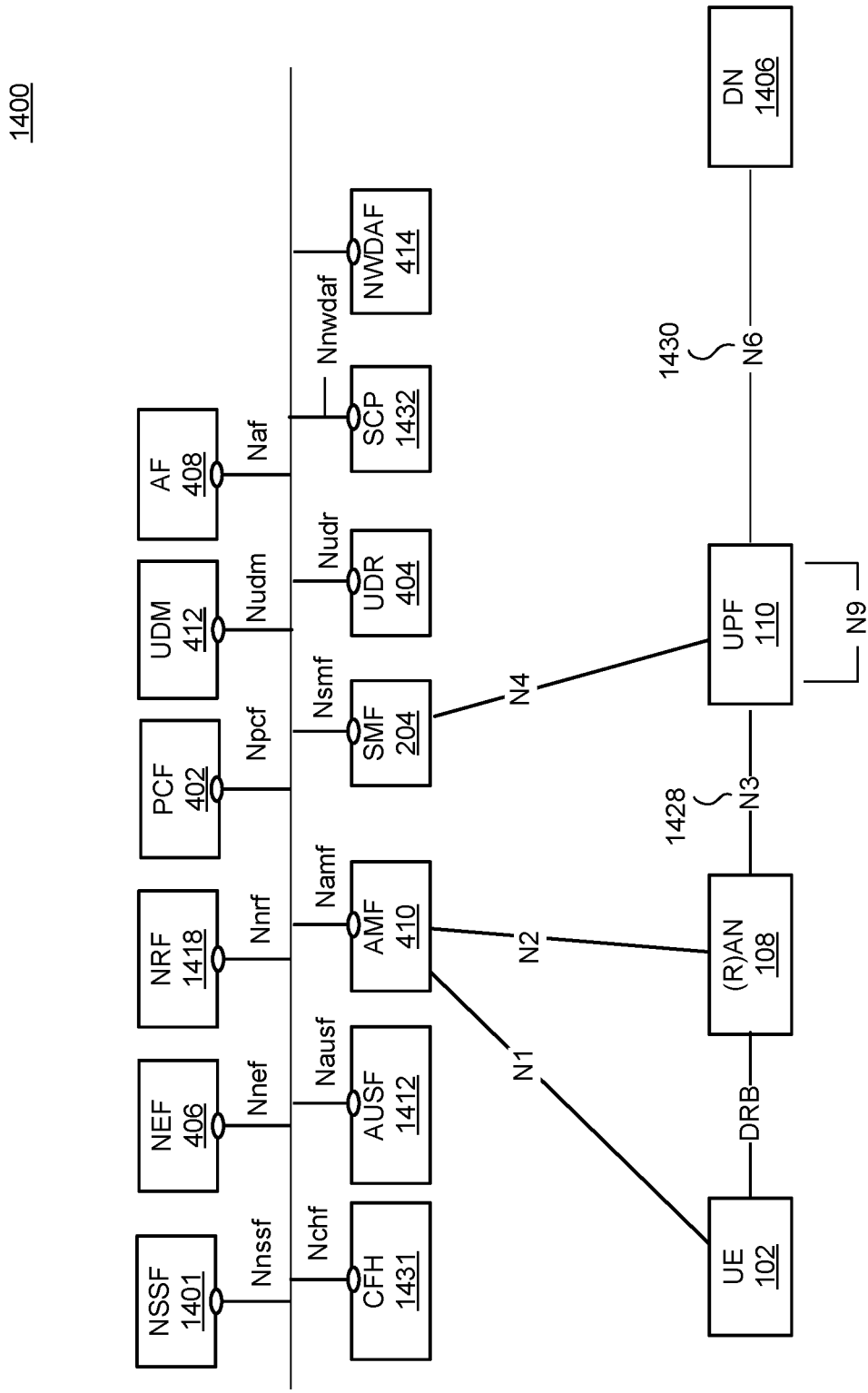
FIG. 14 is a block diagram illustrating a system architecture of a 5G mobile network.

FIG. 14 illustrates a service-based architecture 1400 for a 5G or Next Generation Core Network (5GCN/NGCN/NCN). This illustration depicts logical connections between nodes and functions, and its illustrated connections should not be interpreted as direct physical connections. UE 102 forms a radio access network connection with a (Radio) Access Network ((R)AN) node 108 (which may, for example, be a gNodeB (gNB)), which is connected to a User Plane (UP) Function (UPF) 110 such as a UP Gateway (also known as a PSA UPF) over a network interface providing a defined interface such as an N3 interface 1428. UPF 110 provides a logical connection to a Data Network (DN) 1406 over a network interface such as an N6 interface 1430. The radio access network connection between the UE 102 and the (R)AN node 108 may be referred to as a Data Radio Bearer (DRB).

DN 1406 may be a data network used to provide an operator service, or it may be outside the scope of the standardization of the Third Generation Partnership Project (3GPP), such as the Internet, a network used to provide third party service, and in some embodiments DN 1406 may represent an Edge Computing network or resource, such as a Mobile Edge Computing (MEC) network, or local area data network (LADN).

UE 102 also connects to the Access and Mobility Management Function (AMF) 410 through a logical N1 connection (although the physical path of the connection is not direct). The AMF 410 is responsible for authentication and authorization of access requests, as well as mobility management functions. The AMF 410 may perform other roles and functions as defined by the 3GPP Technical Specification (TS) 23.501. In a service based view, AMF 410 can communicate with other core network control plane functions through a service based interface denoted as Namf.

The Session Management Function (SMF) 204 is a network function that is responsible for managing PDU sessions allowing the UE 102 to communicate with data networks or with another UE. For example, the SMF 204 may perform allocation and management of IP addresses that are assigned to a UE 102 as well as the selection of a UPF 110 (or a particular instance of a UPF 110) for traffic associated with a particular session of UE 102. The SMF 204 can communicate with other core network functions, in a service based view, through a service based interface denoted as Nsmf. The SMF 204 may also connect to a UPF 110 through a logical interface such as network interface N4.

The Authentication Server Function (AUSF) 1412, provides authentication services to other network functions over a service based Nausf interface.

A Network Exposure Function (NEF) 406 can be deployed in the network to allow servers, functions and other entities such as those outside a trusted domain to have exposure to services and capabilities within the network. In one such example, an NEF 406 can act much like a proxy between an application server outside the illustrated network and network functions such as the Policy Control Function (PCF) 402, the SMF 204, the UDM 412, and the AMF 410, so that the external application server can provide information that may be of use in the setup of the parameters associated with a data session. The NEF 406 can communicate with other network functions through a service based Nnef network interface. The NEF 406 may also have an interface to non-3GPP functions.

A Network Repository Function (NRF) 1418, provides network service discovery functionality. The NRF 1418 may be specific to the Public Land Mobility Network (PLMN) or network operator, with which it is associated. The service discovery functionality can allow network functions and UEs 102 connected to the network to determine where and how to access existing network functions and may present the service based interface Nnrf.

PCF 402 communicates with other network functions over a service based Npcf interface and can be used to provide Policy and Charging Control (PCC) functionality to other network functions, including those within the control plane. The PCC functionality may include provision of policy rules to Control Plane function(s) to enforce them. The PCF can access subscription information relevant for policy decisions stored in a Unified Data Repository (UDR 404). In one such example the PCF 1416 may transmit a PCC rule (associated with a policy) associated with session management to the SMF 204, which may use the received PCC rule to implement the associated policy. This arrangement may be used to enable a unified policy framework within which network behavior can be governed.

A Unified Data Management Function (UDM) 412 can present a service based Nudm interface to communicate with other network functions and can provide data storage facilities to other network functions. Unified data storage can allow for a consolidated view of network information that can be used to ensure that the most relevant information can be made available to different network functions from a single resource. This can make implementation of other network functions easier, as they do not need to determine where a particular type of data is stored in the network. The UDM 412 may employ an interface Nudr to connect to a User Data Repository (UDR) 404. The PCF 402 may be associated with the UDM 412 because it may be involved with requesting and providing subscription policy information to the UDR 404, but it should be understood that typically the PCF 402 and the UDM 412 are independent functions.

The PCF 402 may have a direct interface to the UDR 404. The UDM 412 can receive requests to retrieve content stored in the UDR 404, or requests to store content in the UDR 404. The UDM 412 is typically responsible for functionality such as the processing of credentials, location management and subscription management. The UDR 404 may also support any or all of Authentication Credential Processing, User Identification handling, Access Authorization, Registration/Mobility management, subscription management, and Short Message Service (SMS) management. The UDR 404 is typically responsible for storing data provided by the UDM 412. The stored data is typically associated with policy profile information (which may be provided by PCF 402) that governs the access rights to the stored data. In some embodiments, the UDR 404 may store policy data, as well as user subscription data which may include any or all of subscription identifiers, security credentials, access and mobility related subscription data and session related data.

Application Function (AF) 408 represents the non-data plane (also referred to as the non-user plane) functionality of an application deployed within a network operator domain and within a 3GPP compliant network. The AF 408 interacts with other core network functions through a service based Naf interface, and may access network capability exposure information, as well as provide application information for use in decisions such as traffic routing. The AF 408 can also interact with functions such as the PCF 402 to provide application specific input into policy and policy enforcement decisions. It should be understood that in many situations the AF 408 does not provide network services to other NFs, and instead is often viewed as a consumer or user of services provided by other NFs. An application outside the 3GPP network, can perform many of the same functions as AF 408 through the use of NEF 406.

Network Data Analytics Function (NWDAF) 414 represents operator managed network analytics logical function. The NWDAF 414 may Support data collection from other NFs, UPF 110, (R)AN 108, and AFs 408, OAM and perform data analytics to support operation of other NFs, OAM, AF 408, (R)AN 108, and UPF 110. The UPF 110 may use event exposure interface of the UPF 110 to send some event notifications to the NWDAF 414. For example, some event notifications related to DNS query and response are described in the present document.

UE 102 communicates with network functions that are in the User Plane (UP), and the Control Plane (CP). The UPF 110 is a part of the CN UP (DN 1406 being outside the 5G Core Network (5GCN)). (R)AN node 108 may be considered as a part of a User Plane, but because it is not strictly a part of the CN, it is not considered to be a part of the CN UP. AMF 410, SMF 204, AUSF 1412, NEF 406, NRF 1418, PCF 402, and UDM 412 are functions that reside within the CN CP and are often referred to as Control Plane Functions. AF 408 may communicate with other functions within CN CP (either directly or indirectly through the NEF 406), but is typically not considered to be a part of the CN CP.

The charging function (CHF 1431) provides charging functionalities. The SMF 204 may use the Nchf services of the CHF 1431 to send information data consumption reported from the UPF 110 to the CHF 1431 for online and offline charging purposes. The CHF 1431 may receive directly the information related to charging from the UPF 110 by using event exposure interface of the UPF 110.

The Service Communication Proxy (SCP) 1432 may be deployed in the CN to support indirect communication between two CP NFs, delegated discovery to support discovery of CP NFs, message forwarding and routing to destination NF/NF service, communication security between two NFs, load balancing of CP NFs.

Those skilled in the art will appreciate that there may be a plurality of UPFs connected in series between the (R)AN node 108 and the DN 1406, and multiple data sessions to different DNs can be accommodated through the use of multiple UPFs 110 in parallel.

User Plane (UP) packets flows to and from a particular UE 102. UP packets are normally routed between the (R)AN node 108 connected to the UE 102, and the DN 1406 using General Packet Radio Service (GPRS) Tunneling Protocol for user plane (GTP-U) tunnels 1428 and possibly IP-based tunnel established through the N3 1428 and N6 1430 interfaces, respectively. In some examples, connections between (R)AN node 108 and a UPF 110 would make use of GTP-U tunnel 1428. Connections between the illustrated UPF 110 and other unillustrated UPFs would also make sure of a GTP-U tunnel. Upon leaving the CN UP, a packet may make use of an Internet Protocol (TP)-based connection between the UPF 110 and the DN 1406 instead of a GTP-U tunnel, especially if DN 1406 is outside the domain of the operator. Optionally, a GTP-U tunnel 1428 may be established between the (R)AN node 108 and the UPF 110 for each Radio Bearer between the UE 102 and the (R)AN node 108, which might allow for a one-to-one relationship between Radio Bearers and GTP-U tunnels. Where there is a second UPF, there would usually be a corresponding GTP-U tunnel between the UPFs for each GTP-U tunnel between the (R)AN node 108 and the UPF 110. This results in each radio bearer being associated with a set of GTP-U tunnels forming a path through the CN UP. Each GTP-U tunnel may support multiple PDU sessions, and packet flows with multiple different QoS requirements. Packet flows within a GTP-U tunnel, such as tunnel 1428, having the same QoS requirements may be grouped together as a QoS Flow, which may be identified by a given QFI. The QFI can therefore be used for queuing and prioritization of packet forwarding through the GTP-U tunnels 1428 and 1430.

Embodiments include a method of providing support web services in a mobile edge computing services network. The method, performed in a user plane function (UPF) of a network, includes detecting, in an uplink (UL) protocol data unit (PDU) transmission of a user equipment (UE), a MEC DNS query, the PDU including at least a destination IP address of a first network operator DNS.

In another embodiment, the method further includes replacing, by a MEC support function (MSF), the destination IP address of the first MNO DNS with a destination IP address of one of a second MNO DNS and a CDN DNS.

In yet another embodiment, the method includes detecting, by a control plane function, such as session management function (SMF), of the network, that the UE has moved from a first location to a second location, and transmitting an instruction, from the SMF, that the UE repeats the DNS query for a MEC service.

Embodiments herein also provide, in one aspect, a method that further includes performing, by the MSF, a network address translation (NAT) operation of at least one of IP address provided by the SMF and IP address provided by the UPF, and replacing, in accordance with the NAT, a source IP address of the UE in a packet header of the uplink (UL) PDU, wherein the replacing protects user privacy associated with the UE and enhances traffic routing between the network and one or more data servers in communication with the network.

In one embodiment, the MSF includes a mapping between a domain name or FQDN of the uniform resource locator (URL) associated with the DNS query and a local MEC DNS.

In another embodiment, during an establishment of a PDU session between the UE and a data network (DN) hosting the MEC application, a SMF of the network provides the UPF with at least one of a packet detection rule (PDR), a packet forward action rule (FAR), and a usage reporting rule (URR), the PDR including one or more packet filter sets used to detect DNS Query.

In another embodiment, an application function (AF) of the MEC provides information on DNS server selection configuration in association with a set of mobility scenarios of the UE in accordance at least one of a home public land mobile network (HPLMN) and a visiting PLMN.

Embodiments herein further provide, in another broad aspect, a method that includes detecting, by the SMF, a non-access-stratum (NAS) request by a UE in association with location information of the UE, and identifying a DN-authentication, authorization and accounting services (DN-AAA) server capable of authorizing access, by the UE, of a MEC application.

In another embodiment, identifying the DN-AAA server is based on at least one of a local configuration determined in accordance with a session management (SM) request container included in the NAS request of the UE, a data network name (DNN), a single network slice selection assistance information (S-NSSAI), and an indication in accordance with a MEC Application Identifier (ID).

In one embodiment, the method further includes transmitting a request, by the SMF, to the DN-AAA server, the request including the location information of the UE.

In another aspect, the UE location information is associated with at least a range of IP addresses or IP prefixes, and the SMF includes one of a temporary IP address and a temporary IP prefix associated with the geographical area that is representative of a UE location.

In yet another embodiment, the DN-AAA server uses at least one of the range of IP addresses and an IP prefixes to map to a geographical location area of the UE.

In a further aspect, the location information includes a geographical zone ID that encompasses a location of the UE and a cell ID or RAN ID of a radio access network (RAN) that serves the UE.

In yet another embodiment, the DN-AAA server transmits location information of the MEC server to the SMF, and the SMF configures a traffic routing rule for an N6 interface towards the MEC server. The location information of the MEC server may be represented by, for example, IP address(es), range of IP address, IP prefix(es), data network access identifier(s) (DNAI).

Embodiments herein also provide, in other embodiments, a UPF in a communication network. The UPF includes a processor and a non-transient memory storing instructions executable in the processor to detect, in an UL PDU transmission of a UE, a MEC DNS query, the PDU including at least a destination IP address of a first network operator DNS.

Embodiments herein also provide, in yet another broad aspect, SMF in a communication network. The SMF includes a processor and a non-transient memory storing instructions executable in the processor to detect, by the SMF, a NAS request by a UE in association with location information of the UE, and identify a DN-AAA server capable of authorizing access, by the UE, of an MEC application.

Also provided, in another embodiment, is a communication system including a user plane function (UPF) configured to: detect, in an uplink (UL) protocol data unit (PDU) transmission of a user equipment (UE), a mobile edge computing (MEC) domain name system (DNS) query, the PDU including at least a destination IP address of a first network operator DNS, and a session management function (SMF) configured to: detect a NAS request by a UE in association with location information of the UE, and identify a DN-authentication, authorization and accounting services (DN-AAA) server capable of authorizing access, by the UE, of a mobile edge computing (MEC) application.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A system comprising:
   at least one processor;
   at least one machine readable memory storing machine readable instructions, which when executed by the at least one processor, implement
   an application function (AF) of an application server, a Unified Data Repository (UDR) and a Network Exposure Function (NEF);
   wherein the AF is configured to send an AF request to the NEF, the request being used to provide a new domain name system (DNS) configuration, or to modify or delete an existing DNS configuration,
   wherein when the AF request is used to provide the new domain name system (DNS) configuration, or to modify the existing DNS configuration, the AF request including the new DNS configuration, and wherein the NEF is configured to store the new DNS configuration in the UDR.

2. The system according to the claim 1, wherein the new DNS configuration includes one or more of:

information indicative of edge computing DNS servers including an IP address and a port number of each edge computing DNS server;

a data network access identifier (DNAI) that provides access to a data network (DN) hosting the edge computing DNS servers;

a list of domain names, a list of uniform resource locators (URLs), or a list of significant pa-FE parts of URLs that can be resolved by the each edge computing DNS server;

a data network name (DNN);

a single network slice selection assistance information (S-NSSAI);

an external Group Identifier of user equipment (UE) groups; and an application identifier of an edge computing application.

3. The system according to claim 1, wherein when the AF request is used to provide the new domain name system (DNS) configuration, or to modify the existing DNS configuration, the AF request further includes at least one of an AF Transaction ID and an AF-Service-Identifier.

4. The system according to the claim 1, wherein when the AF request is used to delete the existing DNS configuration, the AF request includes an AF Transaction ID.

5. The system according to the claim 1, wherein the system further comprises a session management function (SMF), the SMF being configured to receive the new DNS configuration from the NEF.

6. The system according to the claim 5, wherein the system further comprises an edge computing support function, the SMF being configured to:

create, modify, or delete a detection rule and an action rule to be configured in the edge computing support function, wherein the detection rule and the action rule are derived from the new DNS configuration.

7. The system according to the claim 5, wherein the system further comprises an edge computing support function, the edge computing support function configured to perform at least one of:

detecting a DNS query in UL packets sent from user equipments (UEs) and reporting information related to the DNS query to the SMF;

detecting a DNS response from a edge computing DNS server, and reporting one or more of IP addresses of edge computing server in the DNS response to the SMF;

receiving DNS message handling rules from the SMF, the DNS message handling rules being derived from the new DNS configuration; and receiving a detection rule and an action rule, the detection rule and the action rule being derived from the new DNS configuration.

8. The system according to claim 7, wherein the SMF is configured to: receive the one or more of IP addresses of edge computing server from the edge computing support function;

perform selection of at least one of: an uplink classifier function, a branching point function, and a user plane function to provide user plane connection between a UE and edge computing server;

perform insertion at least one of the uplink classifier function, the branching point function, and the user plane function to provide user plane connection between the UE and edge computing server.

9. The system according to claim 7, wherein the edge computing support function is configured to detect the DNS query in the UL packets sent from the UEs and report to the SMF the information related to the DNS query, and wherein the edge computing support function is configured to find a fully qualified domain name (FQDN) from the DNS query and report the FQDN to the SMF.

10. A method performed in a system, the system comprising:

an application function (AF) of an application server, a Unified Data Repository (UDR) and a Network Exposure Function (NEF);

the method comprising:

sending, by the AF, an AF request to the NEF, wherein the AF request is used to provide a new domain name system (DNS) configuration, or to modify or delete an existing DNS configuration, wherein when the AF request is used to provide the new domain name system (DNS) configuration, or to modify the existing DNS configuration, the AF request includes the new DNS configuration; and storing, by the NEF, the new DNS configuration in the UDR.

11. The method according to the claim 10, wherein
the new DNS configuration includes one or more of:
information indicative of edge computing DNS servers including IP addresses and port numbers of each edge computing DNS server;

a data network access identifier (DNAI) that provides access to a data network (DN) hosting the edge computing DNS servers;

a list of domain names, a list of uniform resource locators (URLs), or a list of significant parts of URLs that can be resolved by the each edge computing DNS server;

a data network name (DNN);

a single network slice selection assistance information (S-NSSAI);

an external Group Identifier of user equipment (UE) groups; and an application identifier of an edge computing application.

12. The method according to claim 10, wherein when the AF request is used to provide the new domain name system (DNS) configuration, or to modify the existing DNS configuration, the AF request further includes at least one of:

an AF Transaction ID and an AF-Service-Identifier.

13. The method according to the 10, wherein when the AF request is used to delete the existing DNS configuration, the AF request includes an AF Transaction ID.

14. The method according to the claim 10, wherein the system further comprises a session management function (SMF), the method further comprising:

receiving, by the SMF, the new DNS configuration from the NEF.

15. The method according to the claim 14, wherein the system further comprises an edge computing support function, the method further comprising:

creating, modifying or deleting, by the SMF, a detection rule and an action rule to be configured in the edge computing support function, wherein the detection rule and the action rule are derived from the new DNS configuration.

16. The method according to the claim 14, wherein the system further comprises an edge computing support function, the method further comprising at least one of:
   detecting, by the edge computing support function, a DNS query in UL packets sent from user equipments (UEs) and reporting information related to the DNS query to the SMF;
   detecting, by the edge computing support function, a DNS response from the edge computing DNS server, and reporting one or more of the IP addresses of edge computing server in the DNS response to the SMF;
   receiving, by the edge computing support function, DNS message handling rules from the SMF, the DNS message handling rules being derived from the new DNS configuration; and receiving, by the edge computing support function, a detection rule and an action rule, the detection rule and the action rule being derived from the new DNS configuration.

17. The method according to claim 16, the method further comprising: receiving, by the SMF, the one or more of the IP addresses of edge computing server from the edge computing support function;
   performing, by the SMF, selection of at least one of an uplink classifier function, a branching point function, and a user plane function to provide user plane connection between a UE and edge computing server; and
   performing, by the SMF, insertion of at least one of the uplink classifier function, the branching point function, and the user plane function to provide user plane connection between the UE and edge computing server.

18. The method according to claim 16, wherein detecting, by the edge computing support function, the DNS query in the UL packets sent from the UEs and reporting to the SMF the information related to the DNS query comprises:
   finding, by the edge computing support function, a fully qualified domain name (FQDN) from the DNS query and reporting the FQDN to the SMF.

19. A method, comprising:
   receiving, by a session management function (SMF), a new domain name system (DNS) configuration; and
   creating, modifying or deleting, by the SMF, a detection rule and an action rule to be configured in an edge computing support function, wherein the detection rule and the action rule are derived from the new DNS configuration.

20. The method according to claim 19, further comprising:
   receiving, by the SMF, one or more IP address of edge computing server from the edge computing support function;
   performing, by the SMF, selection at least one of: an uplink classifier function, a branching point function, and a user plane function to provide user plane connection between a user equipment (UE) and edge computing server; and
   performing, by the SMF, insertion of at least one of the uplink classifier function, the branching point function, and the user plane function to provide user plane connection between the UE and edge computing server.

21. The method according to the claim 19, wherein the new DNS configuration includes one or more of:
   information indicative of edge computing DNS servers including IP addresses and port numbers of each edge computing DNS server;
   a data network access identifier (DNAI) that provides access to a data network (DN) hosting the edge computing DNS servers;
   a list of domain names, a list of URLs, or a list of significant parts of URLs that can be resolved by the each edge computing DNS server;
   a data network name (DNN);
   single network slice selection assistance information (S-NSSAI);
   an external Group Identifier of user equipment (UE) groups; and
   an application identifier of an edge computing application.

22. A session management function (SMF), comprising: at least one processor, and
   at least one machine readable memory storing instructions, which when executed by the at least one processor, cause the SMF to:
   receive a new domain name system (DNS) configuration;
   create, modify or delete a detection rule and an action rule to be configured in an edge computing support function, wherein the detection rule and the action rule are derived from the new DNS configuration.

23. The SMF according to claim 22, wherein the instructions further cause the SMF to:
   receive one or more IP address of edge computing server from the edge computing support function;
   perform selection at least one of an uplink classifier function, a branching point function, and a user plane function to provide user plane connection between a user equipment (UE) and edge computing server; and
   perform insertion of at least one of the uplink classifier function, the branching point function, and the user plane function to provide user plane connection between the UE and edge computing server.

24. The SMF according to the claim 22, wherein
   the new DNS configuration includes one or more of:
   information indicative of edge computing DNS servers including IP addresses and port numbers of each edge computing DNS server;
   a data network access identifier (DNAI) that provides access to a data network (DN) hosting the edge computing DNS servers;
   a list of domain names, a list of URLs, or a list of significant parts of URLs that can be resolved by the each edge computing DNS server;
   a data network name (DNN);
   single network slice selection assistance information (S-NSSAI);
   an external Group Identifier of user equipment (UE) groups; and
   an application identifier of an edge computing application.

25. The method of claim 19, wherein
   the detection rule includes one or more packet flow descriptions (PFDs), and
   the one or more PFDs are provided by an application function.

26. The SMF of claim 22, wherein
   the detection rule includes one or more packet flow descriptions (PFDs), and
   the one or more PFDs are provided by an application function.

* * * * *

UNITED STATES PATENT AND TRADEMARK OFFICE
CERTIFICATE OF CORRECTION

| | | |
|---|---|---|
| PATENT NO. | : 11,929,977 B2 | |
| APPLICATION NO. | : 17/566780 | |
| DATED | : March 12, 2024 | |
| INVENTOR(S) | : Ngoc Dung Dao | |

It is certified that error appears in the above-identified patent and that said Letters Patent is hereby corrected as shown below:

In the Specification

Column 9, Line 40, "(CIF) 226 according to Usage Reporting Rule (URR)." should read --(CHF) 226 according to Usage Reporting Rule (URR).--;

Column 38, Line 41, "sends a DNS query to the MMNO DNS 116 and MNO" should read --sends a DNS query to the MNO DNS 116 and MNO--;

Column 50, Line 52, "create Virtual Network Functions (NTs). While conventional" should read --create Virtual Network Functions (VNFs). While conventional--.

In the Claims

Column 57, Line 15, "URLs, or a list of significant pa-FE parts of URLs that" should read --URLs, or a list of significant part of URLs that--.

Signed and Sealed this
Second Day of July, 2024

Katherine Kelly Vidal
*Director of the United States Patent and Trademark Office*